United States Patent [19]
Callison et al.

[11] Patent Number: 5,469,548
[45] Date of Patent: Nov. 21, 1995

[54] DISK ARRAY CONTROLLER HAVING INTERNAL PROTOCOL FOR SENDING ADDRESS/TRANSFER COUNT INFORMATION DURING FIRST/SECOND LOAD CYCLES AND TRANSFERRING DATA AFTER RECEIVING AN ACKNOWLDGEMENT

[75] Inventors: Ryan A. Callison, Spring; Gregory T. Chandler, Houston; Thomas W. Grieff, Spring, all of Tex.

[73] Assignee: Compaq Computer Corp., Houston, Tex.

[21] Appl. No.: 263,018

[22] Filed: Jun. 20, 1994

Related U.S. Application Data

[63] Continuation of Ser. No. 960,582, Oct. 13, 1992, abandoned.
[51] Int. Cl.$^6$ .................................................. G06F 7/22
[52] U.S. Cl. .................. 395/441; 395/894; 395/854; 395/290; 364/230.4; 364/242.31; 364/270.7; 364/DIG. 1
[58] Field of Search .................. 395/250, 275, 395/425, 325, 725

[56] References Cited

U.S. PATENT DOCUMENTS

| | | | |
|---|---|---|---|
| 4,200,928 | 4/1980 | Allan et al. | 395/425 |
| 4,667,286 | 5/1987 | Young et al. | 395/250 |
| 4,775,978 | 10/1988 | Hartness | 371/40.1 |
| 4,888,691 | 12/1989 | George et al. | 395/700 |
| 4,942,579 | 7/1990 | Goodlander et al. | 371/51.1 |
| 4,993,030 | 2/1991 | Krakauer et al. | 371/40.1 |
| 5,088,081 | 2/1992 | Farr | 369/54 |
| 5,124,987 | 6/1992 | Milligan et al. | 371/10.1 |
| 5,140,592 | 8/1992 | Idleman et al. | 371/8.1 |
| 5,148,432 | 9/1992 | Gordon et al. | 371/10.1 |
| 5,166,936 | 11/1992 | Ewert et al. | 371/21.6 |
| 5,195,100 | 3/1993 | Katz et al. | 371/66 |
| 5,206,943 | 4/1993 | Callison et al. | 395/425 |
| 5,249,279 | 9/1993 | Schmenk et al. | 395/425 |

OTHER PUBLICATIONS

Fujitsu Microelectronics Inc., SCSI Protocol Controller Specification, pp. 1–114, May 23, 1991.
Ciprico, Inc., Rimfire 6600 Parallel Disk Array Controller Data Sheets, Sep. 8, 1989.
David A. Patterson, et al., "A Case for Redundant Arrays of Inexpensive Disks (Raid)," Dec. 1987, pp. 1–24.
Intel Corporation, 82355 Bus Master Interface Controller (BMIC) Specification, pp. 1–703 to 1–903, Sep. 1991.

*Primary Examiner*—Thomas C. Lee
*Assistant Examiner*—Sang Hui Kim
*Attorney, Agent, or Firm*—Pravel, Hewitt, Kimball & Krieger

[57] ABSTRACT

A disk array controller board which utilizes an EISA bus master which is a slave on its internal data bus to allow an advanced drive array controller chip (ADAC) to operate as a master. The ADAC is connected to transfer buffer RAM. The protocol of the internal data bus provides for a cycle to load a host memory address into the bus slave, to provide transfer count information and slave specific information and for a series of data transfer cycles. The local processor is connected to the EISA bus master and the ADAC to control operations and to provide certain information. The ADAC is controlled by structures referred to as command descriptor blocks (CDBs). Each CDB includes information which describes the various addresses, control bits and functional bits used by the ADAC to perform its transfer operations. The local processor directly writes and deposits data forming a CDB into the transfer buffer RAM. The ADAC obtains the CDB, loads the data into registers and then performs operations according to the information contained in these registers until a transfer is done. The ADAC itself performs operations, including automatic stripe scattering and gathering to develop contiguous host memory fields from striped array data. A series of CDBs can be chained so that a complex series of tasks can be developed. In one variation a string of CDBs is developed to transfer data but some data is transferred to the bit bucket, while other data is actually transferred.

10 Claims, 45 Drawing Sheets

FIG. 7 MODE 0, BUS MASTER WRITE DIAGRAM, NO SIPHON OPERATION

FIG. 10 MODE 1, BUS SLAVE NOT READY DIAGRAM, NO SIPHON OPERATION

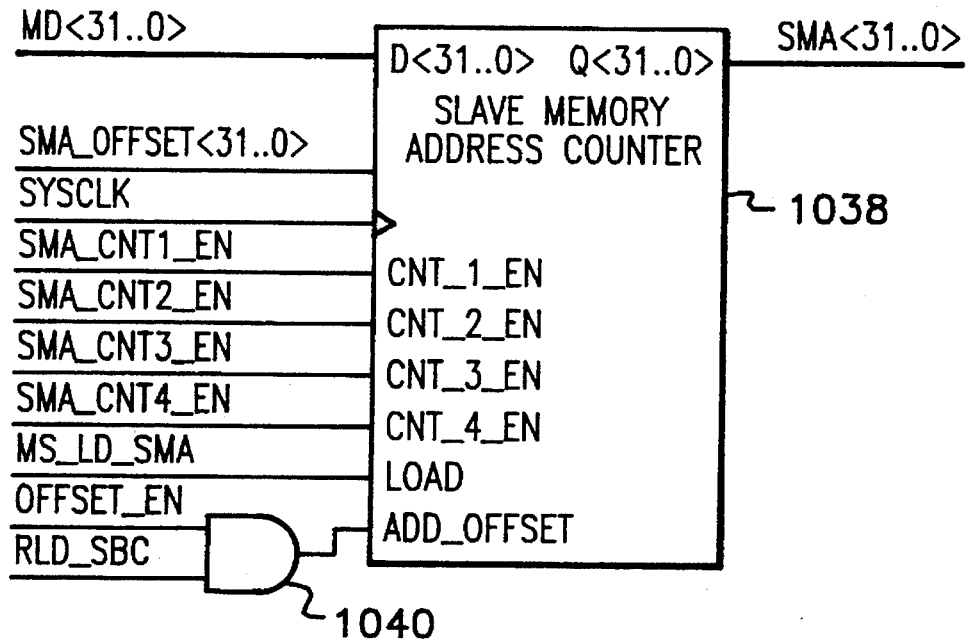
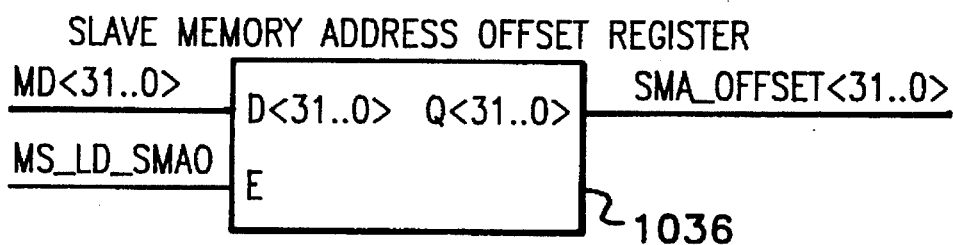
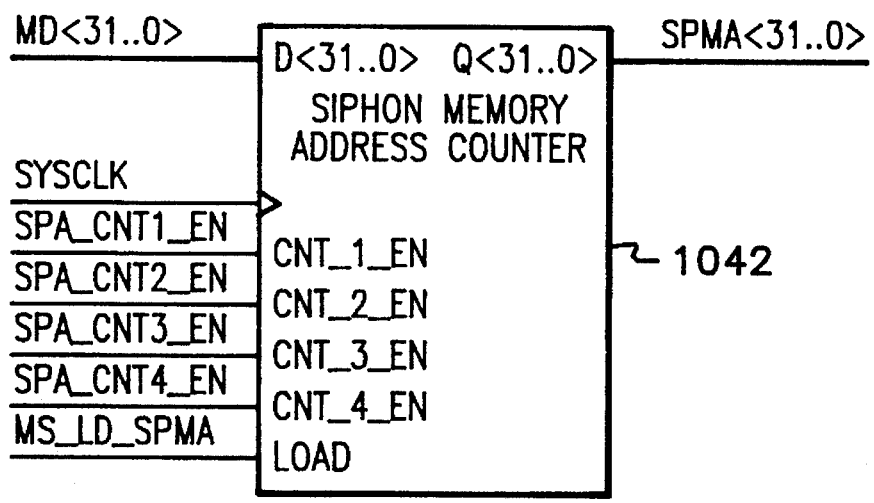
FIG. 15

CONTROLLER TRANSFER BUS STATE MACHINE

RAM INTERFACE STATE MACHINES

MS CHANNEL RAM INTERFACE

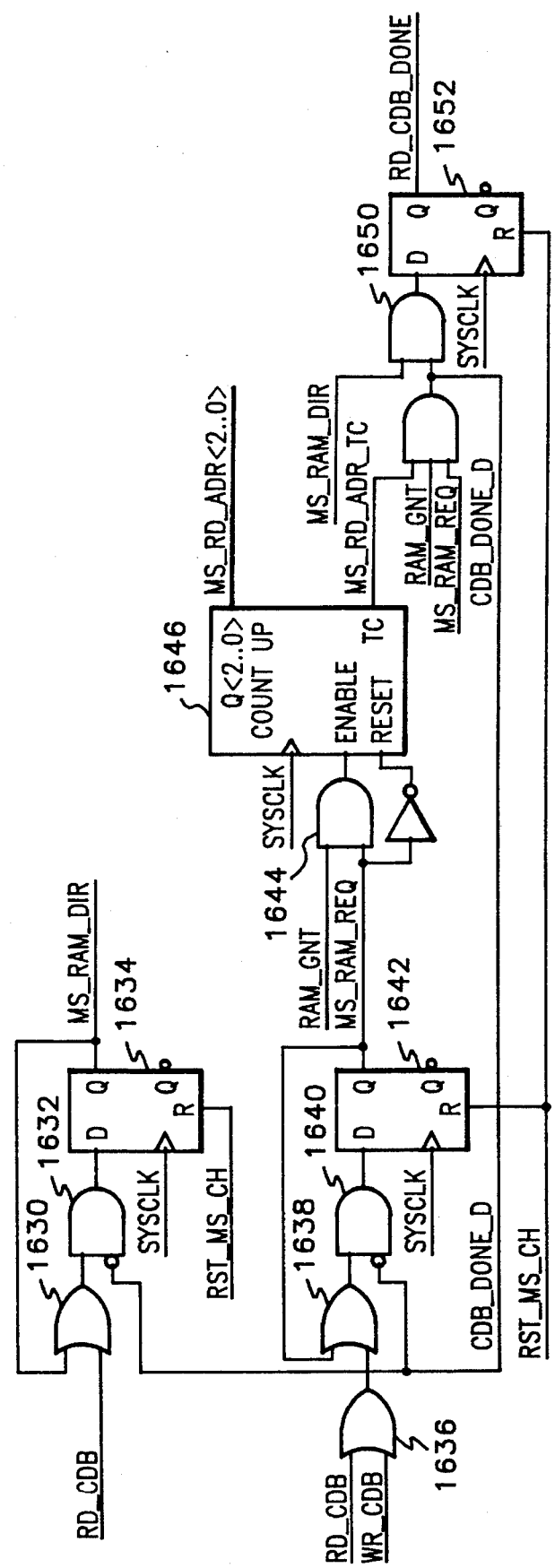
FIG. 36B MS CHANNEL RAM INTERFACE

DISK ARRAY CONTROLLER HAVING INTERNAL PROTOCOL FOR SENDING ADDRESS/TRANSFER COUNT INFORMATION DURING FIRST/SECOND LOAD CYCLES AND TRANSFERRING DATA AFTER RECEIVING AN ACKNOWLDGEMENT

This is a continuation of application Ser. No. 07/960,582 filed on Oct. 13, 1992, now abandoned.

BACKGROUND OF THE INVENTION

1. Field of the Invention

The invention relates to disk array controllers, and more specifically to disk array controllers having bus mastering capabilities and local processing capabilities.

2. Description of the Prior Art

Personal computers are becoming even more powerful. They are reaching levels where they are displacing minicomputers and even mainframe computers. In this downsizing environment, a local area network (LAN) is the basic unit. A LAN typically has one or more file servers and a large number of individual workstations. In most cases the file servers are used as storage hubs for the various files, with copies of the files being transferred to the workstations on demand and updated files being returned for storage. As a result, the disk subsystem used in the file server reflects directly on the performance of the LAN.

This performance requirement has lead to great advances in both disk drives themselves and the architecture of the disk subsystem. Disk storage sizes have increased, access times have decreased and data transfer rates have increased. However, as more downsizing occurs and larger numbers of workstations are connected to the LAN, there is still continual pressure on improving disk subsystem performance. Disk drives used with mainframes offer high performance, but are very large and very expensive. Smaller, much cheaper drives are preferred. However, as more disk drives are used, the failure rate increases dramatically. Several solutions to the failure problem are available. The simplest is to provide complete redundant disk drives. This is referred to as mirroring. One problem with mirroring is storage efficiency. One half of the available capacity is used for redundancy. This is a relatively high penalty. As a remedy to this drawback, in an article entitled "A Case for Redundant Arrays of Inexpensive Disks (RAID)", ACM Sigmod Conference, June 1988, D. Patterson et al. proposed various Redundant Array of Inexpensive Disk (RAID) architectures. Two levels are of particular interest, namely RAID 4 and RAID 5. Both use data striping, where logical data is striped across the array of disks, and parity protection. In parity protection, the data values of each disk drive sector forming a stripe are XOR'd to develop a parity sector. This is written to a position in the stripe. In RAID 4 all parity information is contained on one disk drive, while in RAID 5 the parity information is spread across the drives in a skewed or diagonal fashion. A RAID 5 architecture is slightly more complicated to develop, but assuming the overheads can be reduced, offers an improved overall performance as one drive does not form a bottleneck because of parity data storage or recovery.

Given the processing and control requirements of RAID 4 and RAID 5 implementations, preferably a dedicated processor is used to control operations. Use of the host system processor would dramatically reduce overall performance. One solution to the development of a RAID 4 system is disclosed in U.S. patent application Ser. No. 431,735, entitled "Disk Array Controller With Parity Capabilities," which is hereby incorporated by reference, where a local processor controls a specialized DMA controller arrangement. The DMA controllers perform the main data transfer tasks, with the local processor only performing command interpretation and control functions.

While that design provided great improvements over host computer control, several areas for improvement were available. One major area for improvement was the actual transfer of data between the controller and the host system. The Intel Corp. 82355 or BMIC chip was used as the bus mastering device on the EISA bus. This chip had the problem that it was a master device on the local internal bus. Thus operations were difficult as the local processor had to program the BMIC before transfers were performed. This greatly increased overhead for the local processor and slowed down operations. Further, the internal bus was basically not expandable, so the design was limited in that respect. This design of the BMIC limited the capabilities of the DMA controller to just relatively simple DMA functions. This resulted in even further overhead increases for the local processor as each and every transfer operation of the DMA controllers had to be fully setup by the local processor. This setup required numerous input/output operations, which was a portion of the overhead increase.

Therefore a structure allowing more flexible operations on the local bus allowing transfers to the host system without local processor operations and less control requirements for many transfers is desirable to reduce local processor overhead to allow improved performance of a disk array controller.

SUMMARY OF THE PRESENT INVENTION

A disk array controller board according to the present invention utilizes an EISA bus master which is a slave on its internal data bus to allow other controller chips present on the disk array controller board to operate as masters. This allows greater capabilities to be placed in the disk controller chips, thus greatly reducing the overhead of the local processor.

In the preferred embodiment a pair of SCSI buses are developed to receive a series of SCSI disk drives. The local processor contains appropriate software to treat these various drives as an array and develop RAID 1 and RAID 5 architectures. The SCSI buses are provided by the output of two SCSI bus controller chips which are connected to the disk drive outputs of an advanced drive array controller chip (ADAC). The advanced drive array controller chip is connected to transfer buffer RAM which is a temporary repository for data being provided to and obtained from the disk drives. The ADAC is a master on the internal data bus used to transfer drive data to the host computer. A disk array bus master (DABM) chip operates as a slave on this internal data bus and is an EISA bus master. The protocol of the internal data bus, referred to as a controller transfer bus (CTB) provides for a cycle to load a host memory address into the bus slave, a cycle to provide transfer count information and slave specific information and then a series of data transfer cycles as necessary. Signals on the controller transfer bus include transfer direction and various ready, request and acknowledge signals, so that full handshaking is done both at a block transfer level and for each individual data doubleword which is transferred.

The local processor is connected to the DABM, the ADAC and the SCSI controllers to control operations and to provide certain information. For example, operations of the ADAC are controlled by structures referred to as command descriptor blocks or CDBs. Each CDB includes a series of information which describes the various addresses, control bits and functional bits used by the ADAC to perform its operations of transfer between the transfer buffer RAM and the host memory through the DABM. The local processor uses a direct entry into the ADAC to directly write and deposit data forming a CDB into the transfer buffer RAM. The CDB location is then identified and enabled, so that the ADAC then automatically obtains the CDB, loads the data into the particular and appropriate registers and then performs operations according to the information contained in these registers until a transfer is done. After a transfer is completed, the CDB information, as it has been modified, is returned to the transfer buffer RAM for review by the local processor and to allow possible chaining to consecutive CDBs.

Numerous unique operations are performed by the ADAC itself without any intervention by the local processor. For example, in a disk array data is striped across the various disks so that when drive data is received from a particular drive, it is not in the exact order in which it will appear in host memory. This is referred to as striping. Therefore gathering and/or scattering is necessary depending upon the direction of transfer so that the information received from the various drives is made contiguous in the host memory. The ADAC includes this capability so that after a particular stripe size or sector transfer has been completed, an address offset is provided so that the next series of data which is from a continuous stream on a particular disk but logically appears after the remaining disks in the stripe, is properly provided to the non-contiguous address in host memory. By doing this for each of the particular drive threads or drive data received, after the completion of the entire transfer operation the data in the host memory will be contiguous. This is done by a simple CDB command to indicate this striping capability without further requirements or monitoring by the local processor. This greatly reduces development of CDBs and the overhead on the local processor.

As another example, a series of CDBs can be chained so that a relatively complex series of tasks can be developed. The local processor need only set up the CDB string once and then initiate the first one. As transfers are completed through the CDB string they are loaded, performed and the next one is executed. The local processor is only informed by an interrupt when the final CDB in the string has executed. This also greatly reduces overheads in a local processor because interrupts are received much less frequently. An entire relatively complex task can be developed and yet only one interrupt is received when the total transfer is completed.

As a further example of capabilities of the ADAC, a long stream of data can be obtained from a drive, including information which was not needed but allowed sequential operations on the drive. A string of CDBs is developed to transfer this data. However, certain of the CDBs transfer the unneeded data to the bit bucket, while others direct actual data transfers. As in CDB strings only one interrupt is provided, but noncontiguous data has been provided to the host memory.

Therefore by the development of a new EISA bus master chip which is a bus slave on the internal bus, additional flexibility can be obtained and numerous bus masters can be present on the internal bus. The EISA bus master need not be individually programmed prior to transfer operations but is automatically programmed and controlled by the particular internal bus mastering chips. In this scenario the internal bus mastering chips can be made significantly more advanced than otherwise possible, as they can perform a series of operations without minute level control by the local processor. All of this frees up the local processor and reduces its overhead so that more complex tasks can be performed at an even higher rate. Therefore the performance of the disk array controller has greatly improved the prior art designs.

BRIEF DESCRIPTION OF THE DRAWINGS

A better understanding of the present invention can be obtained when the following detailed description of the preferred embodiment is considered in conjunction with the following drawings, in which:

FIGS. 13 to 18, 21, 24 and 32 to 37 are schematic and block diagrams of portions of the bus master channel controller of FIG. 3;

DETAILED DESCRIPTION OF THE PREFERRED EMBODIMENT

Figure 1:
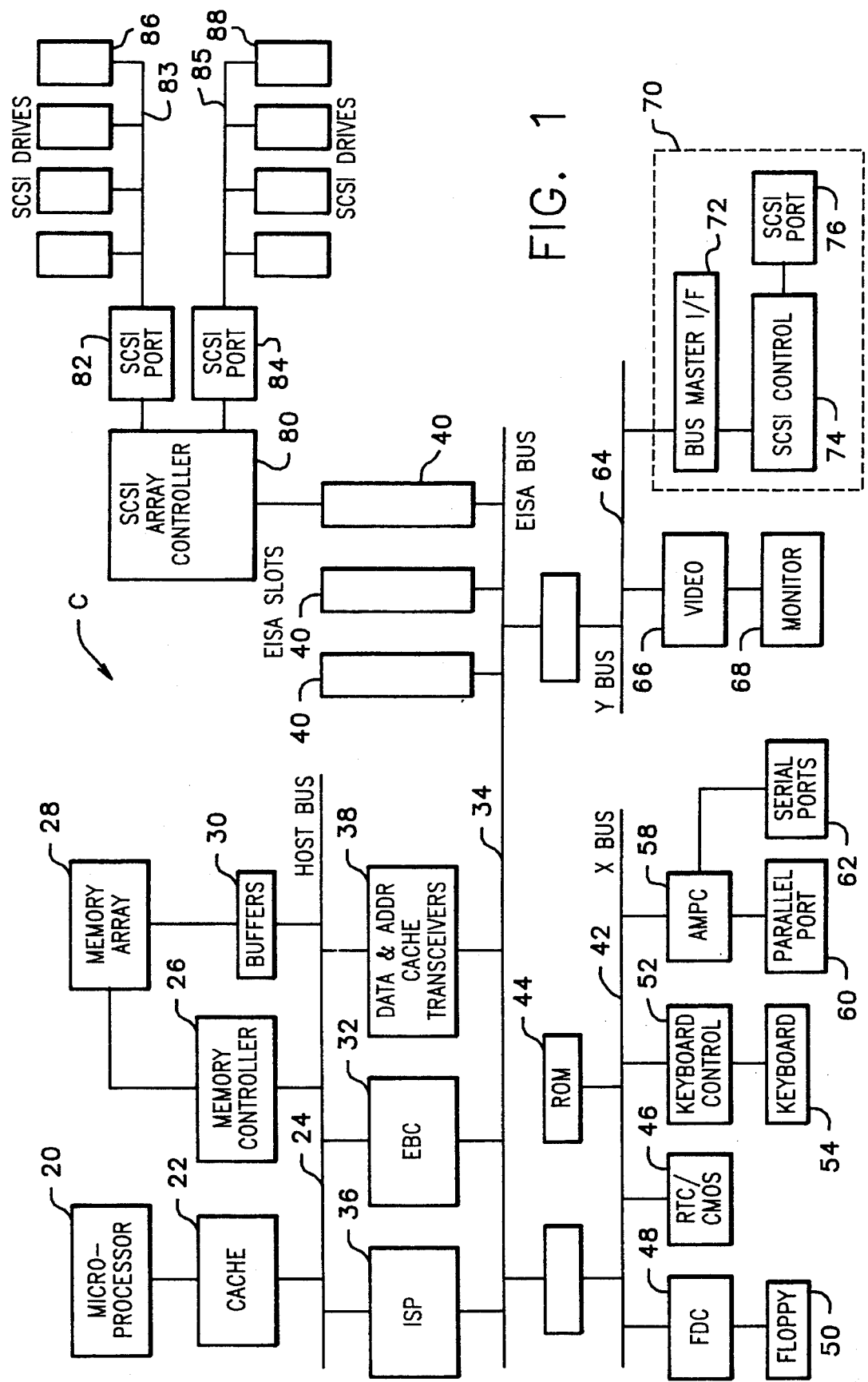
FIG. 1 is a block diagram of a computer system incorporating a disk array controller according to the present invention.

Referring now to FIG. 1, a computer system C including a SCSI controller capable of operating according to the present invention is shown. A microprocessor 20, preferably an 80486 from Intel Corporation, is connected to a cache controller 22. The cache controller 22 in turn is connected to a host bus 24 which includes address, data and control portions. A memory controller 26 is connected to the host bus 24 to receive and control main memory operations. The memory controller 26 is connected to the main memory array 28 of the computer C, with the data from the main memory array 28 going through a data buffer 30 to the host bus 24.

Also connected to the host bus 24 is in an EISA bus controller (EBC) 32 which handles translation of signals between the host bus 24 and an EISA bus 34, the input/output bus preferably used. It is of course understood that other I/O buses could be utilized. The EBC 32 is connected to an integrated system peripheral (ISP) 36 which includes a DMA controller, timers, interrupt controller, EISA bus arbiter and other devices as necessary and common in an EISA system. The ISP 36 is connected to the host bus 24 and the EISA bus 34. In addition, the EBC 32 is connected to a series of address and data latches and transceivers 38 which are connected to the host bus 24 and EISA bus 34 and provide the necessary address and data latching and buffering to allow development of an EISA system. Also connected to the EISA bus 34 are a series of EISA slots 40 which receive interchangeable circuit boards.

Two additional buses are developed from the EISA bus 34. The first of these is referred to as the X bus 42 which is conventionally a 16-bit bus used to connect with the majority of support chips present on system board of the computer system C. For example, these support chips include a read only memory (ROM) 44; a real time clock (RTC) and CMOS memory 46; a floppy disk controller 48, which in turn is connected to a floppy disk drive 50; an 8042 keyboard controller 52, which is in turn connected to a keyboard 54 and a pointing device (not shown); and a multiple peripheral controller (AMPC) 58 which provides a parallel port 60 and a series of serial ports 62. These are devices which are conventional in a small computer system C such as the one shown and are provided to indicate a complete computer and are not necessarily related to the present invention.

A second bus developed from the EISA bus 34 is the Y bus 64, which is preferably a 32-bit bus to allow high data rate transfers to the EISA bus 34. A video controller 66 and its associated monitor 68 are connected to the Y bus 64. Also connected is a simple SCSI (Small Computer System Interface) subsystem 70. The simple SCSI subsystem 70 includes a bus master interface 72, a SCSI controller 74 and a SCSI port 76 which is used to connect to SCSI devices. In the case of the computer system C, the simple SCSI subsystem 70 is located on the system board as the computer system C and preferably includes internal SCSI hard drives for performance reasons. The simple SCSI subsystem 70 is a conventional-type design, not oriented to array operation but just more conventional control of a SCSI bus. As such, performance of the subsystem 70 is below that needed for large network server applications.

In addition, a SCSI array controller 80 according to the present invention is installed in one of the EISA slots 40 when a higher performance solution that the simple SCSI subsystem 70 is desired. The SCSI array controller 80 has two SCSI ports 82 and 84, with a SCSI bus 83 and 85 from each port 82 and 84. A series of SCSI hard disk drives 86 are connected to the first SCSI bus 83 and another series of SCSI hard disk drives 88 are connected to the second bus 85. The SCSI buses 83 and 85 can be internal or external as desired. The SCSI array controller 80 operates the various attached SCSI drives 86 and 88 as an array of drives, preferably implementing such techniques as RAID 1 and RAID 5 as previously defined.

Figure 2:
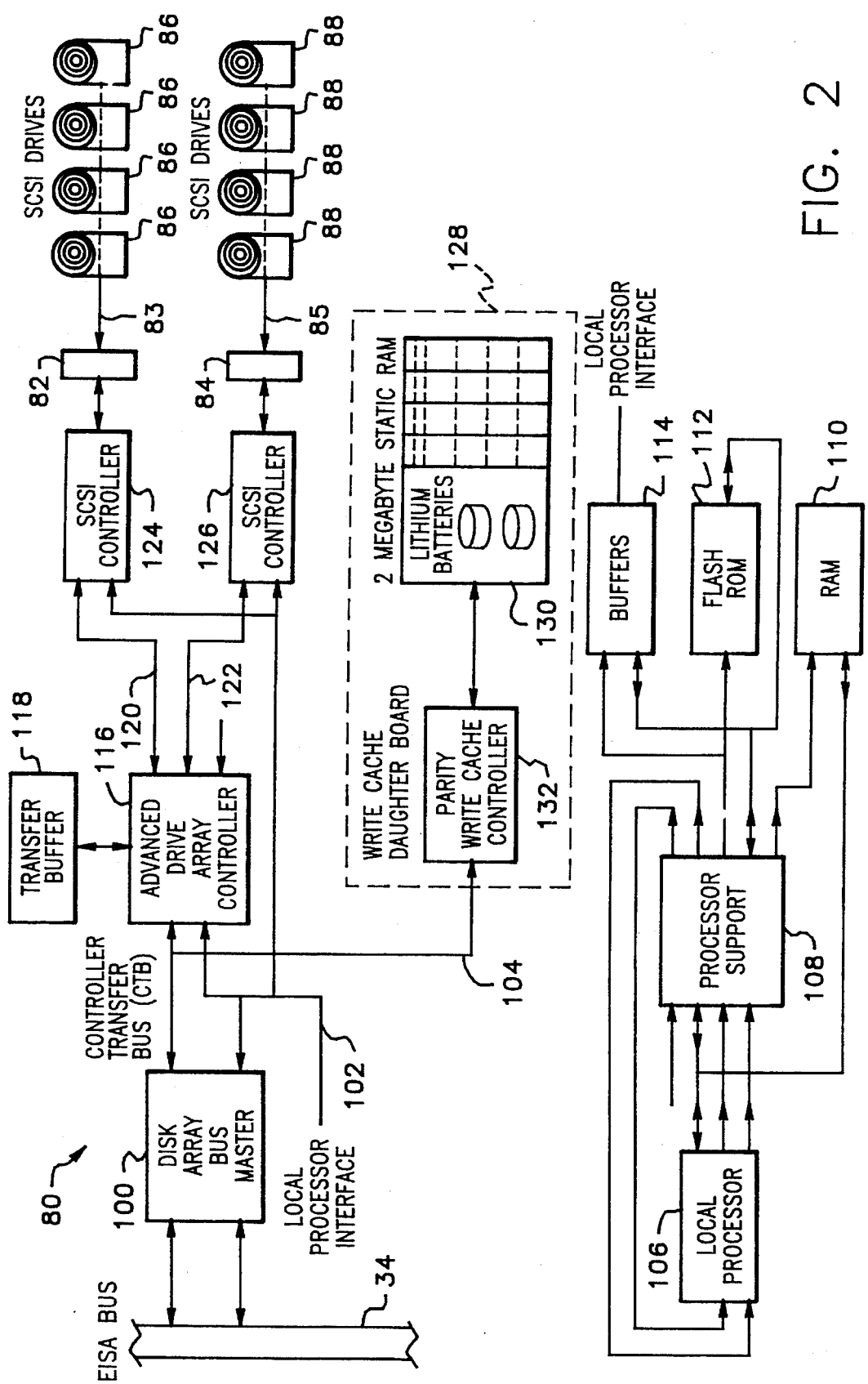
FIG. 2 is a block diagram of the SCSI disk array controller of FIG. 1.

The SCSI array controller 80 is shown in more detail in FIG. 2. The SCSI array controller 80 includes a series of different blocks. The first block is a disk array bus master (DABM) 100 which is connected to the EISA bus 34. The DABM 100 operates as both an EISA bus master and EISA bus slave. It performs as an EISA bus slave to transfer mail box information and door bell register information with the host computer and for EISA configuration purposes. In this respect its operation is similar to the prior art BMIC. The DABM 100 operates as an EISA bus master for purposes of transferring data between the memory array 28 and the SCSI array controller 80. The DABM 100 is connected to a local processor interface 102 and a controller transfer bus 104. The controller transfer bus or CTB 104 is primarily for transfer of data, while the local processor interface 102 is for transmission of commands from a local processor 106 which controls operations of the SCSI array controller 80. The DABM 100 operates as a bus slave on the CTB bus 104, unlike the BMIC, thus allowing it to be controlled more directly by numerous devices.

The local processor 106, preferably an Intel 80386SX or compatible or 80486SX processor, provides the main control for the SCSI array controller 80. The local processor 106 is connected to processor support circuitry 108, such as a chip which develops the capabilities of a conventional personal computer in a single chip. This includes the capabilities of the conventional timers, interrupt controllers, memory controllers and so on. Random access memory (RAM) 110 is connected to the addressing portion of the processor support circuitry 108 and to the data lines of the local processor 106 to allow the local processor 106 to have data memory. A read only memory (ROM) 112, preferably a flash ROM, is connected to the processor support circuitry 108 to provide the program memory and operating instructions for the local processor 106. Additionally, buffers 114 are connected to the processor support circuitry 108 to provide a local processor interface for direct access to the various devices on the SCSI array controller 80.

An advanced drive array controller (ADAC) 116 is preferably the primary data transfer controller in the SCSI array controller 80. The ADAC 116 is connected to transfer buffer RAM 118 which is used for temporary storage of disk data and command packets. The ADAC 116 is connected to the CTB 104 as a master device so that it can control transfer of data from the transfer buffer RAM 118 through the DABM 100, as necessary for read or write cases. The ADAC 116 may also operate as a bus slave to receive commands from additional ADAC units. The ADAC 116 also contains a local processor port connected to the local processor interface 102 to allow it to receive command and control information from the local processor 106. The ADAC 116 further contains two external drive channels, which are drive buses 120 and 122. These are effectively DMA-type buses which are 32 bits wide. A SCSI controller 124, preferably the Fujitsu MB86601 advanced SCSI protocol controller, is connected to the drive bus 120. Similarly, a SCSI controller 126 is connected to the drive bus 122. Each SCSI controller 124 and 126 is connected to a SCSI port 82 and 84, so that SCSI buses 83 and 85 are developed to which are attached SCSI drives 86 and 88, respectively. It is noted that the local processor interface 102 is also connected to the SCSI controllers 124 and 126 so that the local processor 106 can provide direct commands to the SCSI controllers 124 and 126 to allow them to operate.

Additionally, a write cache or posted write unit 128 is connected to the CTB 104. The write cache 128 contains a quantity of battery backed up, parity checked, mirrored CMOS memory which is used to post write data being provided to the SCSI array controller 80. A parity write cache controller 132 is connected to the CTB 104 as a slave so that data can be transferred from the ADAC 116 to the controller 132 to allow proper storage and high speed storage into the RAM 130. Alternatively, the parity write cache controller 132 may also be a bus master and control transfer operations itself. More detailed operation of a similar write cache unit is provided in patent application Ser. No. 894,067, entitled "Posted Write Disk Array System", filed Jun. 5, 1992 and 894,734, entitled "Disk Drive Controller With A Posted Write Cache Memory", filed Jun. 5, 1992, both of which are hereby incorporated by reference.

Figure 3:
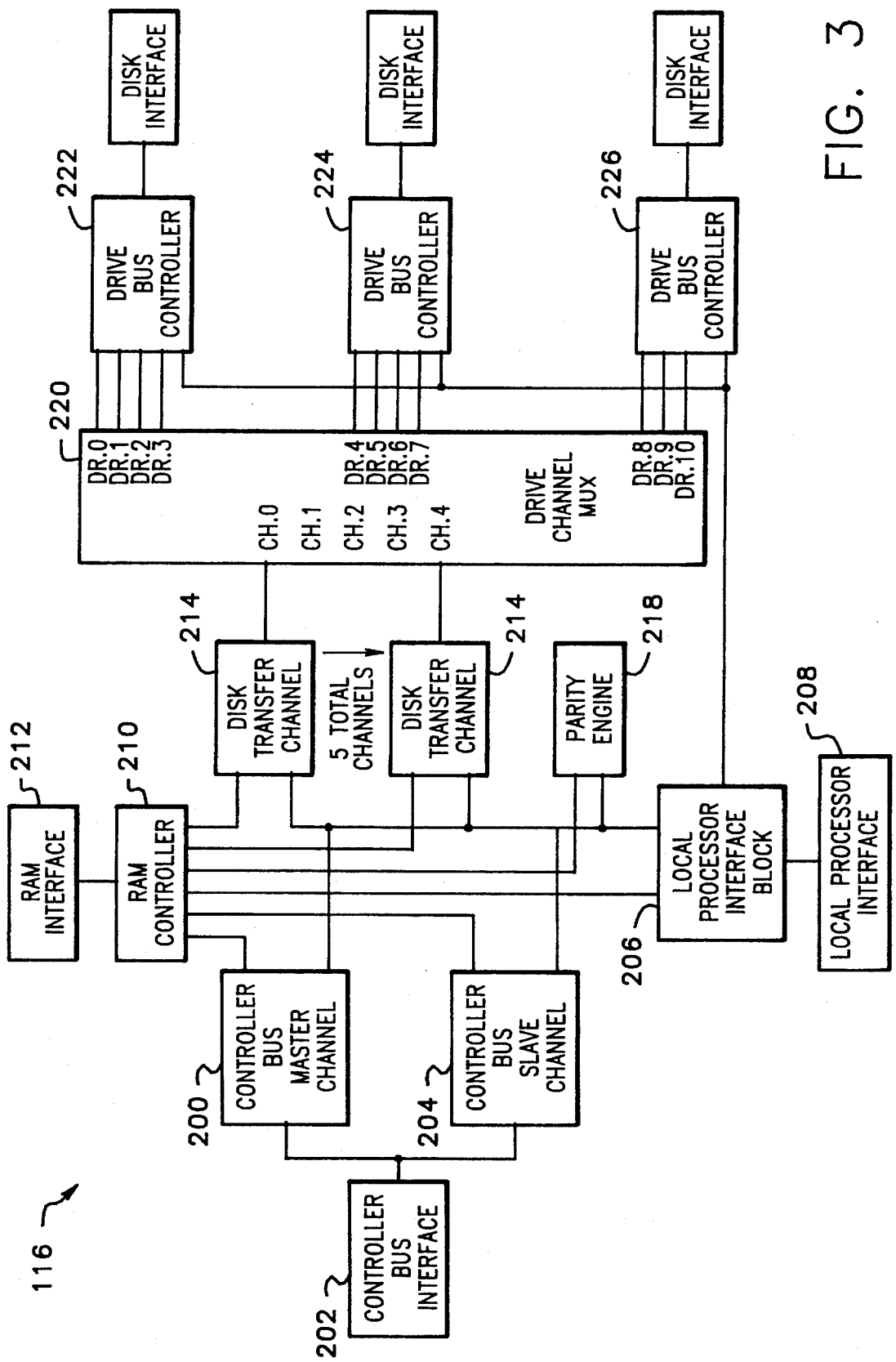
FIG. 3 is a block diagram of the advanced drive array controller of FIG. 2.

FIG. 3 provides a block diagram of the ADAC 116. Certain portions of the ADAC 116 will not be described in detail for the sake of clarity. The primary element of interest in the present application is the bus master channel controller 200. The bus master channel controller 200 is used to control transfers of data from the transfer RAM 118 or various disk transfer channels to the DABM 100 and then the EISA bus 34 for disk read operations and the reverse for disk write operations. It performs numerous novel features as will be explained below. The bus master channel controller 200 is connected to the CTB bus 104 through a bus interface 202. Also connected to the bus interface 202 is a bus slave channel controller 204 to allow the ADAC 116 to operate as a bus slave to another ADAC or other bus master device. A local processor interface block 206 is connected through a local processor interface 208 to the local processor interface bus 102. The local processor interface block 206 contains appropriate registers to allow the local processor 106 to control operations of the ADAC 116. A RAM controller 210 is connected via a RAM interface 212 to the transfer buffer RAM 118. The RAM controller 210 is connected to the bus master channel 200 controller, the bus slave channel controller 204 and the local processor interface block 206. Additionally, a series of 5 disk transfer channels 214 are connected to the RAM controller 210 to allow DMA transfer of information between the transfer buffer RAM 118 and the actual disk drives or in this case to the desired SCSI controllers 124 and 126. Each disk transfer channel 214 includes a FIFO to buffer data transfer. In addition, a parity engine 218 is connected to the RAM controller 210 to allow parity information as commonly used in disk arrays to be readily developed at a very high speed. One of the functions of the RAM controller 210 is to arbitrate between these various sources to allow access to the transfer buffer RAM 118 as necessary. To that end the RAM controller 210 contains an arbitrator and various multiplexers.

The local processor interface block 206 is connected to the slave channel controller 204, the master channel controller 200, the transfer channels 214–216, the parity engine 218 and the RAM controller 210 to control their operations and to pass information to them. The disk transfer channels 214 are connected to a drive channel multiplexer 220, which has 5 input and 11 output channels. Connected to the drive channel multiplexer 220 are three drive bus controllers 222, 224 and 226. These are also DMA controllers that interface in the case of controllers 222 and 224 to the SCSI controllers 124 and 126. They receive data from the drive channel multiplexer 220 and the disk transfer channels 214. Details of similar DMA transfer operations between the drives and the transfer buffer RAM 18 can be found in the patent application entitled "Disk Array Controller With Parity Capabilities", previously incorporated by reference. Reference to the above mentioned application provides a general understanding of how data is transferred from the transfer buffer RAM 118 to the SCSI controllers 124 and 126. The exact details of the ADAC 116 of the present embodiment are slightly different but general operations are similar and the details are not considered relevant to this particular application.

Figure 4:
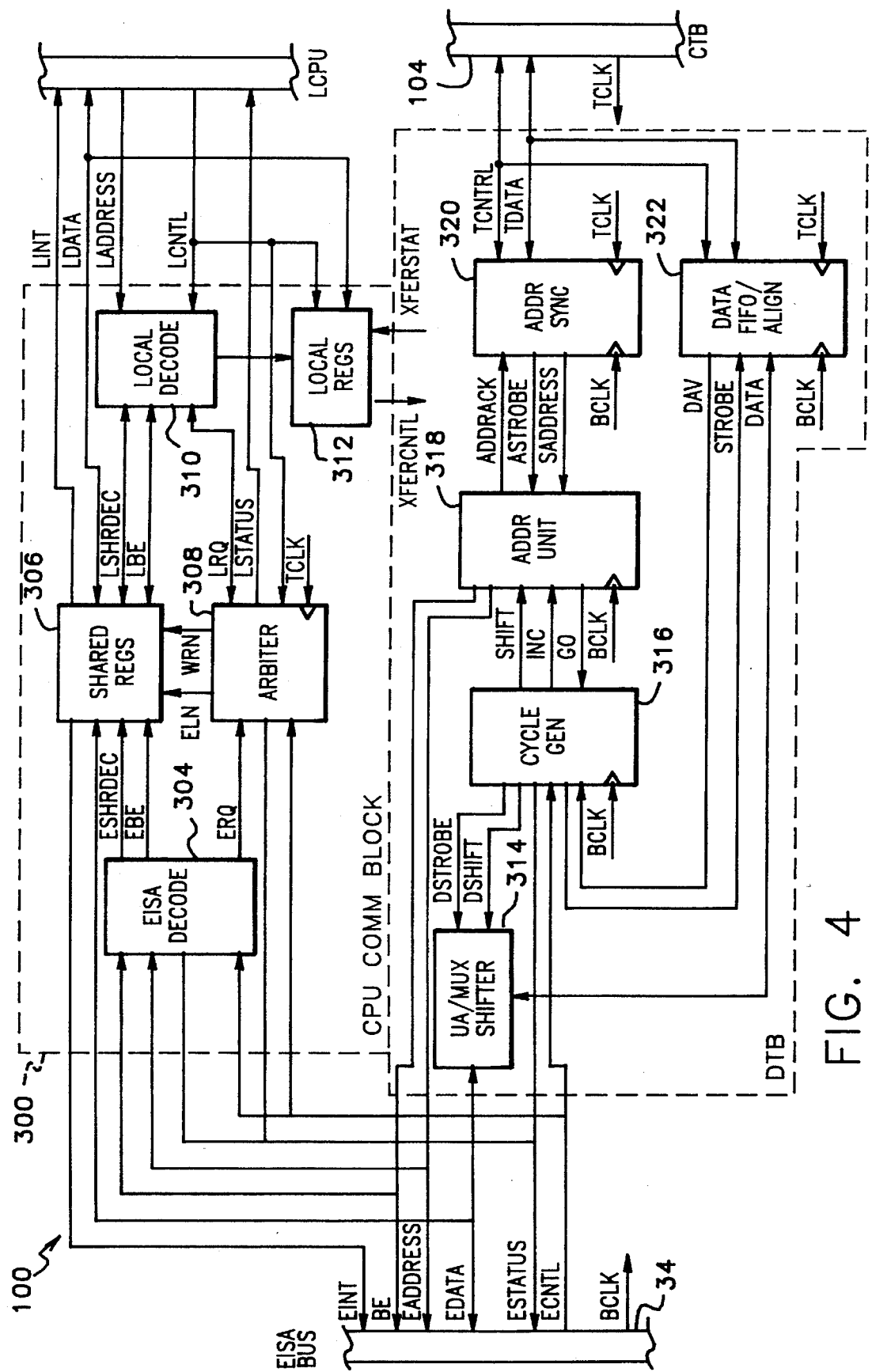
FIG. 4 is a block diagram of the disk array bus master of FIG. 2.
Figure 4A:
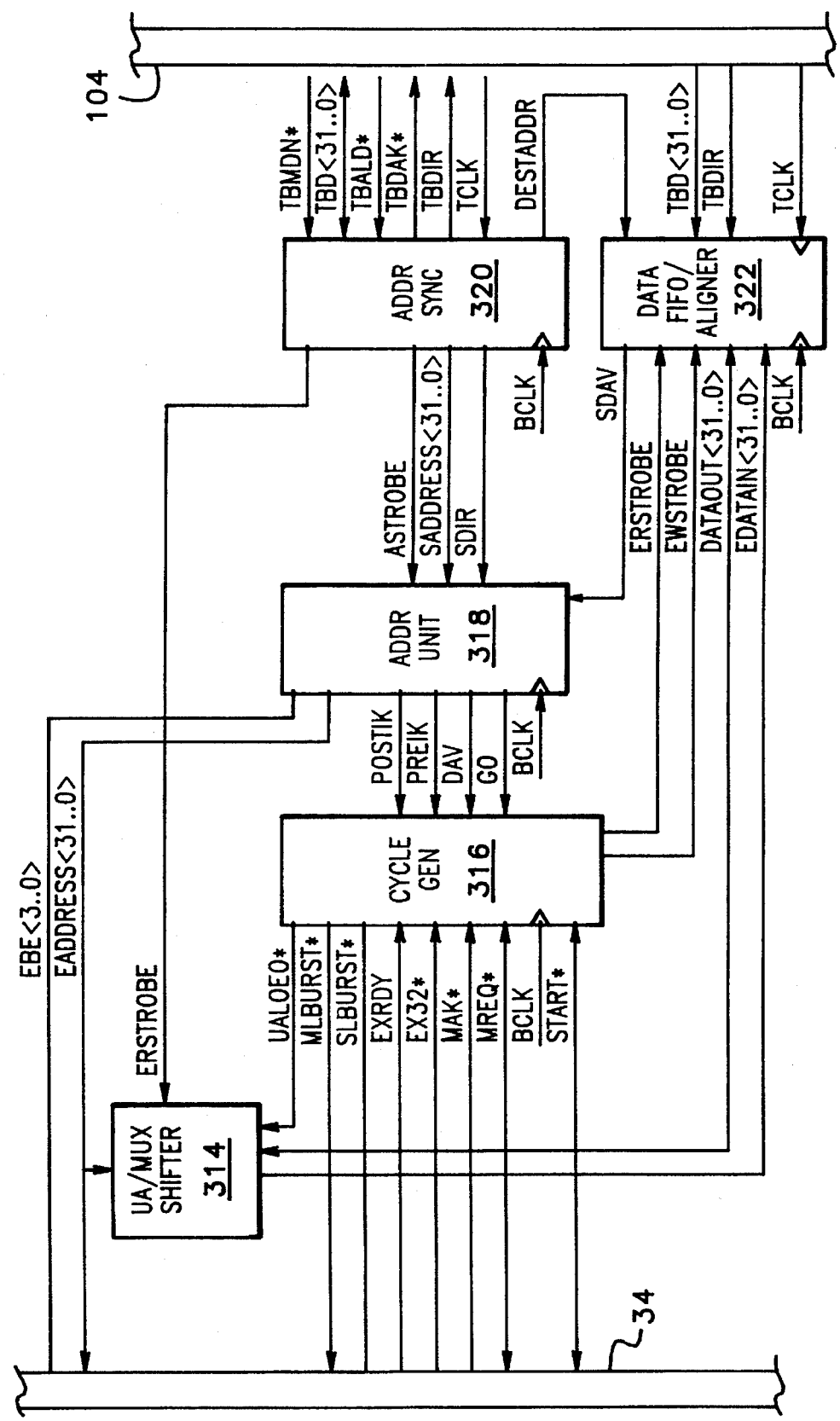
FIG. 4A is a more detailed block diagram of the data transfer portion of the disk array bus master of FIG. 2.

Referring now to FIGS. 4 and 4A, a simplified block diagrams of the DABM 100 are shown. The DABM 100 is a virtual channel EISA bus master interface designed to be a slave to various masters on the CTB 104. Transactions performed on the DABM 100 are programmed through the CTB 104 by the ADAC 116 or other bus masters.

The DABM 100 is generally divided into two parts including a CPU communication block (CCB) 300 coupled between the EISA bus 34 and the local processor interface 102 and a high speed data transfer block (DTB) 302 coupled between the EISA bus 34 and the CTB 104. The CCB 300 is an interrupt driven command path between the microprocessor 20 and the local processor 106 which provides a pathway of shared registers 306, so that the local processor 106 and the microprocessor 20 can send messages and interrupts to each other. The CCB 300 includes EISA decode logic 304 coupled to the EISA bus 34 and further coupled to shared registers 306 and an arbiter 308. The shared registers 306 are connected to the local processor interface 102 and local decode logic 310 and also to the arbiter 308. Further, the CCB 300 includes local registers 312 connected to the local decode logic 310 and to the local processor interface 102.

In general, the arbiter 308 includes a state machine (not shown) which is synchronous to a clock signal referred to as TCLK from the CTB 104, and arbitrates between devices coupled to the EISA bus 34 and the local processor interface 102, to determine which device has access to the shared registers 306 at any given time. The shared registers 306 are fully compatible with the shared register set in the 82355 bus master interface controller (BMIC) by Intel. Request signals are received by the arbiter 308 through the EISA bus 34 and the local processor interface 102 to request access to the shared registers 306. The arbiter 308 simply gives access to the first requester unless both requests are received simultaneously, in which case the local processor 106 through the local processor interface 102 is given priority over a device coupled through the EISA bus 34, such as the microprocessor 20. If the local processor 106 port was last granted access and the microprocessor 20 has an outstanding request, then access is granted to the microprocessor 20.

The EISA decode logic 304 is an EISA slave interface which connects the shared registers 306 of the DABM 100 with the microprocessor 20 and conforms to the EISA specification.

The local decode logic 310 interfaces the shared registers 306 and the local registers 312 with the local processor 106 through the local processor interface 102. The local registers 312 provide the local processor 106 access to transfer channel control and status functions and allow for programming of an I/O select address decode feature. The local registers 312 do not require arbitration.

The DTB 302 portion of the DABM 100 converts cycles on the CTB 104 over to EISA bus 34 master cycles. The maximum data rate is preferably 33 Mbytes per second during EISA burst cycles. The DTB 302 comprises an upper address (UA) MUX/shifter 314 connected to the EISA bus 34, to a cycle generator 316 and to a data FIFO/aligner 322. The cycle generator 316 is also connected to the EISA bus 34 and to the data FIFO/aligner 322 and to an address unit 318. The address unit 318 is connected to the EISA bus 34 and to an address synchronizer 320, which is connected to the CTB 104. The data FIFO/aligner 322 is also connected to the CTB 104.

Data transfers between the CTB 104 and the EISA bus 34 are initiated by an address/count load cycle executed by the ADAC 116 to the DABM 100. A 5-deep bi-directional doubleword-wide FIFO (FIG. 43) within the data FIFO/aligner 322 is provided to transfer data in both directions. After a load cycle is accepted by the DABM 100, the EISA bus 34 is requested and slave status is indicated to the ADAC 116 using a signal referred to as TBSDN. For EISA write transfers, cycles do not occur on the EISA bus 34 unless the FIFO is not empty. If the ADAC 116 stalls, EISA bus 34 cycles stop although the EISA bus 34 is maintained until a programmed stall delay value expires, at which time the EISA bus 34 is released and re-requested. If the data FIFO/aligner 322 becomes full because of EISA bus 34 unavailability or slow EISA memory, then data cycles on the CTB 104 are not acknowledged by the DABM 100. The transfer is considered completed when a byte counter within the DABM 100 reaches 0 or when a master done signal, referred to as TBMDN*, is received from the ADAC 116. If data cycles are performed on the CTB 104 after the transfer completion, then the cycles are not acknowledged by the DABM 100.

For EISA read transfers in general, cycles occur on the EISA bus 34 whenever the FIFO is not full and cycles on the CTB 104 are acknowledged only if the FIFO is not empty.

The data FIFO/aligner 322 is a bi-directional device which synchronizes data between the CTB 104 and the EISA bus 34, shuffles byte lengths to properly align data between the 32-bit buses and informs both of the buses of data availability. The FIFO has the primary function of holding incoming data while control signals are synchronized from one bus to the other. Data arrives at the incoming port and is written into the FIFO synchronous to the incoming clock, if room is available. When data is in the FIFO, a control output is formed synchronous to the outgoing bus clock to indicate that data may be removed from the FIFO. A read is performed synchronous to the outgoing clock which stores the data in the FIFO output holding register. A multiplexer 470 (FIG. 43) at the data input and write/read strobe inputs effectively makes the FIFO bi-directional.

The address synchronizer 320 receives data from the CTB 104 during an address/count load cycle and synchronously loads an EISA address counter and a data counter that reside in the address unit 318, which are further clocked by the BCLK signal on the EISA bus 34.

The address unit 318 incrementally counts EISA addresses, decrementally counts remaining bytes and generates the EISA byte enables. The EISA address counter and the remaining byte counter are synchronously loaded by a command from the address synchronizer 320. The counters change value upon command from the cycle generator 316 and byte enables are formed by combining address and count. The address unit 318 receives data available and direction signals from the address synchronizer 320 and provides corresponding signals to the DAV and DIR signals to the cycle generator 316. Also, once an address is accepted and other conditions are met, a signal referred to as GO is provided to the cycle generator 316 to begin the data transfer. The DABM 100 is able to burst to 1 Kbyte boundaries and provides a signal PRE1K which is asserted on the last byte transfer at a 1 Kbyte boundary. A signal POST1K is asserted on the next byte transfer, indicating a roll-over of the 1 Kbyte boundary.

The cycle generator 316 includes two state machines which work together to access the EISA bus 34 and generate bus cycles. Thus, the cycle generator 316 requests the EISA bus 34 with the MREQ* signal, monitors the EISA bus 34 grant acknowledge signal referred to as MAK*, counts preempt timeout intervals and counts data availability timeout intervals. The UAMUX/shifter 314 reroutes EISA addresses onto the data pins of the DABM 100 during upper address cycles, and shifts EISA data between the word lanes during down shift burst cycles. The address rerouting capability essentially saves address pins and is implemented in a similar manner as the BMIC device by Intel.

Figure 5:
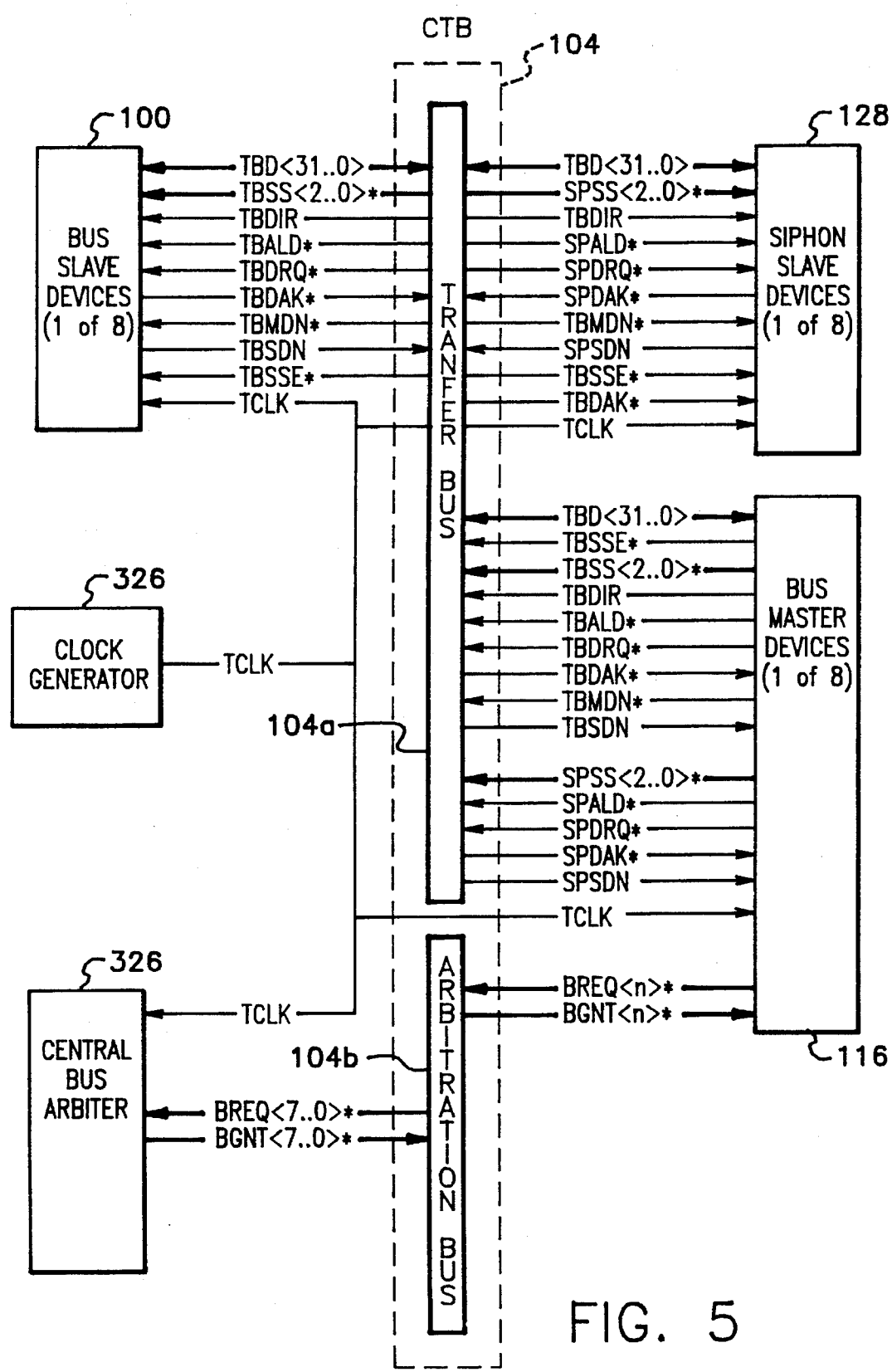
FIG. 5 is a block diagram indicating possible connections and signals on the controller transfer bus of FIG. 2.

Referring now to FIG. 5, the CTB 104 is shown which is capable of high speed block data transfers between multiple bus masters and slaves with minimum arbitration overhead. A clock generator 326 is provided to generate a clock signal TCLK, which preferably operates at 20 MHz. A central bus arbiter 324 is provided which receives bus request signals BREQ<7..0> and provides bus grant signals BGNT<7..0> for assigning ownership of the CTB 104 to one of 8 possible bus masters devices. The CTB 104 comprises a transfer bus 104a and an arbitration bus 104b. The central bus arbiter 324 grants the CTB 104 on a fair and rotational basis. In the preferred embodiment, only one bus master is provided, namely the ADAC 116, only one bus slave is provided, the DABM 100, and only one siphon slave device is optionally provided, the write cache unit 128, so that the central bus arbiter 324 is not necessarily required, although the write cache unit 128 may also operate as a bus master if desired. For purposes of this description, the ADAC 116 is assumed to be a bus master, the DABM 100 to be a bus slave and the write cache device 128 a siphon slave. Thus, the basic mode of the CTB 104 is to allow the ADAC 116 to select bus slaves and perform data transfers. The write cache unit 128 may be selected to siphon data during the data transfer or may master if so controlled.

Advanced modes of operation allow the ADAC 116 to transfer blocks of data to the DABM 100 and the write cache device 128 using a ready handshake. Before each block transfer, the ADAC 116 preferably checks to see if the DABM 100 and the write cache unit 128 are ready to transfer data. If they are ready, the ADAC 116 commences with a block transfer. Otherwise, the ADAC 116 releases the CTB 104. In this manner, the ADAC uses the CTB 104 only when data transfers can occur.

Several signals are defined on the CTB 104 to facilitate handshaking. The CTB 104 includes 32 data signals TBD<31..0>. Transfer bus slave select signals TBSS<2..0>* are driven by the ADAC 116 to select a bus slave. These signals are active low and are decoded to provide 8 different bus slave addresses, although only the DABM 100 is selected in the preferred embodiment. Transfer bus siphon slave select signals SPSS<2..0>* are driven by the ADAC 116 to select a siphon slave, which is preferably the write cache device 128. These signals are active low and are decoded to provide 8 different siphon slave addresses. A transfer bus slave select enable signal TBSSE* is an active low signal asserted by the ADAC 116 to qualify the selection of bus and siphon slaves. The TBSSE* signal is monitored by the DABM 100 and the write cache device 128 to determine if they were selected and should respond to the operations of the ADAC 116.

A transfer bus direction signal TBDIR indicates the direction of the pending or current data transfer. When the TBDIR signal is asserted high by the ADAC 116, data is transferred from the ADAC 116 to the DABM 100 and possibly to the write cache device 128, if selected. When the TBDIR signal is asserted low, data is transferred from the DABM 100 to the ADAC 116 and also possibly to the selected write cache device 128 if selected. A transfer bus slave address load signal TBALD* is an active low signal, which is asserted by the ADAC 116 to request the DABM 100 to accept a memory address, transfer byte count and DABM 100 specific data. A siphon slave address load signal SPALD* is asserted low by the ADAC 116 to request the write cache device 128 to accept a memory address, transfer byte count and write cache device 128 specific data.

A transfer bus slave data request signal TBDRQ* is asserted low by the ADAC 116 to request a data transfer with the DABM 100. A transfer bus slave data acknowledge signal TBDAK* is driven low by the DABM 100 to acknowledge a data transfer. A siphon slave data request signal SPDRQ* is driven low by the ADAC 116 to request a data transfer with the write cache device 128. A siphon slave data acknowledge signal SPDAK* is driven by the write cache device 128 to acknowledge a data transfer.

A transfer bus slave ready/done signal TBSDN is asserted high by the DABM 100 when it is ready to commence transfers, or has safely stored all data previously acknowledged to the proper memory location. A siphon slave ready/done signal SPSDN is asserted high by the write cache device 128 when it is ready to commence transfers or has safely stored all data previously acknowledged to the proper memory location. A transfer bus master done signal TBMDN* is asserted low by the ADAC 116 to indicate to the DABM 100 and the write cache device 128 that the ADAC 116 has finished the current data transfer for the previously supplied starting slave memory address and is going to release the bus.

The CTB 104 generally operates in a variation of one of two modes of operation, referred to as MODE 0 and MODE 1, respectively. These modes of operation involve a mixture of the phases in the general order listed below:
1) CTB 104 Bus Arbitration
2) CTB 104 Bus Enable
3) DABM 100 and Write cache device 128 Slave Selection
4) DABM 100 Load
5) Write cache device 128 Load
6) DABM 100 and Write cache device 128 Ready
7) DABM 100 and Write cache device 128 Data Transfer
8) ADAC 116 Done Indication
9) DABM 100 and Write cache device 128 Done
10) DABM 100 and Write cache device 128 Slave De-selection
11) CTB 104 bus Release Many of the phases occur in the same clock period of the TCLK signal and are overlapped. The distinction between the phases is used for descriptive purposes. Not all phases, particularly the siphon slave portions of the phases performed by the write cache device 128, are required for each CTB 104 operation.

The MODE 0 operation is the basic non-block mode of data transfer and allows up to 64k bytes of data to be transferred between the ADAC 116 and DABM 100. Optionally, MODE 0 allows all data transferred between the ADAC 116 and DABM 100 to be siphoned by the write cache device 128. In MODE 0 operations, the ADAC 116 must be ready to transfer data before selecting the DABM 100. The DABM 100 and the write cache device 128 should always be ready to transfer data when selected.

In general, the ADAC 116 arbitrates for and wins the CTB 104 (arbitration phase). The ADAC 116 enables the CTB 104 (Bus Enable Phase) and selects the DABM 100 and write cache device 128 (slave selection). After selecting these slave devices, the ADAC 116 supplies the DABM 100 memory address, maximum transfer byte count, and DABM 100 specific data to the DABM 100 (DABM 100 load phase). If a siphon operation is desired, the ADAC 116 supplies similar information to the write cache device 128 (write cache device 128 load phase). After supplying the data to the DABM 100 and to the write cache device 128 if selected, the ADAC 116 initiates a data transfer with the DABM 100 (DABM 100 data transfer phase). If a siphon operation is desired, the write cache device 128 siphons data transferred between the DABM 100 and the ADAC 116 (DABM 100 and write cache device 128 data transfer phase). When all the data is transferred, or if the ADAC 116 must release the CTB 104, the ADAC 116 indicates when the transfer is complete (ADAC 116 done phase). If the operation is a DABM 100 write and all data has been transferred, the ADAC 116 waits for the DABM 100 to indicate that all of the data has been safely stored (DABM 100 done phase). If a siphon operation was performed, the ADAC 116 confirms that the write cache device 128 has safely stored all previous data siphoned (DABM 100 and Write cache device 128 done phase). The ADAC 116 then de-selects the DABM 100 and the write cache device 128 (slave de-selection phase) and releases the CTB 104 (CTB 104 bus release phase).

The MODE 0 valid bus phases and proper phase sequences are summarized below:

MODE 0 Non-Block Data Transfer Mode, No siphon operation.
a) CTB 104 Bus Arbitration
b) CTB 104 Bus Enable
c) DABM 100 Selection
d) DABM 100 Load
e) DABM 100 Data Transfer (up to 64K bytes)
f) ADAC 116 Done
g) DABM 100 Done (only if DABM 100 write, and all data has been transferred)
h) DABM 100 De-selection
i) CTB 104 Bus Release MODE 0, Non-Block Data Transfer Mode, with siphon operation.
a) CTB 104 Bus Arbitration
b) CTB 104 Bus Enable
c) DABM 100 and write cache device 128 Slave Selection
d) DABM 100 Load
e) Write cache device 128 Load
f) DABM 100 Data Transfer, write cache device 128 siphon operation (up to 64K bytes)
g) ADAC 116 Done
h) DABM 100 and write cache device 128 Done (only if DABM 100 write, and all data has been transferred)
i) DABM 100 and write cache device 128 Slave De-selection
j) CTB 104 Bus Release MODE 1 is a block mode of operation which is similar to the MODE 0 operation with two exceptions. The first exception is that multiple blocks can be transferred when the DABM 100 asserts the TBSDN signal, or when the write cache device 128 asserts the SPSDN signal, where these ready status signals are asserted and sampled between block transfers. These TBSDN and SPSDN ready status signals are sampled at the beginning of each block transfer, where the ADAC 116 terminates the CTB 104 operation and tries again at a later time if the DABM 100 is not ready to transfer data and if the write cache device 128 is not ready to transfer data, if selected. The size of the block defined for block transfers is the same for both the ADAC 116 and the write cache device 128, and can be communicated via the slave specific data in the DABM 100 and the write cache device 128 load cycles. These signals are also used to convey the DABM 100 and the write cache device 128 done status, depending on the state of the CTB 104 operation, as described later.

The second exception involves the DABM 100 and the write cache device 128 done status. In MODE 0, the ADAC 116 continues to wait for the SPSDN signal. In MODE 1, the ADAC 116 waits a programmable number of clocks from the assertion of the TBMDN* signal for the TBSDN signal to be asserted, and during siphon operations, for the SPSDN signal to be asserted. If the slaves do not indicate they are done, the ADAC 116 de-selects the slaves, releases the CTB 104, and tries again at a later time to obtain done status indications from the slaves.

The MODE 1 valid bus phases and proper phase sequences are summarized below:

MODE 1, the DABM 100 is ready, Siphon operation is not desired:
a) CTB 104 Bus Arbitration
b) CTB 104 Bus Enable
c) DABM 100 Selection
d) DABM 100 Load
e) DABM 100 Ready (DABM 100 is ready)
f) DABM 100 Data Transfer (1 block of data)
g) repeat steps e) & f) until the DABM 100 is not ready or up to 64K bytes have been transferred or the ADAC 116 needs to relinquish the CTB 104
h) ADAC 116 Done
i) DABM 100 Done (if all data transferred and if DABM 100 write operation)
j) DABM 100 De-selection
k) CTB 104 Bus Release MODE 1, DABM 100 is not ready, Siphon operation is not desired:
a) CTB 104 Bus Arbitration
b) CTB 104 Bus Enable
c) DABM 100 Selection
d) DABM 100 Load
e) DABM 100 Ready (DABM 100 is not ready within eight clocks)
f) ADAC 116 Done
g) DABM 100 De-selection
h) CTB 104 Bus Release MODE 1, DABM 100 is ready, Write cache device 128 is ready:
a) CTB 104 Bus Arbitration
b) CTB 104 Bus Enable
c) DABM 100 and write cache device 128 Slave Selection
d) DABM 100 Load
e) Write Cache device 128 Load
f) DABM 100 and Write cache device 128 Ready (Both are ready within eight clocks)
g) DABM 100 and write cache device 128 Data Transfer (1 block of data)
h) repeat steps f) & g) until the DABM 100 or the write cache device 128 is not ready, or up to 64K bytes have been transferred, or the ADAC 116 needs to relinquish the CTB 104
i) ADAC 116 Bus Master Done
j) DABM 100 and Write cache device 128 Done slave write operation)
k) DABM 100 and write cache device 128 Slave De-selection
l) CTB 104 Bus Release MODE 1, DABM 100 is not ready or Write cache device 128 is not initially ready:
a) CTB 104 Bus Arbitration
b) CTB 104 Bus Enable
c) DABM 100 and write cache device 128 Slave Selection
d) DABM 100 Load
e) Write cache device 128 Load
f) DABM 100 and Write cache device 128 Ready (either slave is not ready within eight clocks)
g) ADAC 116 Done
h) DABM 100 and write cache device 128 Slave De-selection i) CTB 104 Bus Release The CTB 104 Enable Phase requires one TCLK period. The ADAC 116 starts the CTB 104 enable phase immediately after detecting it has won the CTB 104. In the CTB 104 enable phase, the ADAC 116 negates the TBALD*, SPALD*, TBDRQ*, SPDRQ*, TBSSE*, and TBMDN* master control signals. The TBDIR signal is asserted to indicate the direction of the pending data transfer. The DABM 100 select signals, TBSS<2..0>* and, if desired, the SPSS<2..0>, signals are driven with the values to select the appropriate slave(s) for the pending operation. The TBD<31..0> signals are not driven by the ADAC 116, the DABM 100 or the write cache device 128 during this phase. The DABM 100 and the write cache device 128 signals are also not driven during this phase.

The purpose of the CTB 104 enable phase is to allow one TCLK period for the TBSS<2..0>* and SPSS<2..0>* slave select signals to settle prior to selecting a slave with the TBSSE* signal. Since the slave select signals are encoded, the slave has sufficient time to decode the slave select signals prior to driving any CTB 104 signals, thus avoiding any possible bus contention between slaves.

The slave selection phase requires one TCLK period and may begin immediately or several TCLK periods after the CTB 104 enable phase. For maximum bus efficiency, the ADAC 116 should start the slave selection phase in the TCLK period immediately following the CTB 104 enable phase.

The slave selection phase starts in the clock period in which the ADAC 116 asserts the TBSSE* signal. The TBSSE* signal is used by the slaves to qualify the slave select signals, TBSS<2..0>*, or SPSS<2..0>* and also to enable bus drivers. If the DABM 100 detects a valid TBSS<2..0>* slave address and the TBSSE* signal is asserted, the DABM 100 should enable its drivers for the TBDAK* and TBSDN signals. Likewise, if the write cache device 128 detects a valid SPSS<2..0>* slave address and the TBSSE* signal is asserted, the write cache device 128 should drive the SPDAK* and SPSDN signals to their appropriate values.

The ADAC 116 continues to assert the TBSSE* signal throughout the CTB 104 operation until the slave de-selection phase.

The DABM 100 Load Phase begins when the CTB 104 master asserts the TBALD* signal. This phase may start at the same time as the DABM 100 selection phase since the ADAC 116 may assert both the TBALD* and TBSSE* signals in the same TCLK period.

Coincident with the assertion of the TBALD* signal, the ADAC 116 drives a 32-bit memory byte address onto the TBD<31..0> data lines. TBD<31> represents the most significant bit (MSB) of the address and TBD<0> represents the least significant bit (LSB) of the address. The DABM 100 does not need to immediately accept the address and may insert load wait states by keeping the TBDAK* signal negated until ready to accept the address. The address is accepted by the DABM 100 when the TBDAK* signal is detected active over a rising edge of the TCLK signal by the ADAC 116. After detecting the address has been accepted, the ADAC 116 immediately drives a maximum transfer byte count value and any DABM 100 specific data onto the TBD<> signals. The maximum transfer byte count is placed on TBD<15..0>, with the MSB of the count on TBD<15> and the LSB of the count on TBD<0>. The DABM 100 specific data is placed on TBD<31..16> signals and contains specific instructions to the DABM 100. If the ADAC 116 has no knowledge of specific data required by the DABM 100, the ADAC 116 drives the DABM 100 specific data to zeros. As with the address, the DABM 100 need not immediately accept the maximum transfer byte count and DABM 100 specific data, and may insert load wait states by keeping the TBDAK* signal negated. The DABM 100 accepts the count and DABM 100 specific data by asserting the TBDAK* signal over the rising edge of the TCLK signal. When the ADAC 116 detects the count and DABM 100 specific data acknowledge over the rising edge of the TCLK, it immediately negates the TBALD* signal. The DABM 100 negates the TBDAK* signal when the TBALD* signal is negated by the ADAC 116.

A one clock grace period during DABM 100 reads follows the negation of the TBALD* signal by the ADAC 116. If the TBDIR signal indicates a DABM 100 read is pending, and a write cache device 128 load cycle is not pending, the ADAC 116 releases the TBD<> signals coincident with negating the TBALD* signal and waits at least one TCLK period prior to asserting the TBDRQ* signal. The DABM 100 uses the TBDRQ* signal, which is a valid slave selection or data request signal, and the TBDAK* signal to enable its drivers for the TBD<> signals during slave reads. This one TCLK grace period ensures that the ADAC 116 and the DABM 100 are not driving the TBD<> signals during the same TCLK period.

The write cache device 128 load phase begins when the ADAC 116 asserts the SPALD* signal. This phase, if used, always occurs after the DABM 100 load phase and before any pending data transfer operation. The write cache device 128 load phase, however, may begin when the TBALD* signal is negated during the DABM 100 load phase.

Coincident with the assertion of the SPALD* signal, the ADAC 116 drives a 32-bit write cache device 128 memory byte address onto the TBD<31..0> signals. TBD<31> represents the MSB of the address and TBD<0> represents the LSB of the address. The write cache device 128 need not immediately accept the address and may insert load wait states by keeping the SPDAK* signal negated until ready to accept the address. The address is accepted by the write cache device 128 when the SPDAK, signal is detected active over a rising edge of the TCLK by the ADAC 116. After detecting the address has been accepted, the ADAC 116 immediately drives a maximum transfer byte count value and any write cache device 128 specific data onto the TBD<> signals. The maximum transfer byte count is placed on the TBD<15..0> signals, with the MSB of the count on TBD<15> and the LSB of the count on TBD<0>. The write cache device 128 specific data is placed on the TBD<31..16> signals and contains specific instructions to the write cache device 128. If the ADAC 116 has no knowledge of specific data required by the write cache device 128, the ADAC 116 drives the write cache device 128 specific data to zeros. As with the address signals, the write cache device 128 need not immediately accept the maximum transfer byte count and the write cache device 128 specific data, and may insert load wait states by keeping the SPDAK* signal negated. When the ADAC 116 detects the count and write cache device 128 specific data acknowledge over the rising edge of the TCLK signal, it immediately negates the SPALD* signal. The DABM 100 negates the SPDAK* signal when the SPALD* signal is negated by the ADAC 116.

On DABM 100 reads, a one TCLK grace period follows the negation of the SPALD* signal by the ADAC 116. If the TBDIR signal indicates a DABM 100 read is pending, the ADAC 116 releases the TBD<> signals coincident with negating the SPALD* signal and waits at least one TCLK period prior to asserting the TBDRQ* or the SPDRQ* signals. The DABM 100 uses the TBDRQ* signal, a valid DABM 100 selection, and the TBDAK* signal to enable its drivers for the TBD<> signals during slave reads. This one TCLK grace period ensures that the ADAC 116 and DABM 100 are not driving the TBD<> signals during the same TCLK period.

The slave ready phase is used by the ADAC 116 to maximize bus efficiency and is only used in MODE 1 operations. The ADAC 116 determines if the slaves are ready to deliver or accept a block of data prior to initiating or continuing a data transfer operation. If the slaves are ready, the ADAC 116 initiates a data transfer operation. If the slaves are not ready, the ADAC 116 releases the CTB 104. If the DABM 100 does not drive the TBSDN signal, the ADAC 116 interprets the DABM 100 as always being ready or done. Similarly, if the write cache device 128 does not drive the SPSDN signal, the ADAC 116 interprets the write cache device 128 as always being ready or done.

The slave ready phase occurs just prior to the data transfer phase and first occurs at the end of the DABM 100 or write cache device 128 load phase, whichever is later. If the DABM 100 supports the CTB 104 ready phase, the DABM 100 drives the TBSDN signal to a valid state when the DABM 100 asserts the TBDAK* signal to accept the transfer byte count and the DABM 100 specific data. If the DABM 100 had indicated it was not ready by negating the TBSDN signal, the ADAC 116 waits the programmed number of TCLK periods to determine if the DABM 100 may become ready to transfer a block of data. If the DABM 100 does not become ready within the programmed number of TCLK periods, the ADAC 116 asserts the TBMDN* signal, de-selects the slave and releases the CTB 104. If the DABM 100 does become ready, the ADAC 116 proceeds with a DABM 100 block data transfer. If more than one block of data is to be transferred, the ADAC 116 enters the DABM 100 ready phase after completing each block data transfer. On the TCLK period after the last transfer of the previous data block, the DABM drives the TBSDN signal to the correct value since the ADAC 116 may check the TBSDN signal during this time to determine if the DABM 100 is able to complete another block transfer. If the DABM 100 had driven TBSDN low, the ADAC waits the programmed number of TCLK periods from this time for the DABM 100 to become ready. If the DABM 100 does not become ready within the TCLK periods, the ADAC 116 asserts the TBMDN* signal, de-selects the slave and releases the CTB 104. If the DABM 100 does become ready, another block of data is transferred. The CTB 104 and write cache device 128 ready phase is similar to the DABM 100 ready phase, except for the following differences:

1) The TBSDN and SPSDN signals are checked for the first time following the write cache device 128 load phase. The same TCLK timeout period for both slaves to become ready is used with the starting point being the transfer byte count SPDAK* of the write cache device 128 load phase.

2) The ready timeout period for in-between data block transfers starts during the TCLK period after the last transfer of the data block between the DABM 100 and the ADAC 116, or during the last transfer of the data block siphoned by the write cache device 128, whichever occurred last. Both the TBSDN and SPSDN signals must be high before the ADAC 116 initiates the next data block transfer. If either of these signals are low for the duration of the TCLK timeout period, the ADAC 116 asserts the TBMDN* signal, de-selects the slaves and releases the CTB 104.

The DABM 100 Transfer Phase starts when the ADAC 116 asserts the TBDRQ* request signal. The DABM 100 transfer phase may only begin after a DABM 100 load phase or after a write cache device 128 load phase, if selected.

If the TBDIR signal indicates a DABM 100 write, and a write cache device 128 load phase is not required, the TBDRQ* signal may be asserted as soon as the TBALD* signal is negated at the end of the DABM 100 load phase.

If the TBDIR signal indicates a DABM 100 write, and a write cache device 128 load phase is required, the TBDRQ* signal may be asserted as soon as the SPALD* signal is negated at the end of the write cache device 128 load phase. If the TBDIR signal indicates a DABM 100 read, and a write cache device 128 load phase is not required, the TBDRQ* signal may not be asserted any sooner than one TCLK period after the TBALD* signal is negated at the end of the DABM 100 load phase. If the TBDIR signal indicates a DABM 100 read, and a write cache device 128 load phase is required, the TBDRQ* signal may not be asserted any sooner than one TCLK period after the SPALD* signal is negated at the end of the write cache device 128 load phase.

A data transfer occurs when the DABM 100 acknowledges the TBDRQ* signal with the TBDAK* signal. Both the TBDRQ* and TBDAK* signals are asserted over a rising edge of the TCLK signal constitute a single transfer. A burst transfer occurs when the TBDRQ* and TBDAK* signals are asserted over consecutive rising edges of the TCLK signal. This protocol allows either the ADAC 116 or the DABM 100 to insert wait states in the data transfer. If the ADAC 116 needs to pause, the ADAC 116 negates the TBDRQ* signal until ready to resume transfers. Likewise, the DABM 100 does not respond to the TBDRQ* signal by asserting the TBDAK* signal until ready to transfer data.

If the TBDIR signal is asserted high, indicating a transfer from the ADAC 116 to the DABM 100, the ADAC 116 drives data on the TBD<> signals only if the TBDRQ* signal is asserted. If the TBDIR signal is asserted low, indicating a transfer from the DABM 100 to the ADAC 116, the DABM 100 only drives data onto the TBD<> signals when both the TBDRQ* and TBDAK* signals are asserted. The DABM 100 should qualify its TBD<> signal driver enables with valid TBSS<2..0>* signals, and by asserting the TBSSE*, TBDRQ*, TBDAK* and TBDIR signals low.

The DABM 100 transfer phase ends when the TBMDN* signal is asserted over one rising edge of the TCLK signal. The TBMDN* signal may occur as soon as the TCLK period following the last data transfer, but not sooner. After the TBMDN* signal is asserted, the TBDRQ* signal may not be asserted again until a DABM 100 load phase has occurred.

A siphon operation is transparent to the DABM 100. Therefore, as far as the DABM 100 is concerned, the DABM 100 data transfer phase appears identical to the CTB 104 and write cache device 128 data transfer phases. The ADAC 116, however, drives or samples two sets of control signals for siphon operations. One set is for data transfers with the DABM 100, and consists of the TBDRQ* signal asserted by the ADAC 116 and the TBDAK* signal asserted by the DABM 100 and sampled by the ADAC 116. The other set of control signals is for the write cache device 128 and consists of the SPDRQ* signal, asserted by the ADAC 116, and the SPDAK* signal, asserted by the write cache device 128 and sampled by the ADAC 116. Data is transferred on the TBD<> data lines by the DABM 100 and the ADAC 116. The write cache device 128 samples, but does not drive the TBD<> signals.

For DABM 100 writes, the ADAC 116 asserts both the TBDRQ* and SPDRQ* signals to indicate a data transfer is pending. The ADAC 116 also drives data on the TBD<> signals coincident with either the TBDRQ* or SPDRQ* signals. A single transfer occurs when the DABM 100 asserts the TBDAK* signal and the write cache device 128 asserts the SPDAK* signal over the rising edge of the TCLK signal in response to the assertion of the TBDRQ* and SPDRQ* signals. The DABM 100 stores data presented on the TBD<> data signals when it detects the TBDRQ* and TBDAK* signals asserted over the rising edge of the TCLK signal. Likewise, the write cache device 128 stores the TBD<> data when it detects the SPDRQ* and SPDAK* signals asserted over the rising edge of the TCLK signal.

For DABM 100 writes, the DABM 100 and write cache device 128 need not acknowledge their respective data requests in the same TCLK period. If the DABM 100 acknowledges by asserting TBDAK* signal, and the write cache device 128 does not acknowledge by not asserting the SPDAK* signal, the ADAC 116 negates the TBDRQ* signal and maintains the SPDRQ* signal asserted until the DABM 100 eventually acknowledges by asserting the SPDAK* signal. Likewise, the ADAC 116 throttles the write cache device 128 if the DABM 100 is slower than the write cache device 128 in responding to a data transfer request. A burst transfer occurs when the TBDRQ*, SPDRQ*, TBDAK*, and SPDAK* signals are asserted over consecutive rising edges of the TCLK signal. The ADAC 116 can throttle the siphon operation by negating both the TBDRQ* signal and the SPDRQ* signal until ready to resume the data transfer.

Figure 6:
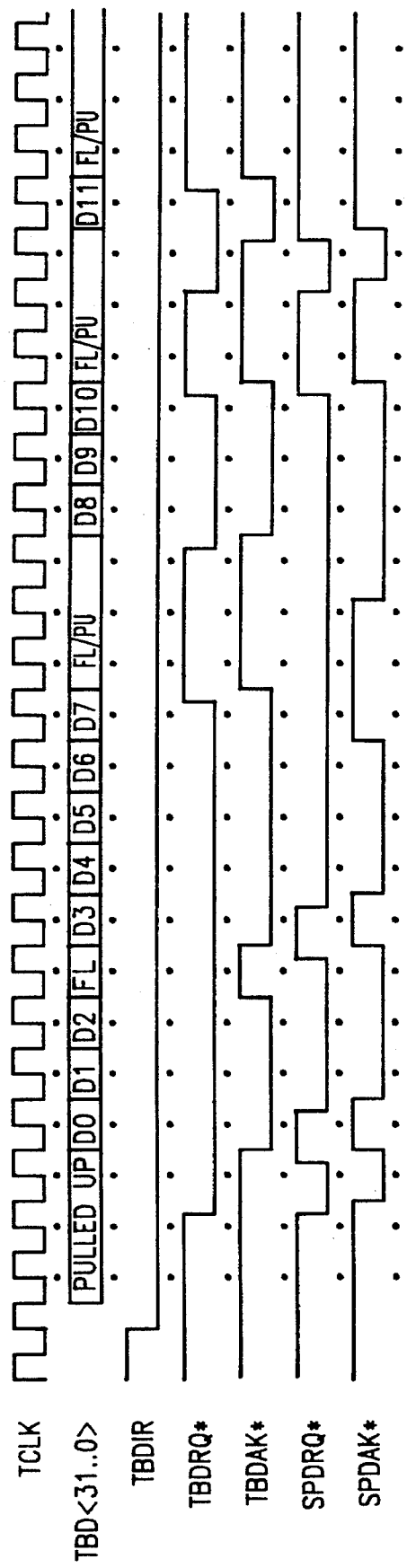
FIGS. 6–11 are timing diagrams of operations on the controller transfer bus of FIG. 2.

For DABM 100 reads, the DABM 100 drives data on the TBD<> signals each time it asserts the TBDAK* signal in response to the assertion of the TBDRQ* signal. The ADAC 116 stores the TBD<> data when the TBDRQ* and TBDAK* signals are both asserted over the rising edge of the TCLK signal. The write cache device 128 stores the TBD<> data when the TBDAK* signal is detected asserted over the rising edge of the TCLK signal instead of the SPDRQ* and SPDAK* signals, as in the DABM 100 write case. This is required because the DABM 100 drives the TBD<> signals instead of the ADAC 116. The ADAC 116 performs the same throttle protocol as in the DABM 100 write case and the write cache device 128 uses the SPDAK* signals to throttle the transfer but not to accept data. The write cache device 128 must be able to accept two transfers when acknowledging the SPDRQ* signal by asserting the SPDAK* signal. FIG. 6 is a timing diagram which displays a read by the DABM 100 with a siphon operation. The timing diagram in FIG. 6 shows an example of the DABM 100, the write cache device 128 and the ADAC 116 throttling the data transfer. The "*" symbols within the TBDAK* signal indicate where both the ADAC 116 and write cache device 128 are storing DABM 100 data.

The ADAC 116 done phase indicates to the CTB 104 and to the write cache device 128 that the current bus operation is complete and no more data transfers occur prior to a DABM 100 load phase and write cache device 128 load phase. The TBMDN* signal is asserted by the ADAC 116 for a minimum of one TCLK period. For both MODE 0 and MODE 1 bus operations, the TBMDN* signal may be asserted as soon as the TCLK period following the last data transfer, or several TCLK periods after the last data transfer. The ADAC 116 asserts TBMDN signal as soon as possible after the last data transfer for maximum bus efficiency. For MODE 1 operations, the TBMDN* signal may also be asserted if the DABM 100 or the write cache device 128 fails to become ready after a CTB 104 or write cache device 128 load phase or after a data block transfer.

The DABM 100 done phase is used by the DABM 100 to communicate that all data received from the ADAC 116 has been safely stored to its final destination. This phase is particularly important if the DABM 100 is providing a gateway to another bus. For MODE 0 operations, the DABM 100 done phase is only used on the DABM 100 writes when data is actually transferred from the ADAC 116 to the DABM 100e This phase begins immediately when the ADAC 116 asserts the TBMDN* signal and ends when the DABM 100 asserts the TBSDN signal over the rising edge of the TCLK signal. The ADAC 116 starts sampling the TBSDN signal one TCLK period after the TBMDN* signal is asserted. If the DABM 100 does not assert the TBSDN signal, the ADAC 116 hangs the CTB 104.

In MODE 1, the DABM 100 done phase starts each time the ADAC 116 asserts the TBMDN* signal and ends eight TCLK periods later, or when the DABM 100 asserts the TBSDN signal high, whichever occurs first. The ADAC 116 starts sampling the TBSDN signal one TCLK period after the TBMDN* signal is asserted. If the DABM 100 does not assert the TBSDN signal, the ADAC 116 de-selects the DABM 100, releases the CTB 104 and tries again to obtain done status from the DABM 100. The ADAC 116 does this by regaining the CTB 104, selecting the DABM 100, and performing a DABM 100 load phase. The transfer byte count given during this load phase is zero, indicating that the ADAC 116 is seeking done status for a previous bus operation. The slave specific data provided to a slave may also include a unique tag to identify the previous bus operation. The ADAC 116 asserts the TBMDN* signal no sooner than the TCLK period after the end of the DABM 100 load phase. If the DABM 100 has not finished the previous bus operation, the DABM 100 should negate the TBSDN signal by the TCLK period after the ADAC 116 asserts the TBMDN* signal. If the DABM 100 does not indicate it has finished the previous bus operation within eight clocks after the TBMDN* signal was asserted, the ADAC 116 deselects the DABM 100, releases the CTB 104 and tries again to obtain done status from the DABM 100. The ADAC 116 may attempt several times to obtain done status from the DABM 100 before succeeding.

Note that the TCLK timeout period ends when the DABM 100 is de-selected. The DABM 100 may not indicate being done, if the DABM 100 asserted the TBSDN signal in the same TCLK period that the DABM 100 was de-selected. The ADAC 116 recognizes the DABM 100 is done when the TBSDN signal is asserted over the rising edge of the TCLK signal and while the TBSSE* signal is also asserted.

The CTB 104 and write cache device 128 done phase is similar to the DABM 100 done phase with the following two exceptions:

1) In MODE 0 or MODE 1, the ADAC 116 sees both the TBSDN signal asserted high and the SPSDN signal asserted before considering the CTB 104 operation complete.

2) In MODE 1, if either the DABM 100 is done or the write cache device 128 is done, but both are not done within the timeout period, the ADAC 116 remembers which slave was done. The ADAC 116 then only re-selects the slave which was not done in order to obtain done status from that slave. This requirement is necessary since when a slave indicates done within the timeout period, the slave can clear any tags associated with the CTB 104 operation. Note that the timeout period ends when the slaves are de-selected. The slave can not consider having indicated done, if the slave asserted the TBSDN or SPSDN signals in the same TCLK period the slave was deselected. The ADAC 116 recognizes the slave is done when the TBSDN or SPSDN signals are asserted over the rising edge of the TCLK signal and while the TBSSE* signal is also asserted.

In the slave de-selection phase, the ADAC 116 negates the TBALD*, SPALD*, TBDRQ*, SPDRQ*, TBMDN*, and TBSSE* signals. The ADAC 116 maintains the TBSS<2..0>* and SPSS<2..0>* signals stable until the phase ends at the next rising edge of the TCLK signal. This phase ensures that the critical bus master control signals are inactive and remain inactive when the CTB 104 is released. It also ensures that the DABM 100 is de-selected by negating the TBSSE* signal prior to changing the slave select signals. This removes any possibility of two slaves driving the TBDAK*, SPDAK*, TBSDN* or SPSDN* signals at the same time. In the bus release phase, the ADAC 116 stops driving all bus master output signals.

Figure 7:
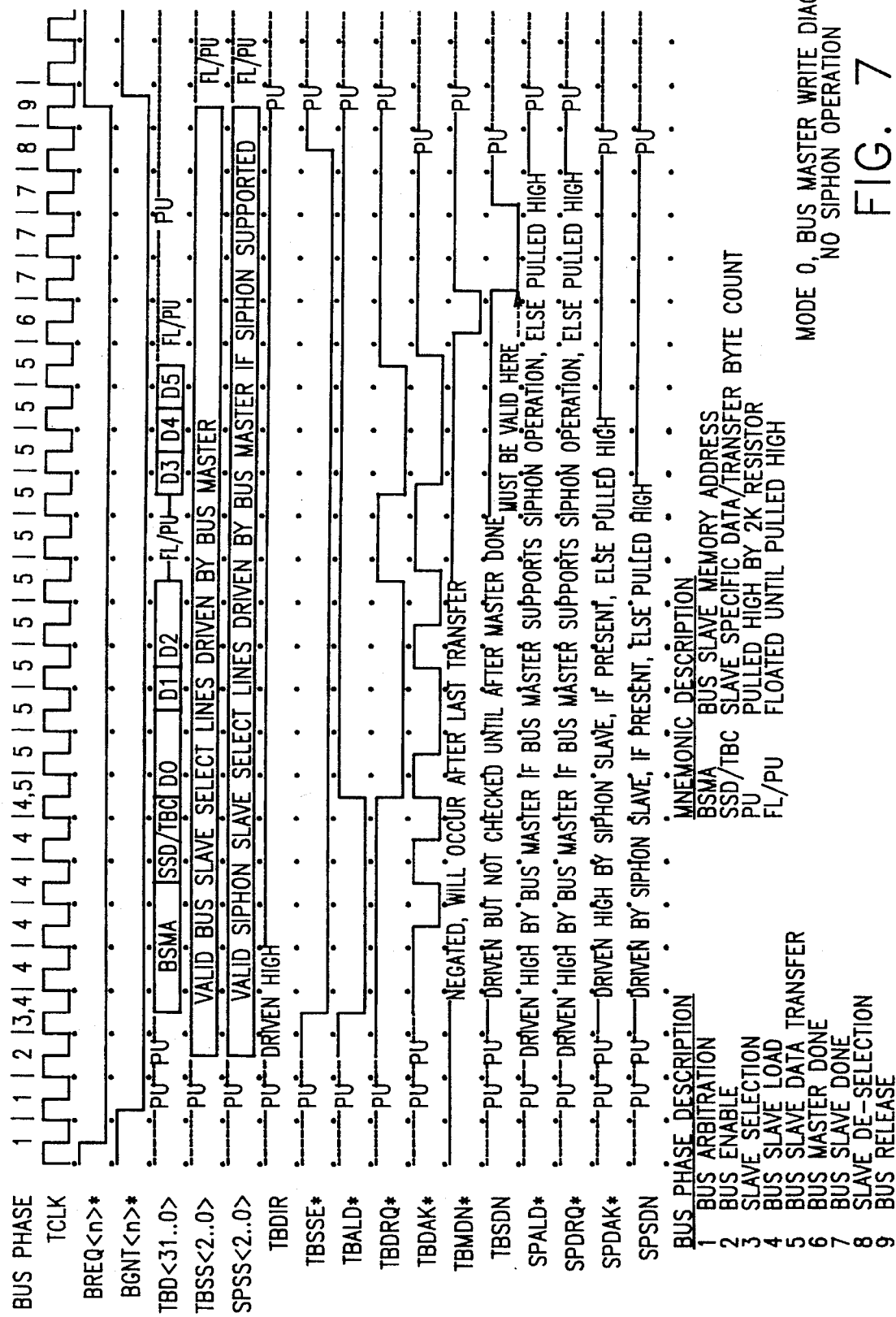

FIG. 7 is a timing diagram illustrating the control sequence for a MODE 0 transfer from a bus master to a bus slave, which is referred to as a bus master write. A siphon operation is not being performed. Bus phase and mnemonic descriptions are shown at the bottom of FIGS. 7–11.

Figure 8:
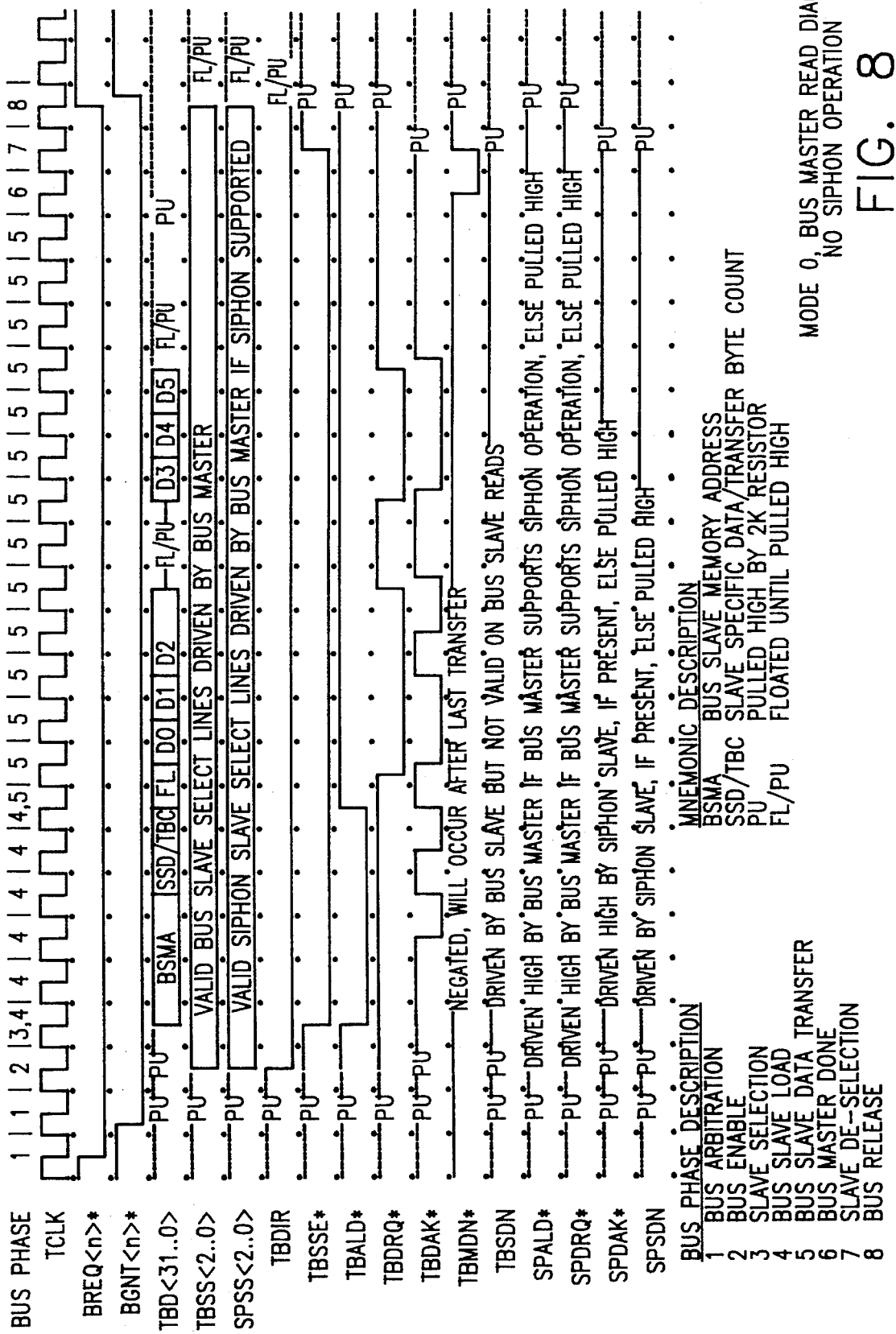

FIG. 8 is a timing diagram illustrating the control sequence for a MODE 0 transfer from a bus slave to a bus master, which is referred to as a bus master read. A siphon operation is not being performed.

Figure 9:
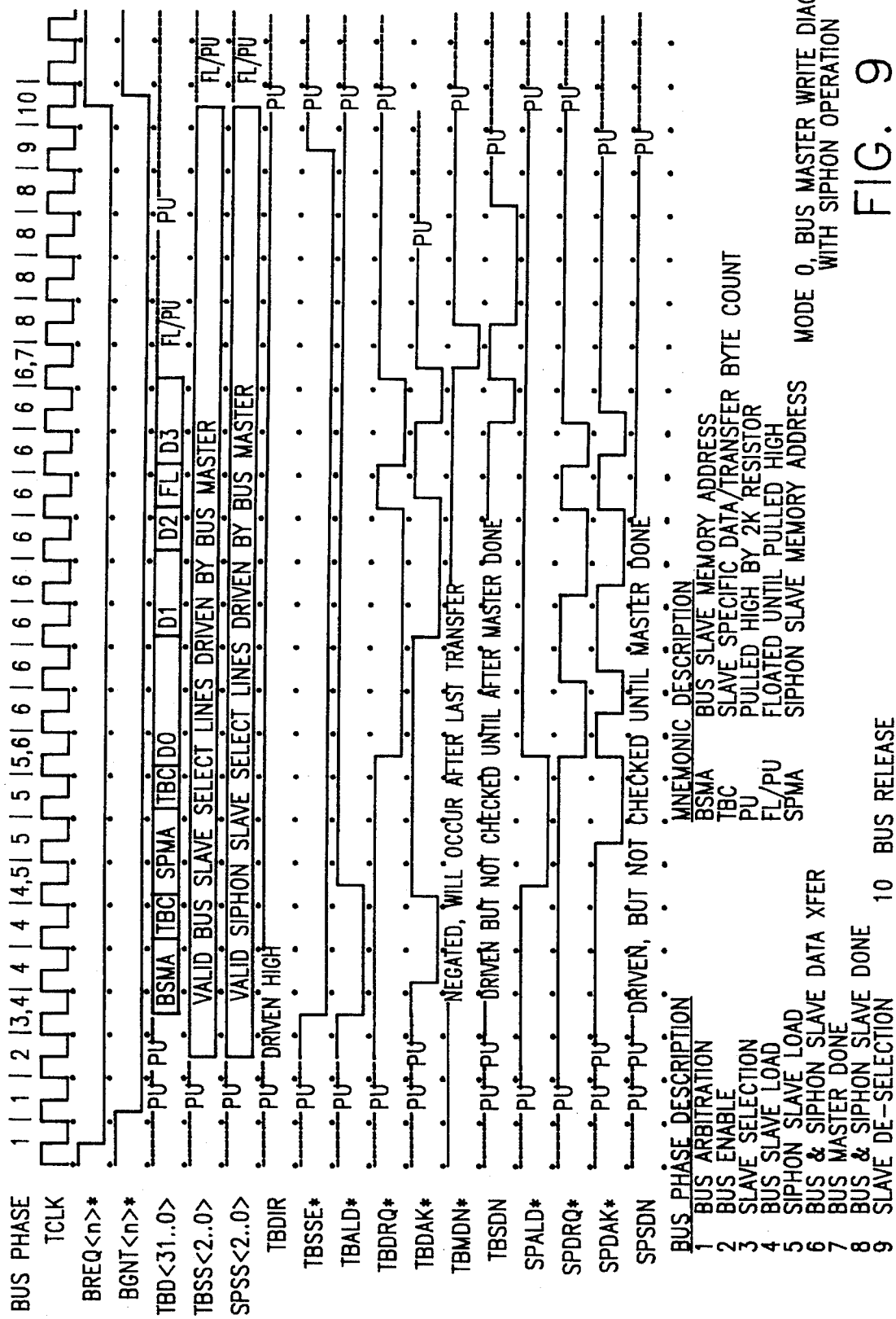

FIG. 9 is a timing diagram illustrating the control sequence for a MODE 0 transfer from a bus master to a bus slave, with a siphon operation.

Figure 10:
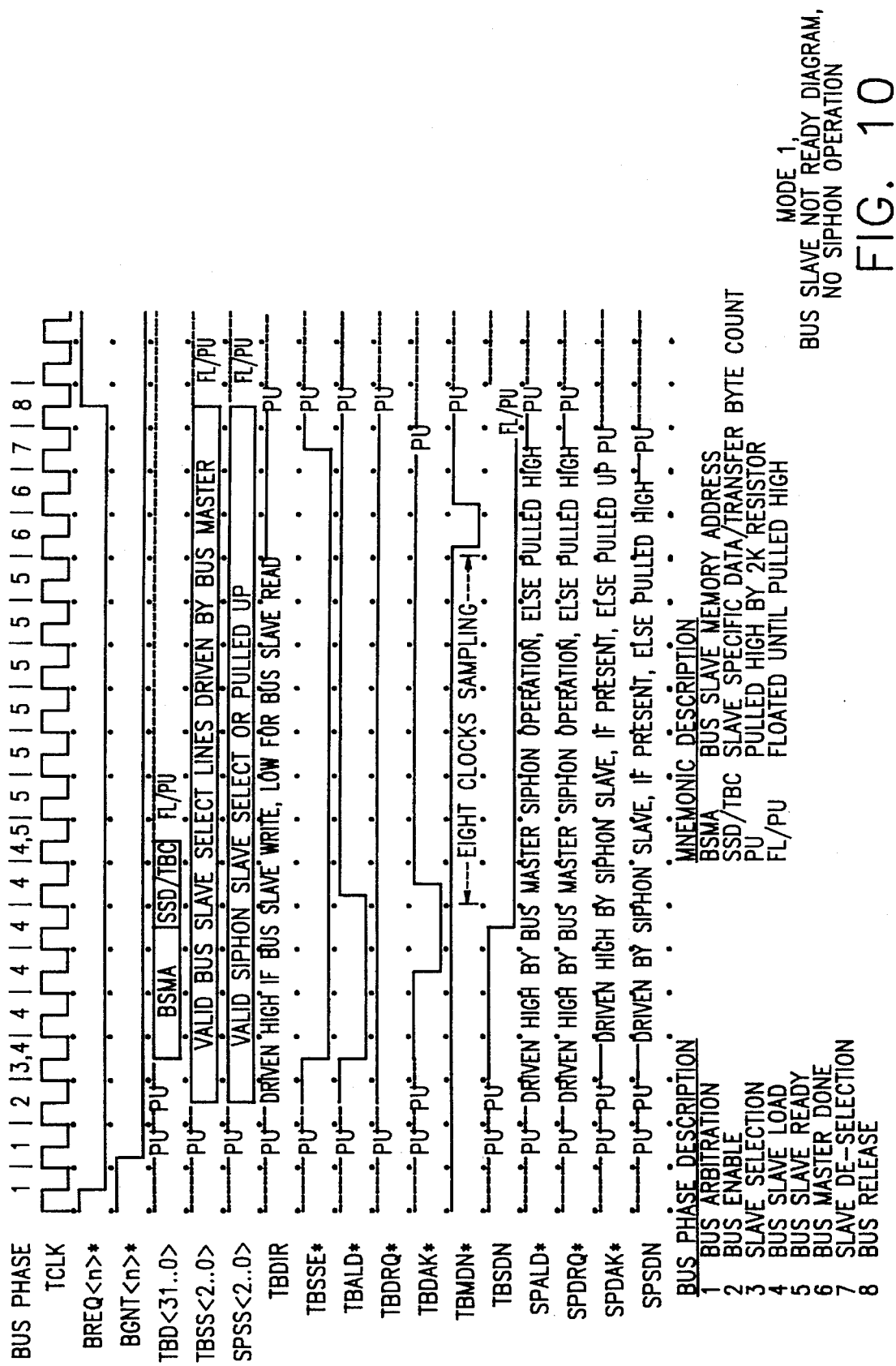

FIG. 10 is a timing diagram illustrating the control sequence for a MODE 1 bus operation when the bus slave was not ready for a data transfer.

Figure 11:
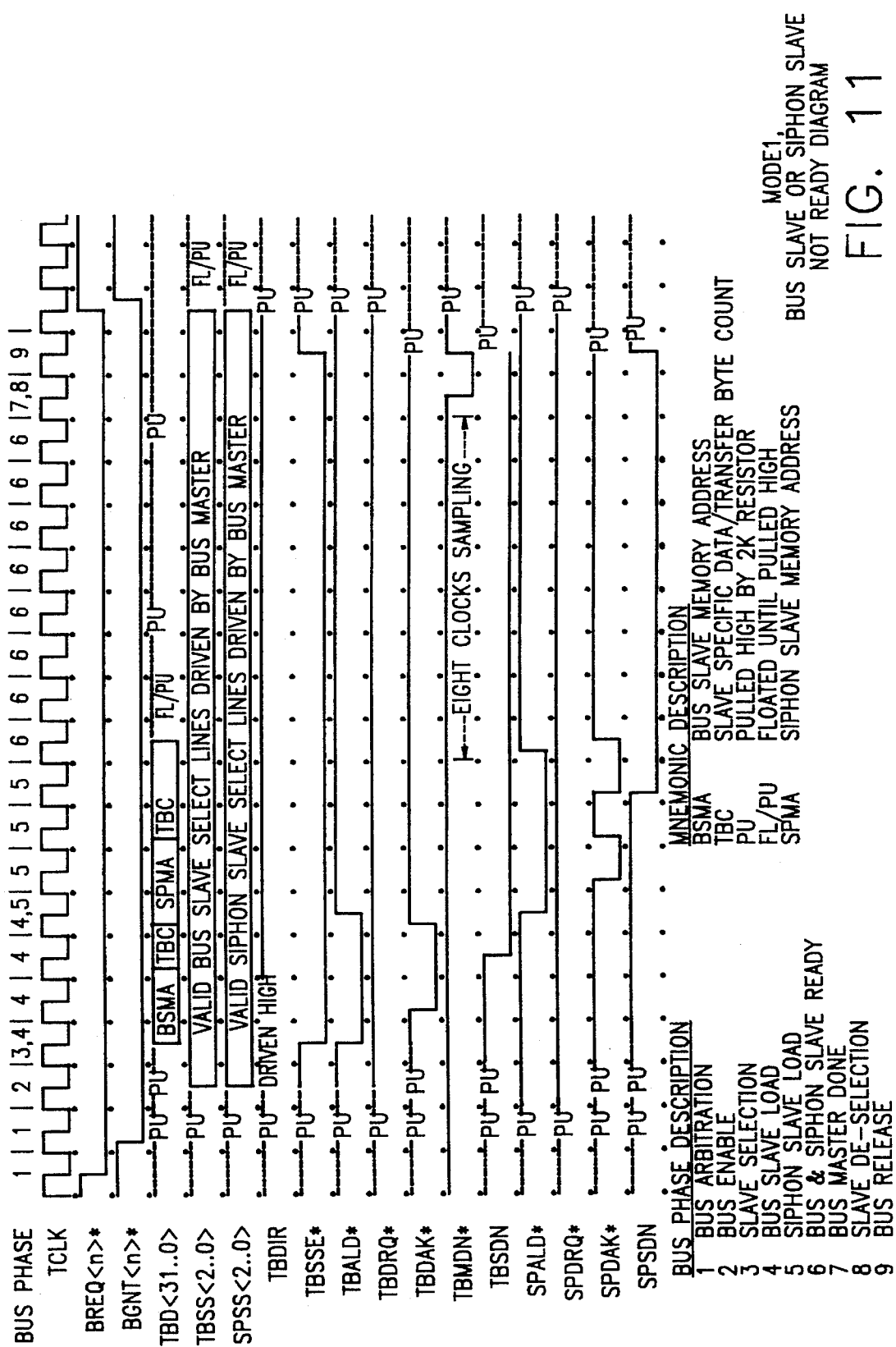

FIG. 11 is a timing diagram illustrating the control sequence for a MODE 1 bus operation when the bus slave or the siphon slave was not initially ready.

Prior to commencing with a more detailed description of the bus master channel controller 200 and the DABM 100, particularly the data transfer section, it is considered appropriate to quickly review operation of the SCSI array controller 80 according to the present invention. A basic transfer occurs as follows. The host computer system C determines that a particular logical data block is to be read from the drive array. The device driver software in the host computer C reserves a memory area to receive the data and develops a command list which is provided to another memory area. The address in the memory of the command list is provided to a mailbox register in the register interface of the DABM 100. After the mailbox address is provided, the doorbell for that particular mailbox is activated so that an interrupt is provided to the local processor 106. Upon receiving the interrupt, the local processor 106 obtains the command list address from the mailbox. The local processor 106 then sets up a command descriptor block (CDB) as will be explained in more detail and directly places this CDB in the transfer buffer RAM 118 via the local processor interface block 206 to RAM controller 210 connection. This CDB is set up to transfer the command list from the host memory 28 through the DABM 100, through the ADAC 116 and to the transfer buffer RAM 118. The local processor 106 then places the starting address in the transfer buffer RAM 118 of the CDB which has just been deposited. This is provided to the bus master channel controller 200 as a particular thread address. The local processor 106 then enables that particular thread. When a thread is enabled, logic in the bus master channel controller 200 retrieves the CDB from the transfer buffer RAM 118 and loads the information in the CDB into the various registers which will be described below. A transfer is commenced wherein the ADAC 116 becomes a bus master, requests that the DABM 100 be the slave, and then loads the DABM 100 with appropriate information to transfer data from the host memory address loaded in the CDB, which is the starting address of the command list as provided by the host processor in its mailbox. The required transfer is completed with the DABM 100 serving as an EISA bus master and a slave to the ADAC 116. When the transfer is completed and the entire command list has been moved into the transfer buffer RAM 118, the ADAC 116 provides an interrupt to the local processor 106 to indicate completion of the particular thread. The local processor 106 directly retrieves the command list from the transfer buffer RAM 118. The local processor 106 then parses the command list to determine the particular commands received from the host computer C.

For this example we will assume that it is a read command that spans numerous of the disk drives in the array. The local processor 106 then parses the command as provided in the command list into drive specific commands to obtain particular sectors from given locations on each of the individual disk drives in the array. The necessary information is then provided from the local processor interface block 206 to the appropriate disk transfer channels 214, 216 and to the SCSI controllers 124 and 126 as appropriate. When all of the command information has been provided, the actual read operation is requested from the drives, with the various controllers and transfer channels enabled to allow data to be transferred from the disk drives into the transfer buffer RAM 118. When each of the various transfers from the drives is completed, interrupts are provided to the local processor 106 to allow it to keep track of operations.

Part of the information obtained in the command list is the actual host memory address where the data is to be deposited. As drive commands are completing and the data is being deposited in the transfer buffer RAM 118 for each particular disk drive, the local processor 106 then develops CDBs for each particular thread or disk information. These CDBs are placed in the transfer buffer RAM 118 such that the information obtained from the disk drives is to be transferred to the appropriate location in the host memory 28. After the CDB for a particular thread has been loaded into the transfer buffer RAM 118, the CDB pointer address is provided to the bus master channel controller 200 and that thread is enabled. With the thread enabled, the bus master channel controller 200 obtains the CTB 104 and requests that the DABM 100 become an EISA bus master. As this is occurring the bus master channel controller 200 is also obtaining the data from the transfer buffer RAM 118. When all of the links have been established and all of the necessary information has been passed as indicated above and below, the transfer operation actually continues according to the handshaking protocol. After the retrieved disk data is transferred, with the various addresses changing as noted below, the bus master channel controller 200 provides an interrupt to the local processor 106. The local processor 106 then knows that the particular drive data has been transferred to the host computer memory 28. When all of the disk data has been transferred from all of the drives as indicated by the interrupts, the local processor 106 then provides a message in a mailbox in the DABM 100 and activates a doorbell in the DABM 100 to indicate to the main host computer C that the operation is completed.

As an alternative, the local processor could request a transfer from a disk transfer channel 214 to the transfer buffer RAM 118 and at the same time activate a CDB to transfer data from the transfer buffer RAM 118 to the CTB 104 using the bus master controller 200. In this case the bus master controller 200 monitors the status of blocks in the transfer buffer RAM 118, transferring data only when a block, preferably a sector or a stripe, has been received from the disk transfer channel 214. In this manner the transfer to host memory is completed sooner, as both transfers are occurring concurrently.

This has been a quick overview of a particular read operation, and writes are similar except that the order of the development of the CDBs and the various commands to the disk transfer channels 214 and SCSI controllers 124 and 126 are reversed so that information is first transferred by the bus master channel controller 200 from the host memory 28 into the transfer buffer RAM 118 and then the commands are set out to transfer data from the transfer buffer RAM 118 to the appropriate disk drives.

To perform these various operations the bus master channel controller 200 contains numerous registers, state machines and combinatorial logic to allow it to operate. The logic and state machines are described below.

Figure 12:
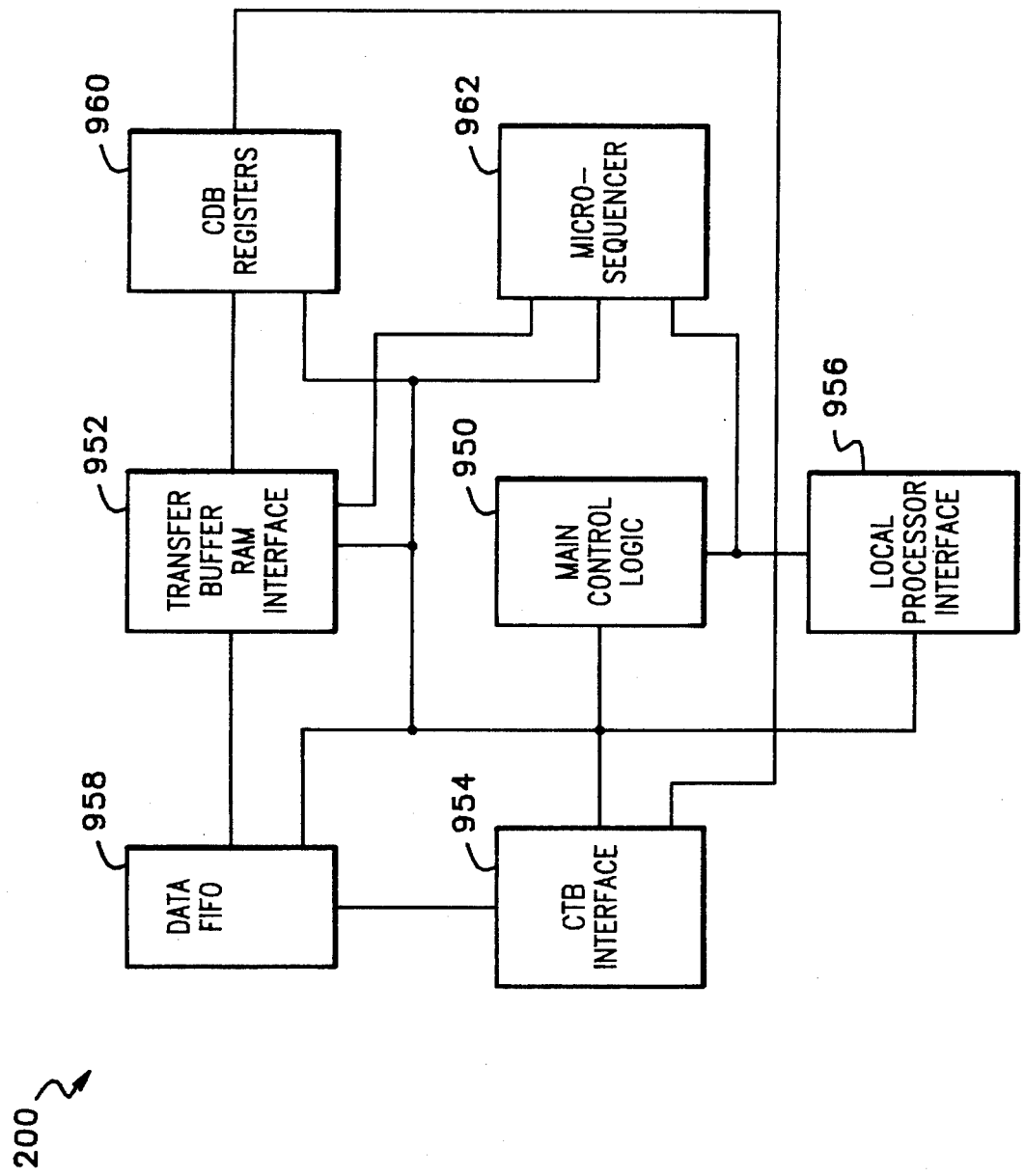
FIG. 12 is a block diagram of the advanced drive array controller of FIG. 3.

The bus master channel controller 200 includes a number of blocks. At the heart is a main control logic block 950 (FIG. 12). Additionally there are three interface blocks, a transfer buffer RAM interface 952, a CTB interface 954, and a local processor interface 956. A data FIFO 958 is connected between the transfer buffer RAM interface 952 and the CTB interface 954 to allow data transfer between those locations. A series of registers referred to as the CDB registers 960 are connected to the transfer buffer RAM interface 952 and to the CTB interface 954. A microsequencer 962 is connected to the CDB registers 960 and the main control logic 950 to allow control of storage and retrieval of information in the CDB registers 962. Further, the micro-sequencer 962 is connected to the local processor interface 956 to allow development of certain CDB related parameters. The main control logic 950 is also connected to the local processor interface 956 to receive command information, to the CTB interface 954 to begin its operation and monitor status, to the data FIFO 958 to monitor data transfer status and to the transfer buffer RAM interface 952 to commence operations and to monitor status. Each of these blocks is explained in more detail below.

The main registers accessible to the local processor 106 in the bus master channel controller 200 are as follows. The first five of these registers are referred to as thread CDB address pointer registers and are contained in the microsequencer 962. These registers receive the address in the transfer buffer RAM 118 of the start of a CDB block or series of CDB blocks which will control operation of a particular transfer thread. In the preferred embodiment there are 6 transfer threads, five of which can be related to the disk transfer channels 214 and one general purpose thread. After a particular CDB task has been performed, the appropriate CDB address pointer register contains the address of the byte following the particular CDB, typically another CDB if several CDBs are used in the total transfer. An additional local processor register is provided in the micro-sequencer 962 to allow a particular transfer thread to be activated or enabled. A further register indicates whether a particular transfer thread is linked to a particular disk transfer channel 214, so that concurrent transfer operations occur, with a block of data being transferred by the reading portion when writing portion has completed the block. Preferably the block size is a sector or stripe. Another register is provided for the local processor 106 to determine if a particular transfer thread has completed. This is the transfer thread or TTDD register. A register is also provided in case an error occurs on a particular transfer thread.

As previously noted, a CDB is used by the bus master channel controller 200 to program the bus master channel resources for the intended operation. These resources include registers, latches, counters, state machines and other circuitry that are used to perform a transfer operation between the CTB 104 and the transfer buffer RAM 118 or a disk transfer channel 214. Each field within the CDB is described in detail below. The CDB for each transfer thread is loaded by the local processor 106 into the transfer buffer RAM 118 at the desired address as previously indicated. Certain rules must be followed by the local processor 106 concerning CDB location in the transfer buffer RAM 118. First, all CDBs must begin on double word boundaries. Second, some transfer threads require multiple CDBs. For such cases, the CDBs must be placed consecutively in the transfer buffer. Finally, any transfer buffer RAM 118 location may be used for CDBs providing the memory exists and is not dedicated for another purpose.

The basic format of the CDB is shown below:

| Address Offset | D31 | D16 D15 | D0 |
|---|---|---|---|
| 0 | Transfer Buffer RAM FIFO End Address | Transfer Buffer RAM FIFO Start Address | |
| 1 | Stripe Block Count/Size | FIFO Block/Sector Size | |
| 2 | Siphon Slave Starting memory Address | | |
| 3 | Bus Slave Memory Address Offset Value | | |
| 4 | Bus Slave Starting Memory Address | | |
| 5 | Transfer Byte Count | Transfer Buffer RAM Start Address | |
| 6 | Slave Specific Register | Status Register | |
| 7 | Control Register | Select Register | |

The first entry of interest is the bus master control register located at offset 7, bits 16 to 31. The definition of the various bits is shown below.

| D15 | D14 | D13 | D12 | D11 | D10 | D09 | D08 | D07 | B06 | D05 | D04 | D03 | D02 | D01 | D00 |
|---|---|---|---|---|---|---|---|---|---|---|---|---|---|---|---|
| RSV | BSACE | SPACE | GPS | MODE1 | MODE0 | CPE | RSV | SPEN | LCDB | OFFEN | RSV | RSV | R2 | BBKT | WRR |

WRR. Write RAM. WRR, when set, indicates the transfer is to transfer data from the CTB 104 to the transfer buffer RAM 118. When cleared, WRR, indicates data will be transferred from the transfer buffer RAM 118 to the controller transfer bus 104.

BBKT. Bit Bucket operation. BBKT, when set, directs the bus master channel controller 200 to perform a bit bucket operation. When BBKT is set, the channel will perform a normal transfer in regards to the RAM controller 210, however, no signals will be asserted on the controller transfer bus 104. In addition, the controller bus signals BGNT and TBDAK will be simulated to indicate that the channel has gained control of the CTB 104 and is receiving data acknowledges to its data requests. All pointers will be adjusted as if a data transfer has occurred when actually no data has been transferred. Operation is further described below.

R2. Read Twice. R2, when set, allows the same disk data to be sent to more than one location in the slave's memory by reading the transfer buffer RAM 118 twice after only a single disk access. R2 disables the bus master channel controller 200 from notifying the local processor 106 that the bus master channel controller 200 has retrieved data from the designated area after the first transfer from the transfer buffer RAM 118.

OFFEN. Offset Enable. OFFEN, when set, allows the bus master channel controller 200 to perform striping operations. As each stripe of data is transferred between the controller transfer bus 104 and the RAM controller 210, the bus master channel controller 200 will add an address offset, specified in the slave memory address offset field, to the current value of the slave memory address counter. This feature allows the number of CDBs required for a disk transfer to be significantly reduced when data is striped across a disk array. Operation is further described below.

LCDB. Last CDB. The LCDB bit, when set, indicates the last CDB for the current thread is being executed. At the completion of the CDB, the bus master state will be saved and the local processor 106 interrupted, if so enabled. LCDB, when cleared, and when the current CDB completes, informs the micro-sequencer 962 to save the state of the bus master at the CDB address for the current CDB and to fetch the next CDB for the current thread.

SPEN. Siphon Enable. SPEN, when set, directs the bus master channel controller 200 to perform a siphon operation. The bus master will select a siphon slave as well as a bus slave, and allow siphoning of data to the siphon slave as it is transferred between the bus slave and the RAM controller 210. The siphon memory address is a valid field during siphon operations and must contain an appropriate value.

MODE1-0. Bus master mode of operation. MODE1-0, allows the bus master channel controller 200 to perform 4 distinct type of controller transfer bus 104 operations. The different type of operations are decoded as follows:

Mode 0. The bus master will not check to see if the bus slave and possibly the siphon slave are ready prior to commencing a data transfer. The bus master will maintain bus control as long as necessary waiting for done status from the selected slaves.

Mode 1. The bus master will perform block data transfers with the bus slave and possibly the siphon slave based on slave ready status. The bus master will also check for slave done status at the completion of a data transfer. If the slave(s) are not ready or done within the ready/done timeout period specified in a ready/done timeout register, the bus master will release the CTB 104 and attempt to obtain the required done or ready status.

Mode 2. The bus master will check to see if the bus slave and possibly the siphon slave are ready prior to commencing a data transfer. The bus master will maintain CTB 104 control as long as necessary waiting for done status from the selected slaves.

Mode 3. The bus master will not check to see if the bus slave and possibly the siphon slave are ready prior to commencing a data transfer. The bus master will not check for slave done status.

GPS. General purpose thread select. GPS, when set, enables the bus master channel controller 200 for the general purpose thread.

BSACE. Bus slave memory address counter enable. BSACE, when set, enables the bus slave memory address counter to increment during bus master and bus slave data transfers. BSACE, when cleared, disables the counter from incrementing during data transfers. This control bit is provided specifically for cases where the bus slave memory address provided to the bus slave is a CDB pointer. In this case, BSACE should be cleared to zero to disable the bus slave memory address counter. In all other cases, BSACE should be set to a one.

SPACE. Siphon slave memory address counter enable. SPACE, when set, enables the siphon slave memory address counter to increment during bus master to/from siphon slave data transfers. SPACE, when cleared, disables the counter from incrementing during data transfers. This control bit is provided specifically for cases where the siphon slave memory address provided to the siphon slave is a CDB pointer. In this case, SPACE should be cleared to zero to disable the siphon slave memory address counter. In all other cases, SPACE should be set to a one.

The next entry of interest is the Bus Master Device/ Thread Select register at offset 7, bits 0 to 15. The definition of the various bits is shown below.

buffer pointer during data transfer operations. On successful completion of the programmed CDB, the last value of the counter state will be saved in the RAM address field. This value should point to next location in the transfer buffer, after the last location accessed by the bus master channel controller 200 for the CDB executed.

The next entry in the CDB of interest is the bus master channel transfer byte count field at offset 5, bits 16 to 31.

TBC<15..0> Bus master channel transfer byte count. These 16 bits define the number of data bytes to be transferred for the programmed data transfer. A value greater than zero indicates the exact number of bytes to be transferred. A value of zero results in a 64K byte data transfer. At the completion of a successful CDB execution, a value of zero will be saved in the CDB transfer byte field to indicate all programmed transfers have completed. Any other value indicates the number of bytes that were not transferred when

| D15 | D14 | D13 | D12 | D11 | D10 | D09 | D08 | D07 | D06 | D05 | D04 | D03 | D02 | D01 | D00 |
|---|---|---|---|---|---|---|---|---|---|---|---|---|---|---|---|
| SPID2 | SPID1 | SPID0 | SSID2 | SSID1 | SSID0 | RSV | RSV | RSV | RSV | RSV | TS4 | TS3 | TS2 | TS1 | TS0 |

TS. Thread Select<4..0>. TS<4..0> correspond to each of the individual drive RAM channels and/or parity engine threads, respectively. Setting one or more of these bits, and if so enabled in the thread source configuration register, enables a FIFO operation between the bus master controller transfer channel and the corresponding selected disk channels 214 or parity engine 218 threads. Specifically, when a thread select bit for a disk channel 214 or parity engine 218 thread is set, that disk channel's ready signal or parity engine 218 thread ready signal for the particular block in the FIFO area of the transfer buffer ram 118 is evaluated prior to transferring data to or from the disk channel's 214 FIFO area or parity thread's 218 FIFO area in the transfer buffer RAM 118. When more than one bit is set in this register, the selected FIFO ready signals are logically "ANDED" together to provide a single ready signal for evaluation. This scenario may well happen as it is required to accomplish a FIFO mirror fault tolerant operation. If the thread selected is not configured for a disk channel 214 FIFO operation in the thread source configuration register bits, these bits have no affect on bus master channel operation.

SSID<2..0>. Bus Slave Selects ID 2–0. These encoded signals specify the slave device on the controller transfer bus 104 the bus master channel controller 200 should select for data transfers. SSID2 is the MSB and SSID0 is the LSB. The data bits are encoded such that SSID2-0=0 h selects slave 0, SSID2-0=1 h selects bus slave 1, SSID2-0=2 h slave 2 and so forth.

SPID<2..0>. Siphon Slave Selects ID 2–0. These encoded signals specify the siphon slave device on the controller transfer bus 104 the bus master channel controller 200 should select for siphon data transfers. SPID2 is the MSB and SPID0 is the LSB. The data bits are encoded such that SPID2-0 = 0h selects bus slave 0, SPID2-0=1 h selects bus slave 1, SPID2-0=2 h selects bus slave 2 and so forth. If a siphon operation is not enabled in the bus master controller register then these bits need not be specified.

The next entry of interest is the bus master channel ram address counter located at offset 5, bits 0 to 15.

RA<15..0>. Bus Counter Transfer Channel RAM Address. These 16 bits define the starting transfer buffer RAM 118 address for the programmed CDB operation. This value is loaded into a counter that provides the transfer the CDB execution was halted. Note that the maximum data that can be transferred with one CDB is 64k bytes. For transfer threads that require more than 64K bytes of data to be transferred, multiple CDBs must be specified.

The next entry in the CDB of interest is the bus master channel slave memory address field at offset 4.

SMA<31..0>. Bus master channel slave memory address field. These 32 bits represent the slave memory address at which data transfers should start. These bits are used to directly load the slave memory address counter which is provided to the EISA bus 34 and is the host memory address. The counter is incremented once for each byte transfer during data transfer operations. Each time an address load cycle is performed on the controller transfer bus 104 by the bus master channel controller 200, the value of the channel's slave address counter is placed on the CTB 104 and qualified with the TBALD signal. At the completion of a programmed CDB operation, the slave memory address counter points to the byte after the last byte transferred. This valued will be stored in the slave memory address field.

The next entry of interest is the bus master channel FIFO start address field at offset 0 bits 0 to 15.

FSA<15..0>. FIFO start address. These 16 bits define the lower transfer buffer RAM 118 double word address boundary for the memory segment dedicated to data transfers for this channel. Preferably the transfer buffer RAM 118 is organized as a series of circular FIFO areas. When the channel's RAM address counter is equal to the FIFO end address, the bus master RAM address counter will be reloaded with the FIFO start address at the completion of the current double word transfer.

The next entry of interest is the bus master channel FIFO end address field at offset 0, bits 16 to 31.

FEA<15..0>. FIFO end address. These 16 bits define the upper transfer buffer memory double word address boundary for the transfer buffer RAM 118 segment dedicated to data transfers for this channel. When the channel's RAM address counter is equal to the FIFO end address, the RAM address counter will be reloaded with the FIFO start address at the completion of the current double word transfer.

The next entry of interest is the bus master channel fifo block/sector size field located at offset 1, bits 0 to 15.

FBS<11..0>. FIFO block/sector size. These 12 bits define the word block size used for FIFO operations. The FIFO block size is the basic unit used for throttling data between a drive and the bus master channel. For example, if the block size is set to 256 words, a bucket of equal size is created in the transfer buffer RAM 118 for the data transfers. In the case of drive reads, the drive must fill the bucket before the bus master channel controller 200 can empty the bucket. Likewise, for drive write transfers, the bus master channel controller 200 must fill the bucket before the drive can empty the bucket. The FIFO block size is always equal to the drive sector size with which a drive transfer thread or parity thread has been established.

The next entry of interest is the bus master channel stripe size located at offset 1, bits 16 to 31. The definition of the various bits is shown below.

CDB operation or has been instructed to abort the current operation because the thread's enable bit was cleared.

HALTED. CDB Halted. This bit is set each time the bus master controller 200 halts operation on the current CDB and stores the CDB values, regardless of the reason for halting the CDB execution.

BERR. Bus Error. This bits indicates a CTB 104 bus error was detected or generated during operations for this CDB.

The next entry of interest is the bus master channel slave memory address offset field located at offset 3.

SMAO<31..0>. Slave memory address offset. These 32 bits define the slave memory address offset value for the current stripe operation. The offset is added to the slave memory address counter after each drive stripe of data is

| D15 | D14 | D13 | D12 | D11 | D10 | D09 | D08 | D07 | D06 | D05 | D04 | D03 | D02 | D01 | D00 |
|---|---|---|---|---|---|---|---|---|---|---|---|---|---|---|---|
| SBC7 | SBC6 | SBC5 | SBC4 | SBC3 | SBC2 | SBC1 | SBC0 | SS7 | SS6 | SS5 | SS4 | SS3 | SS2 | SS1 | SS0 |

SS. Stripe size. These 8 bits define the number of FIFO blocks or sectors contained in one drive stripe. This field value is used to load a stripe counter on multiple stripe operations. That operation is detailed below.

SBC. Stripe Block Counter. This 8 bit value is used to load a stripe counter which counts the number of blocks/sectors required for one drive stripe transfer. The counter is reloaded by the channel control state machine with the value in the stripe size each time a drive stripe has been transferred. When the counter reaches terminal count, an address offset is added to the slave memory address counter, if so enabled.

The next entry of interest is the status register at offset 6, bits 0 to 15. The definition of the various bits is shown below.

transferred if a stripe operation is enabled by OFFEN=1. If OFFEN=0, the SMAO bits are not used and need not be specified.

The next entry of interest is the siphon slave memory address field located at offset 2.

SPA. Siphon Address. SPA<31..0> define the starting siphon slave memory address. During bus master siphon operations, this address is supplied to the siphon slave device. The siphon slave stores the data transferred to or from a bus slave in the siphon device's memory at the address provided.

The next entry of interest is the slave specific register located at offset 6, bits 16 to 31.

During the bus and siphon slave load cycles on the CTB, the bus master controller 200 supplies 3 major blocks of

| D15 | D14 | D13 | D12 | D11 | D10 | D09 | D08 | D07 | D06 | D05 | D04 | D03 | D02 | D01 | D00 |
|---|---|---|---|---|---|---|---|---|---|---|---|---|---|---|---|
| BCD | SCD | DONE | HALTED | RSV | BERR | RSV | RSV | RSV | RSV | RSV | RSV | RSV | RSV | RSV | RSV |

BCD, SCD, DONE, HALTED, CERR, BERR. CDB Status bits. The bus master channel controller 200 stores various status bits concerning the operation or completion of each CDB. These status signals are stored in this field of the CDB in the transfer buffer RAM 118. The bus master controller 200 updates the contents of the CDB in the transfer buffer RAM 118 each time transfers for the CDB are complete, or when an error is detected or when a different thread requires servicing. The status bit definitions of these signals are as follows:

BCD. Bus slave check done. This bit is used by the bus master state machines to determine if the current CDB has completed, yet the bus slave was determined to be "not done". The local processor 106 should initialize this bit to zero and ignore its value upon CDB completion.

SCD. Siphon slave check done. This bit is used by the bus master state machines to determine if the current CDB has completed, yet the siphon slave was determined to be "not done". The local processor 106 should initialize this bit to zero and ignore its value upon CDB completion.

DONE. CDB done. This bit is set when the bus master controller 200 has completed all transfers for the current information: the slave memory address, the transfer byte count and the slave specific data. This register represents some of the slave specific data presented during the CTB load cycle. As the DABM 100 does not utilize any of this information, this register is not explained.

Figure 13:
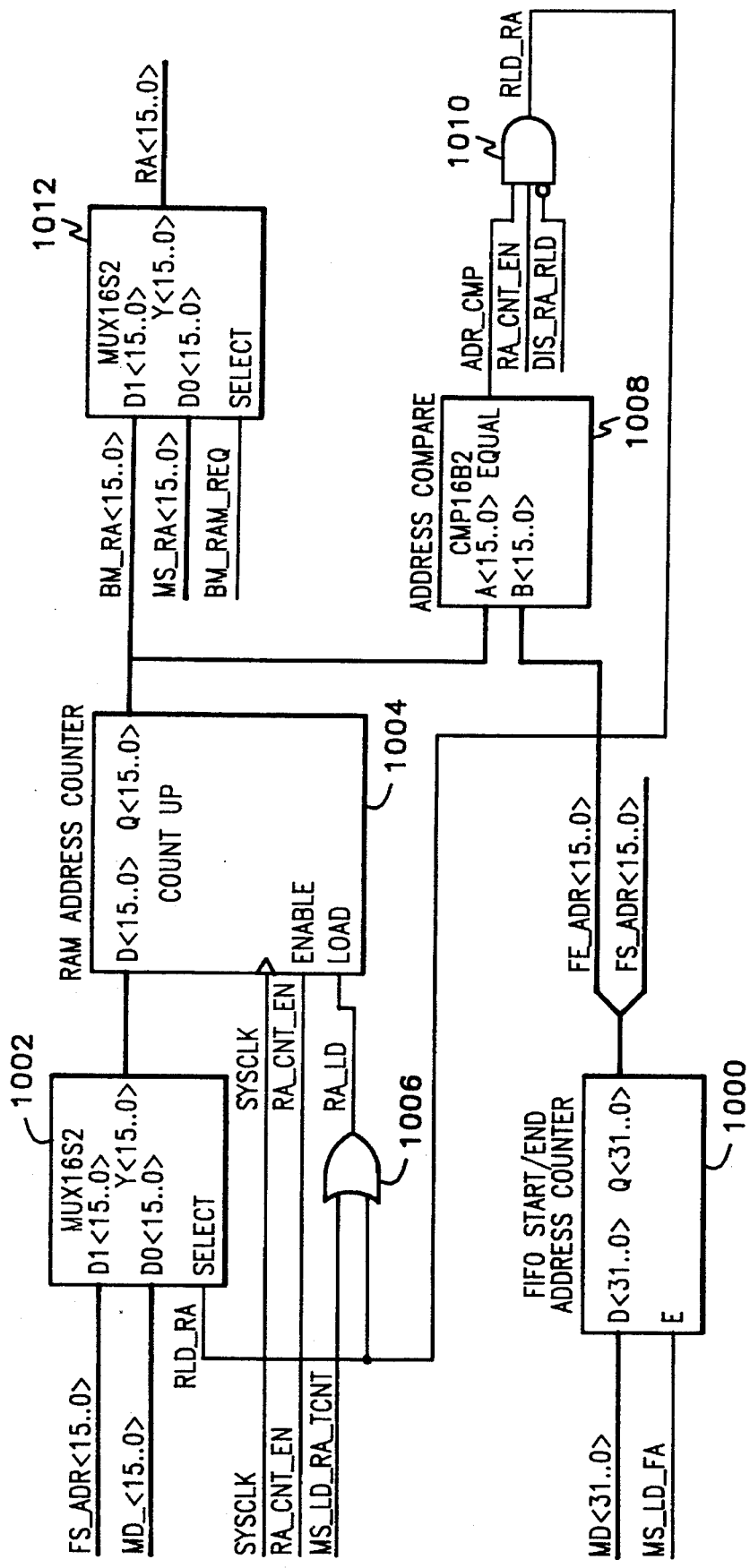
Figure 19:
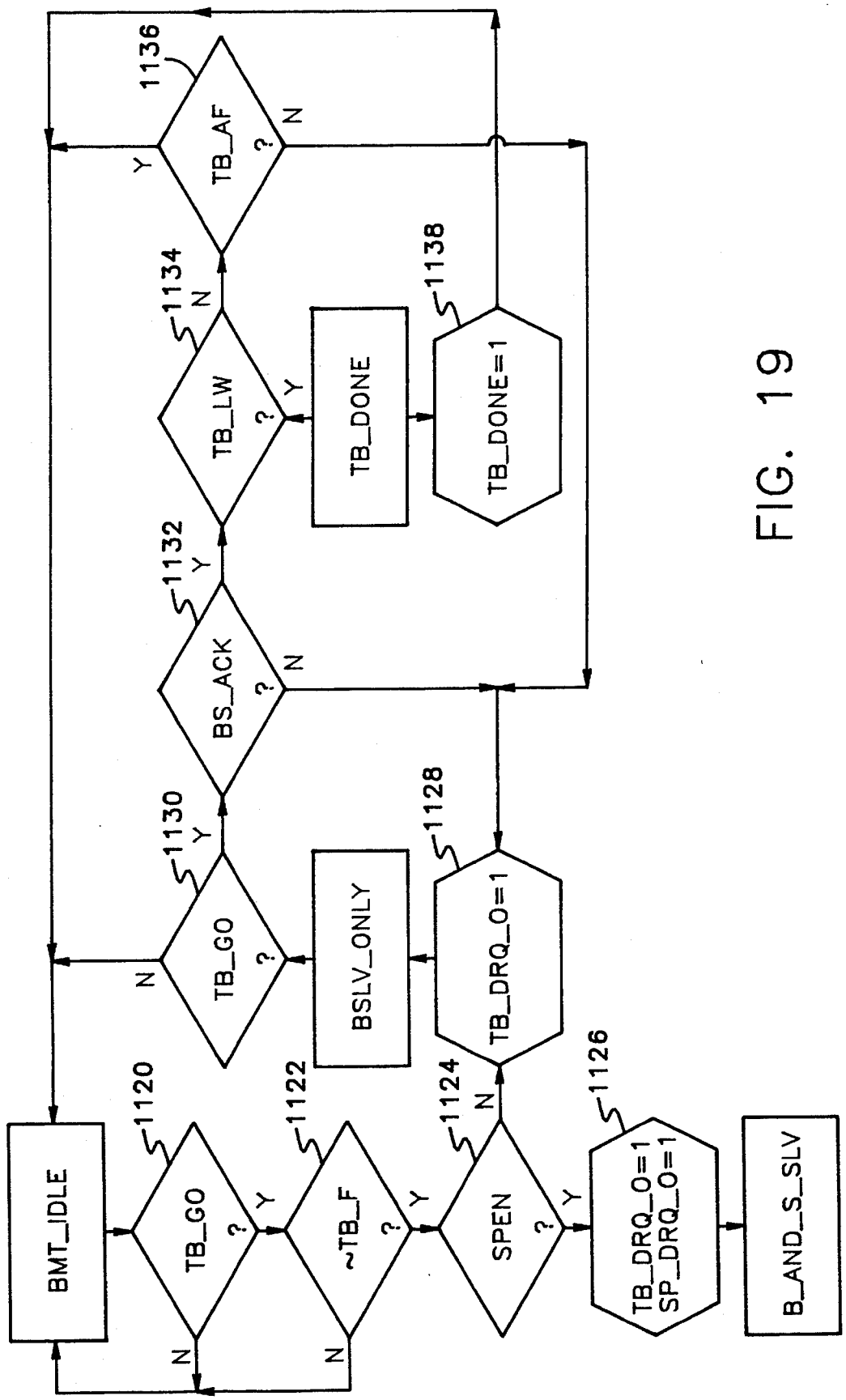
FIGS. 19 to 20, 22 to 23, 25 to 31 and 38 are state machine flowcharts for operation of various state machines in the bus master channel controller of FIG. 3.

The block diagrams of the logic in the bus master channel controller 200 begin at FIG. 13, with state machines for the various portions starting at FIG. 19. Beginning now at FIG. 13, registers utilized by the bus master channel controller 200 to address the RAM controller 210 are shown. A latch 1000 contains 16 bits of address to indicate the end of the FIFO block developed in the transfer buffer RAM 118 and 16 bits of address to indicate the start of a FIFO block for the transfer buffer RAM 118. This information is loaded from the CDB at offset 0. The FIFO start address is provided as one input to a two channel multiplexer 1002. The second input of the multiplexer 1002 is a 16 bit value which is the RAM starting address for the particular transfer as provided in the CDB. Thus it is noted that the transfer need not start at the beginning of a particular FIFO block but can occur anywhere within it. The output of the multiplexer 1002 is provided to a 16 bit RAM address counter 1004 which sequentially counts up with each transfer. The clock signal to the address counter 1004 is the SYSCLK signal or the TCLK signal as present on the CTB 104. An enable signal is provided by logic that indicates that a RAM operation should occur as it has been requested and RAM arbitration has been provided. The load signal for the counter 1004 is provided by the output of a two input OR gate 1006, with one input being an indication that it is the appropriate time to load the address when a CDB is being loaded from the transfer buffer RAM 118 into the bus master channel controller 200 and the other input being a reload value so that when the end of the FIFO block has been reached the start of the FIFO block can be reloaded into the counter 1004 to form a circular ring buffer.

The output of the counter 1004 is provided to one input of a 16 bit address comparator 1008, with the other input of the comparator 1008 receiving the ending address for the FIFO block from the latch 1000. The equal output of the comparator 1008 is provided to one input of a NAND gate 1010 whose other inputs receive the RA_CNT_EN or RAM address count enable signal and a signal DIS_RA_RLD, which indicates that FIFO operation of the transfer buffer RAM 118 is disabled. The output of the AND gate 1010 is provided as the input to the OR gate 1006 and to the select input of the multiplexer 1002. The output of the RAM address counter 1004 is also provided as one input to a 16 bit two channel multiplexer 1012, whose second input is an address provided the micro-sequencer 962 used to actually load the CDB in from the transfer buffer RAM 118, this value being the transfer CDB pointer address previously provided by the local processor 106 and incremented as necessary during CDB load or store operations. The select signal for the multiplexer 112 is a signal indicating that the bus master data transfer portion of the bus master channel controller 200 is transferring data and not the micro-sequencer 962 in a CDB load or write operation. The output of the multiplexer 1012 is provided to the RAM controller 210 as the RAM address.

Figure 14:
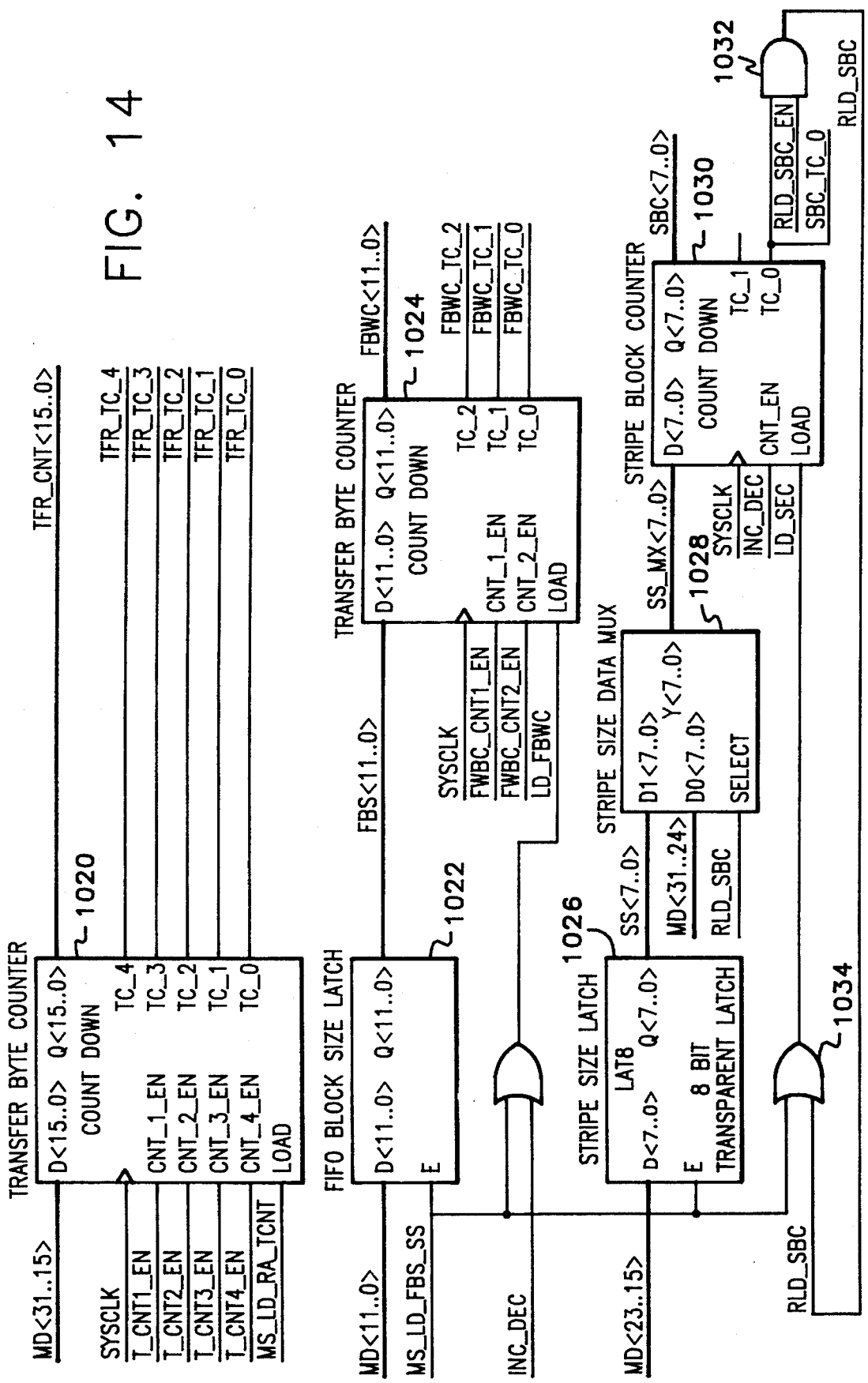

An additional field in the CDB is the transfer byte count, which as previously noted indicates the number of bytes to be actually transferred in the particular thread. This value is loaded into a transfer byte counter 1020 (FIG. 14). The clock for the counter 1020, which is a countdown counter, is the SYSCLK signal. The counter 1020 will count down in increments of 0, 1, 2, 3 or 4 depending upon the states of the T_CNTx_EN signals. The counter 1020 counts by four unless the remaining value is less than four, in which case the decrement is by the remaining value. The counter 1020 is loaded at the appropriate time in the CDB read operation. The outputs of the counter 1020 include the TFR_CNT<15..0> signals such that when it is down to 0 the transfer is completed and this can be considered a terminal count. Five additional outputs indicate the number of bytes remaining in the transfer and are referred to as TC_4, TC_3, TC_2, TC_1 and TC_0 and are used to help develop the T_CNTx_EN signals and others.

One additional parameter in the CDB is the FIFO block or sector size and this value is provided to a latch 1022 which is loaded at the appropriate time. The outputs of the latch 1022 are provided to a FIFO block word counter 1024, which is a count down 12 bit counter. The counter 1024 is clocked by the SYSCLK signal. It may count down by 1 or 2 based on the number of the remaining value. Outputs include FBWC_TC_2, FBWC_TC_1 and FBWC_TC_0 signals indicating whether 0, 1 or 2 words remain in the block. These signals are used to develop the count down value and other signals.

One additional feature is the ability to know the actual stripe size of the data as present on the disk array so that with this capability and the use of a memory offset, contiguous data can be read from or written to a particular disk drive, even though the data is or will be noncontiguous in the host memory. The bus master channel controller 200 can directly provide the data by continuous reads from or writes to the transfer buffer RAM 118 into or from noncontiguous sections of host memory 28 without any additional instructions by the local processor 106 other than setting up the original CDB. Thus for each operation which receives several stripes of data from the drive, all of the miscellaneous scattering and gathering of data based on the striping is performed without local processor 106 action, thus reducing overhead on the local processor 106 and speeding up operations overall. The size of the FIFO blocks or sectors contained in a particular stripe is provided from the CDB to a stripe size latch 1026 whose output is provided to a stripe size data multiplexer 1028. The multiplexer 1028 has data two inputs, with the second input being directly from the transfer buffer RAM 118 during a CDB load operation. This is used to load the original stripe block count value from the CDB. This data is loaded through the multiplexer 1028 directly into a stripe block counter 1030. By this technique, leading blocks in a stripe can be omitted so that the transfer can commence a number of blocks or stripes from the beginning of the actual received data present in the transfer buffer RAM 118. After this value is counted down to 0 by the block counter 1030, the address offset value is loaded and added to the bus slave memory address so that the scattering of information in the case of a disk read or gathering of information in case of a disk write operation is automatically performed. At the time when the offset is performed, the data value contained in the stripe size latch 1026 is loaded into the stripe block counter 1030 so that in this case it would be appropriate to do a full stripe. Thus in this way it is easy to read or write simple blocks of data without the overhead for the local processor 106 having to develop a very large number of individual CDBs for each particular block in a stripe.

When the counter 1030 counts down to 0, a terminal count value referred to as SBC_TC_0 is provided to an AND gate 1032, whose other input is a block count stripe reload enable signal provided by a controlling state machine. The output of the AND gate 1032 is provided through an OR gate 1034 which receives as its other input the load signal appropriate for loading the CDB value of the stripe block count. The output of the OR gate 1034 goes to the load input of the counter 1030.

As noted, when using striping operations it is possible to offset or do a noncontiguous operation for each particular stripe length in memory. A slave memory offset register 1036 (FIG. 15) is a 32 bit register which contains the offset value specified in the CDB which is appropriate based on the number of sectors for individual disk stripe and the number of disks forming the entire stripe, so that as the transfer operation is repeated for each of the various drives in the array, the memory data is actually finally gathered up from or scattered into the host memory. The output of the slave memory offset register 1036 is provided as one input to a slave memory address counter 1038. The normal data inputs to the counter 1038 are provided from the transfer buffer RAM 118 during a CDB load when the bus slave starting memory address is being retrieved. Again the counter 1038 increments on the SYSCLK signal and can increment by values of 0–4 as appropriate based on the number of bytes remaining in the transfer. Four bytes are used if more than four remain. The offset feature is enabled by the OFFEN bit in the CDB control register. This bit is provided as one input to a two input AND gate 140, whose other input receives the RLD_SBC signal or reload signal as provided from the stripe block counter AND gate 1032. The output of the AND gate 1040 is connected to the add offset input to the address counter 1038. The output of the address counter 1038 is the actual slave address which is provided over the CTB 104 during a slave address load portion of a CTB cycle and returned to the transfer buffer RAM 118 when the CDB information is written back.

It is also noted that in the CDB there is the capability to direct a siphon slave to begin operation. To this end there is a siphon memory address counter 1042 which receives its data from the transfer buffer RAM 118 during the appropriate portion of a CDB load cycle and is clocked by the SYSCLK signal, with the output being provided during a siphon slave address load operation of the CTB 104 and to the transfer buffer RAM 118 when the CDB information is written back.

Figure 16:
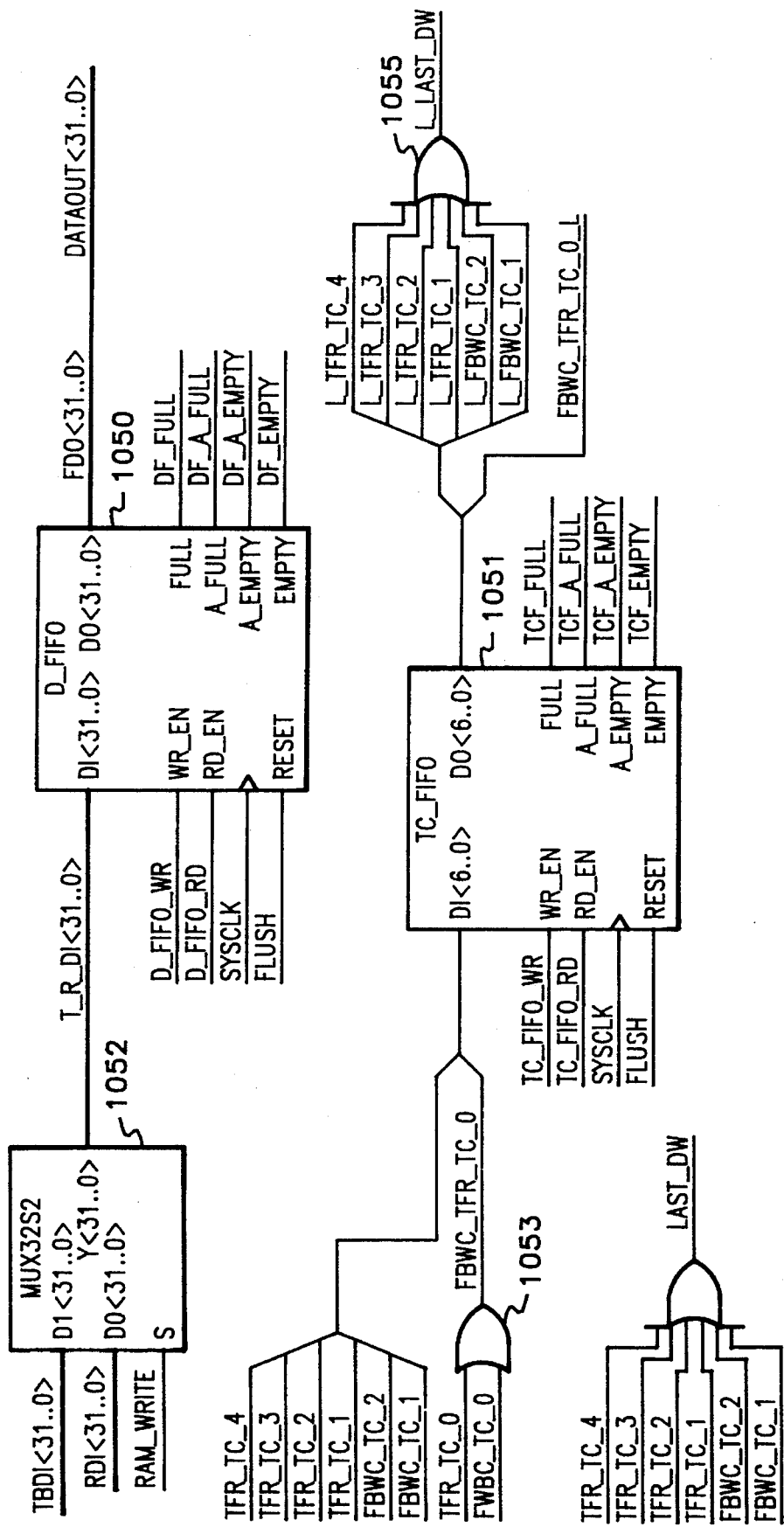

Proceeding now to FIG. 16, the data FIFO 958 which is located between the CTB bus 104 and the transfer buffer RAM 118 is shown. This FIFO 1050 is utilized because the two buses are actually asynchronous in operation. Preferably the FIFO 1050 is five double words deep and includes outputs to indicate when it is empty; when it is almost empty, indicating that there is only one data value present, when it is almost full, indicating that only one data space remains and when it is full. The FIFO 1050 is clocked on the SYSCLK signal and includes inputs for reading and writing, so that data can be loaded into the FIFO 1050 and removed from the FIFO 1050. The output from the FIFO 1050 is properly multiplexed to the appropriate bus depending upon the direction of the transfer. The inputs of the FIFO 1050 are connected to a 32 bit multiplexer 1052, receives as its inputs the data bus from the CTB 104 and the data bus from the transfer buffer RAM 118, with the select input of the multiplexer 1052 being a signal referred to as RAM_WRITE, which indicates that the transfer buffer RAM 118 is being written. Therefore, with each read or write operation, the FIFO 1050 is clocked.

It is also necessary to track and FIFO the terminal count indications so that the terminal count information is provided to the writing source at the appropriate time and to the reading source at its appropriate times so that overfills do not occur and that all bytes are properly provided from the FIFO 1050. To this end, a terminal count FIFO 1051 is utilized. The terminal count FIFO is 7 bits wide and 5 entries deep and receives as its data inputs the FBWC_TC_1, FBWC_TC_2, TFR_TC_i, TFR TC 2, TFR TC 3 and TFR_TC_4 signals and a signal referred to as FBC_TFR_TC_0 which is provided at the output of a two input OR gate 1053 which has as its input the FBWC_TC_0 and TFR_TC_0 signals. The FIFO 1051 includes the TC_FIF0_WR and TC_FIFO_RD signals to indicate read and write operations and is clocked by the SYSCLK signal. The FIFO 1051 provides the TCF_FULL, TCF_A FULL, TCF_A_EMPTY and TCF_EMPTY signals to indicate data status in the FIFO 1050. The data outputs of the FIFO 1051 are the FBWC_TFR_TC_O_L signal and L_FBWC_TC_1, L_FBWC_TC_2, L_TFR_TC_1, L_TFR_TC_2, L_13TFR_TC_and L_TFR_TC_4 signals. The L_FBWC_TC_1, L_FBWC_TC_2, L_TFR_TC_1, L_TFR_TC_2, L_TFR_TC_3 and L_TFR_TC_4 signals are provided as the inputs to an OR gate 1055 whose output is the L_LAST_DW signal so that this indicates that the last word is being transferred from the FIFO 1050.

The TFR_TC_4, TFR_TC_3, TFR_TC_2, TFR_TC_1 AND FBWC_TC_2 AND TFR_TC_2 signals are provided to the inputs of an OR gate 1055, whose output is the LAST_DW signal, which indicates the last word is being transferred to the FIFO 1050.

Figure 17:
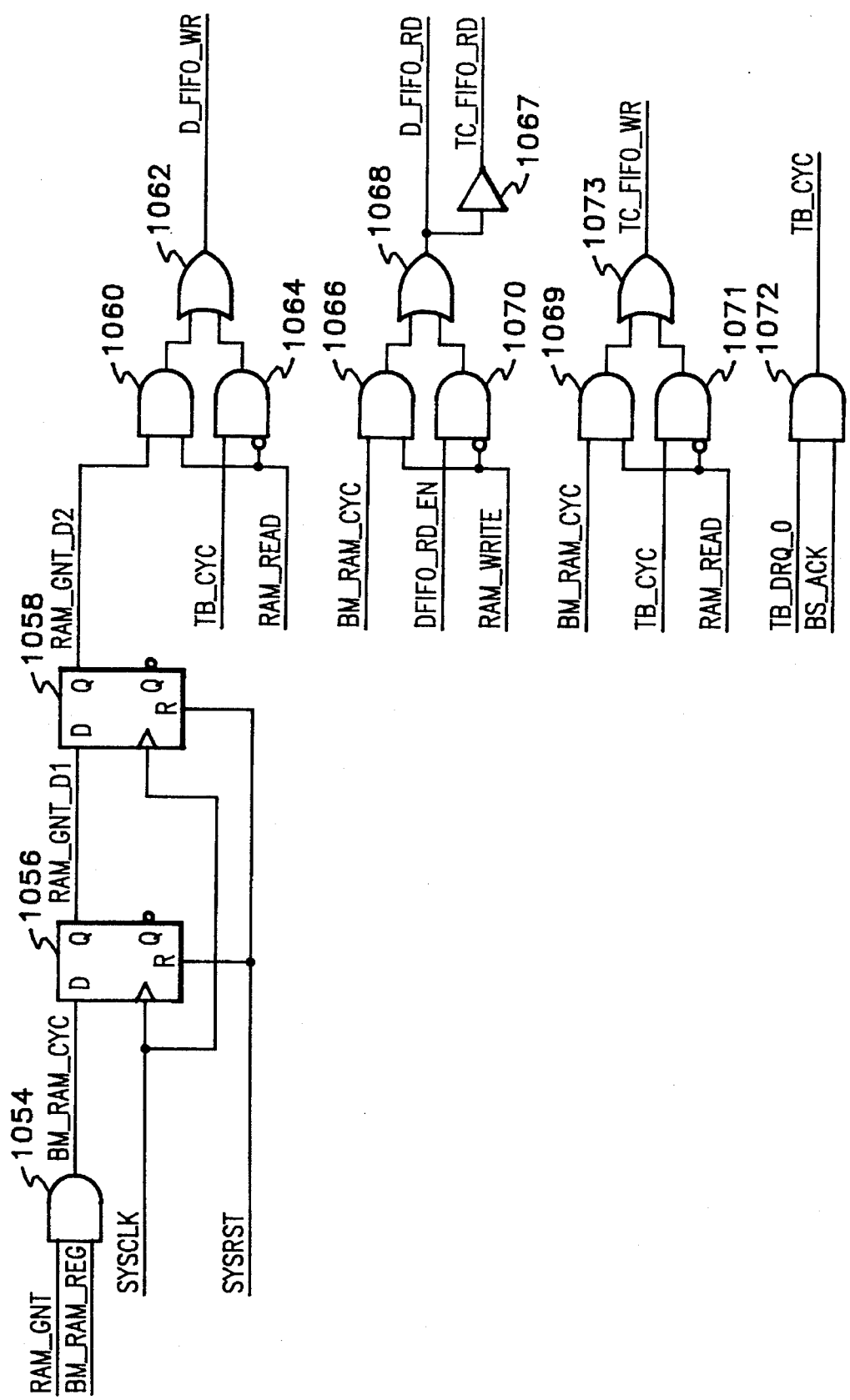

Certain control logic is needed to provide the read and write signals to the FIFO 1050 and the FIFO 1051. A RAM_GNT signal (FIG. 17), indicating that the RAM controller 210 has granted access to the bus master channel controller 200 is provided as one input to a two input NAND gate 1054. The second input is the BM_RAM_REQ signal to indicate that the bus master channel controller 200 is requesting data. The output of the AND gate 1054 is provided to the input of a D-type flip-flop 1056, whose clocking signal is the SYSCLK signal and whose asynchronous reset is provided by the SYSRST or system reset signal. The output of the flip-flop 1056 is provided to the input of a D-type flip-flop 1058, which is also clocked by the SYSCLK signal and reset by the SYSRST signal. The output of the flip-flop 1058 is provided to one input of a two input AND gate 1060 whose second input is the RAM_READ signal, which indicates that a read operation of the transfer buffer RAM 118 is being performed. The output of the AND gate 1060 is provided to one input of a two input OR gate 1062. The other input to the OR gate 1062 is provided by the output of a two input AND gate 1064. One input to the AND gate 1064 is inverted version and receives the RAM_READ signal, while the other input is the TB_CYC signal which indicates that data has been accepted by the bus slave. The TB_CYC signal is provided as the output of a two input AND gate 1072. The two inputs to the AND gate 1072 are the BS_ACK signal, which is an indication that the bus slave has acknowledged the operation, and the TB_DRQ_O signal which is an indication that a data transfer request has been issued. The output of the OR gate 1062 is the D_FIFO_WR or write signal provided to the FIFO 1050.

A signal referred to as BM_RAM_CYC, the output of the AND gate 1054, is provided as one input to a two input AND gate 1066. The second input to the AND gate 1066 is the RAM_WRITE signal. The output of the AND gate 1066 is provided to one input of a two input OR gate 1068. The other input of the OR gate 1068 is provided by the output of a two input AND gate 1070, one of whose inputs is inverted and receives the RAM_WRITE signal. The second input receives the D_FIFO_RD_EN signal to indicate that read operations of the FIFO 1050 are enabled. The output of the OR gate 1068 is the D_FIFO_RD signal which is provided to the read control of the FIFO 1050.

The output of the OR gate 1068 is provided through a buffer 1067 to form the TC_FIFO_RD signal. The BM_RAM_CYC and RAM_READ signals are provided to the inputs of an AND gate 1069. The TB_CYC signal is provided to one input of an AND gate 1071, whose other input is inverted and receives the RAM_READ signal. The outputs of the AND gates 1069 and 1071 are the inputs to an OR gate 1073, whose output is the TC_FIFO_WR signal.

Figure 18:
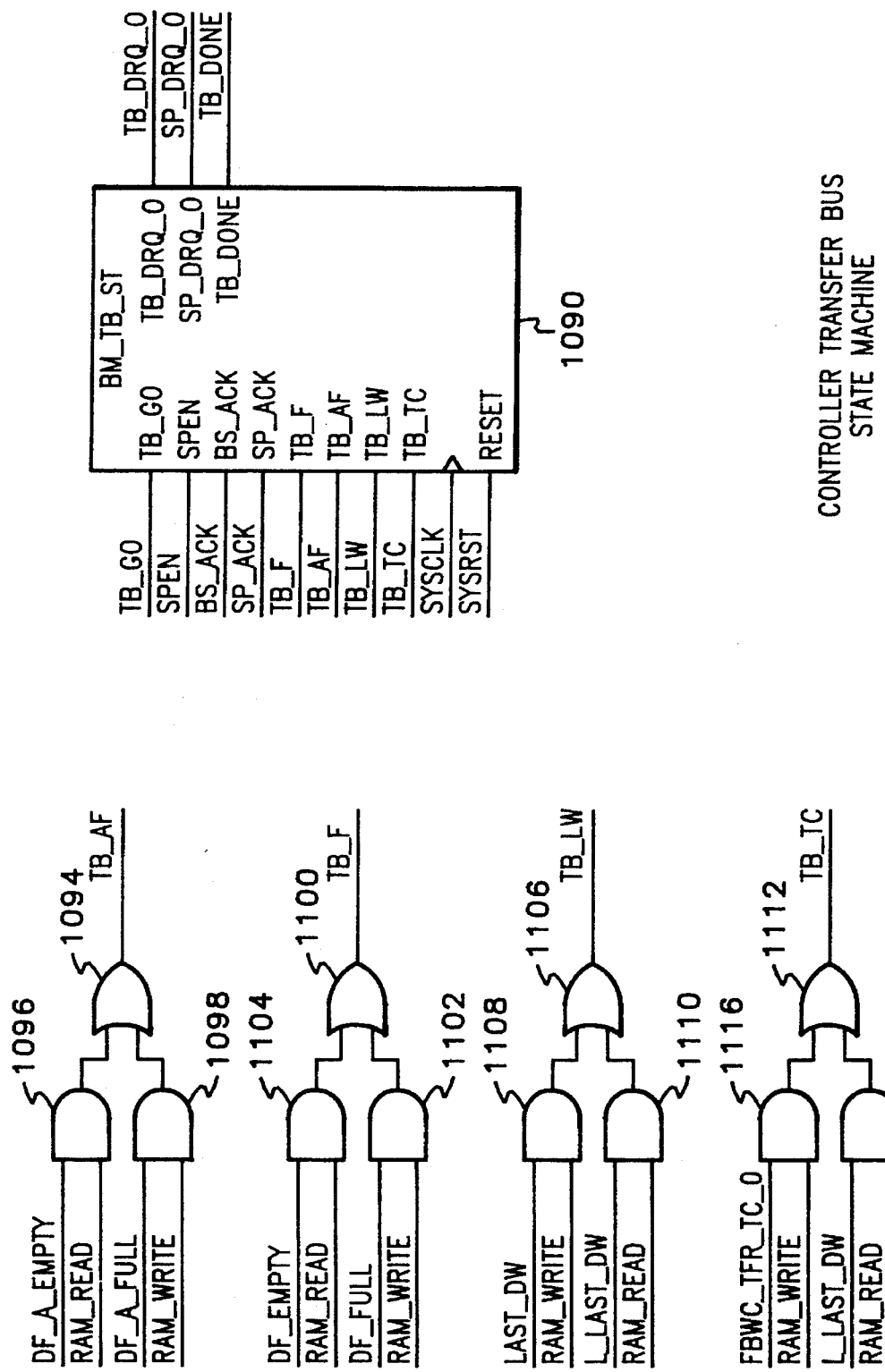
Figure 24:
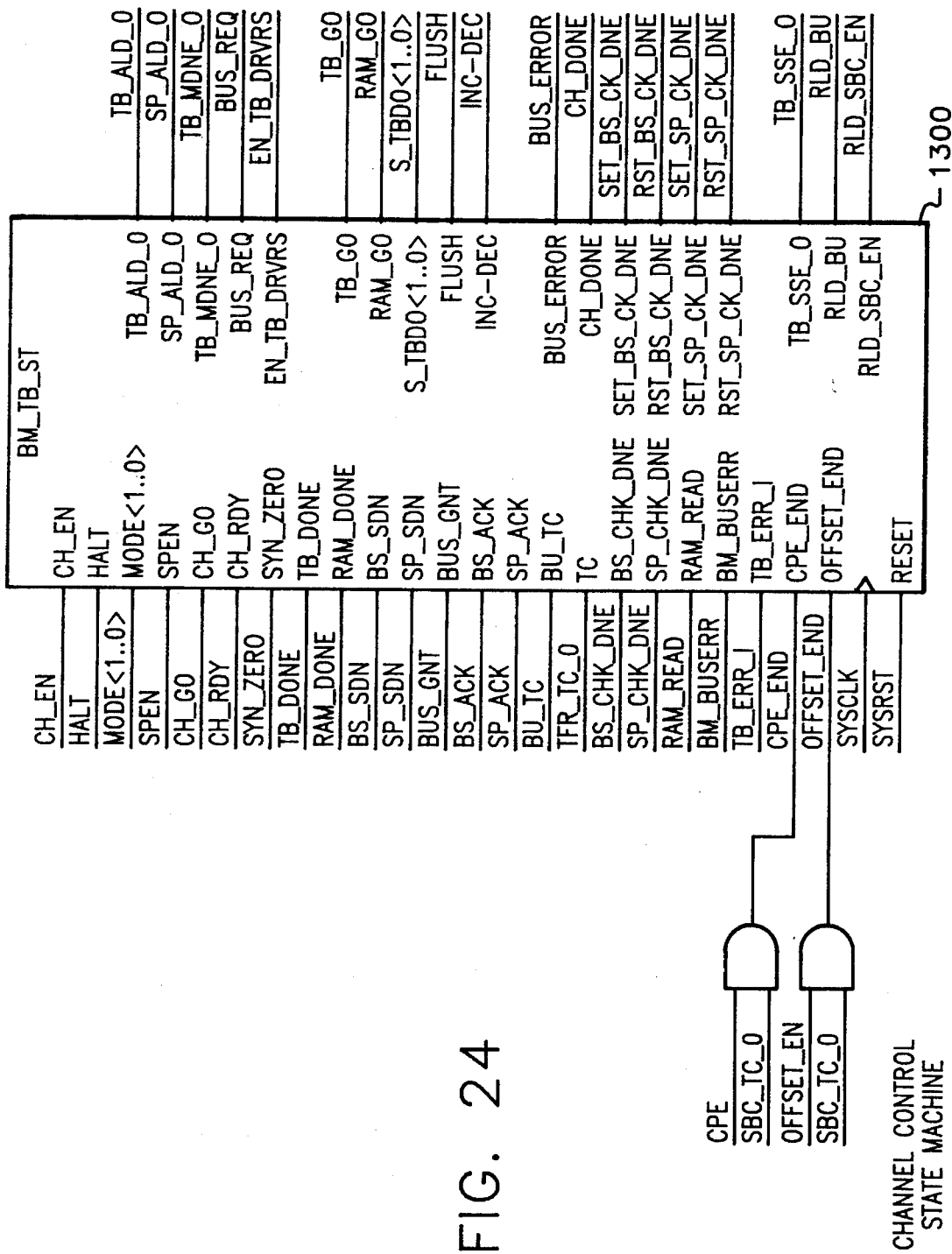

As noted above, the CTB 104 has a particular transfer protocol. To this end it is desirable that a state machine be utilized to monitor and control operations of the bus master channel controller 200 with the CTB 104. A state machine 1090 (FIG. 18) is utilized. Certain signals are utilized with the bus master/transfer bus state machine 1090. The first of these is the TB_GO signal, which is provided by a channel controller state machine 1300 (FIG. 24). The second signal is the TB_AF signal which is provided as the output of a two input OR gate 1094. One input to the OR gate is provided by the output of a two input AND gate 1096, whose inputs are the DF_A_EMPTY signal and the RAM_READ signal. The second input to the OR gate 094 is provided by the output of a two input AND gate 1098 whose inputs are the DF_A_FULL and RAM_WRITE signals. Thus during reads the TB_AF signal is provided when the FIFO 1050 is almost empty and during writes when it is almost full. The TB_F signal is utilized by the state machine 1090 and is provided as the output of a two input OR gate 1100. One input to the OR gate 1100 is provided by a two input AND gate 1102 whose inputs are the RAM_WRITE signal and DF_FULL signal. The second input to the OR gate 1100 is provided by the output of a two input AND gate 1104 whose inputs are the DF_EMPTY and RAM_READ signals. An additional input to the state machine 1090 includes the TB_LW which signal is provided as the output of a two input OR gate 106. One input to the OR gate 1106 is provided by the output of a two input AND gate whose inputs are the LAST_DW and RAM_WRITE signals. The LAST_DW signal is an indication that this is the last transfer in the particular operation. The second input to the OR gate 1106 is provided by the output of a two input AND gate 1110 whose inputs are the RAM_READ and the L_LAST_DW signal, which indicates that during a reads that the last doubleword has been transferred. Yet another input signal is the TB_TC signal, which is a terminal count signal and is provided at the output of a two input OR gate 1112. One input to the OR gate 1112 is provided by the output of a two input AND gate 1114 which receives the RAM_READ signal and the L_LAST_DW signal. The second input to the OR gate 1112 is provided by the output of a two input AND gate 1116 whose inputs are the RAM_WRITE signal and FBWC_TFR_TC0 signal, which is an indication that this is a terminal count of a particular sector transfer and operations are to pause between sectors. Three other signals are inputs to the state machine 1090. These include the SPEN signal, which is an indication that the siphon operations are activated. Additionally, the BS_ACK and SP_ACK signals to indicate a bus slave and a siphon slave acknowledge are provided. The development of these signals will be identified below.

Operation of the state machine 1090 shown in FIG. 19 with three outputs being provided by the state machine 1090. The state machine 1090 commences at state BMT_IDLE. The state machine operation is shown in flowchart format. Only the rectangular boxes are states, and all flow proceeds to a state on a clock edge. The output indications and conditional blocks occur during the state from which they proceed. Therefore, this description describes control proceeding through the conditional and output blocks but it is understood that the outputs are during the state and the condition boxes are asynchronous and define the combinatorial logic used to advance the state machine. Control proceeds from the BMT_IDLE state to a first decision to interrogate the status of the TB_G0 signal at block 1120. If the TB_GO signal is not active, indicating that operations cannot be performed because the channel is disabled or halted, control stays at the BMT_IDLE state. If TB_GO signal is true, the next decision is evaluated in block 1122 to see if the FIFO 1050 is empty in the case of a read or full in case of a write so that no more data is due to be transferred. If that is the condition, control stays at the BMT_IDLE state. If that is not true, that is data is available in the FIFO, then a third determination is made as to whether a siphon slave device is enabled in block 1124. If so, the TB_DRQ_O and SP_DRQ_O signals are made active in block 1126 so that the request is present on the CTB 104. Control in this instance then proceeds from the BMT_IDLE state to the B_AND S_SLV state, which indicates that the bus and siphon slaves are present and being utilized. If it was determined in block 1124 that only the bus slave was being utilized, then in block 1128 the TB_DRQ_O signal is made active and control proceeds from the BMT_IDLE state to the BSLV_ONLY state.

On the next edge of the SYSCLK or TCLK signal the state machine 1090 advances from the BSLV_ONLY state to the next state. The first decision is made in block 1130 whether the TB_GO signal is active. If not, control returns from the BSLV_ONLY state to the BMT-IDLE state. If it is active, then the BS_ACK or bus slave acknowledge signal is monitored. If not active in block 1132, control returns to block 1128 and control stays at the BSLV_ONLY state. If the bus slave has acknowledged, in block 1134 a determination is made. If the TB_LW signal, indicating that this the last data word to be transferred, is true then control transfers from the BSLV_ONLY state to the TB_DONE state. If not, a determination is made in block 1136 whether the FIFO 1050 is almost full in the case of a write or almost empty in the case of a read by monitoring the TB_AF signal. If almost full, then control goes from the BSLV_ONLY state to the BM_IDLE state. If not almost full, control stays at the BSLV_ONLY state with the TB_DRQ_0 signal staying high to indicate that more data is present.

Figure 20:
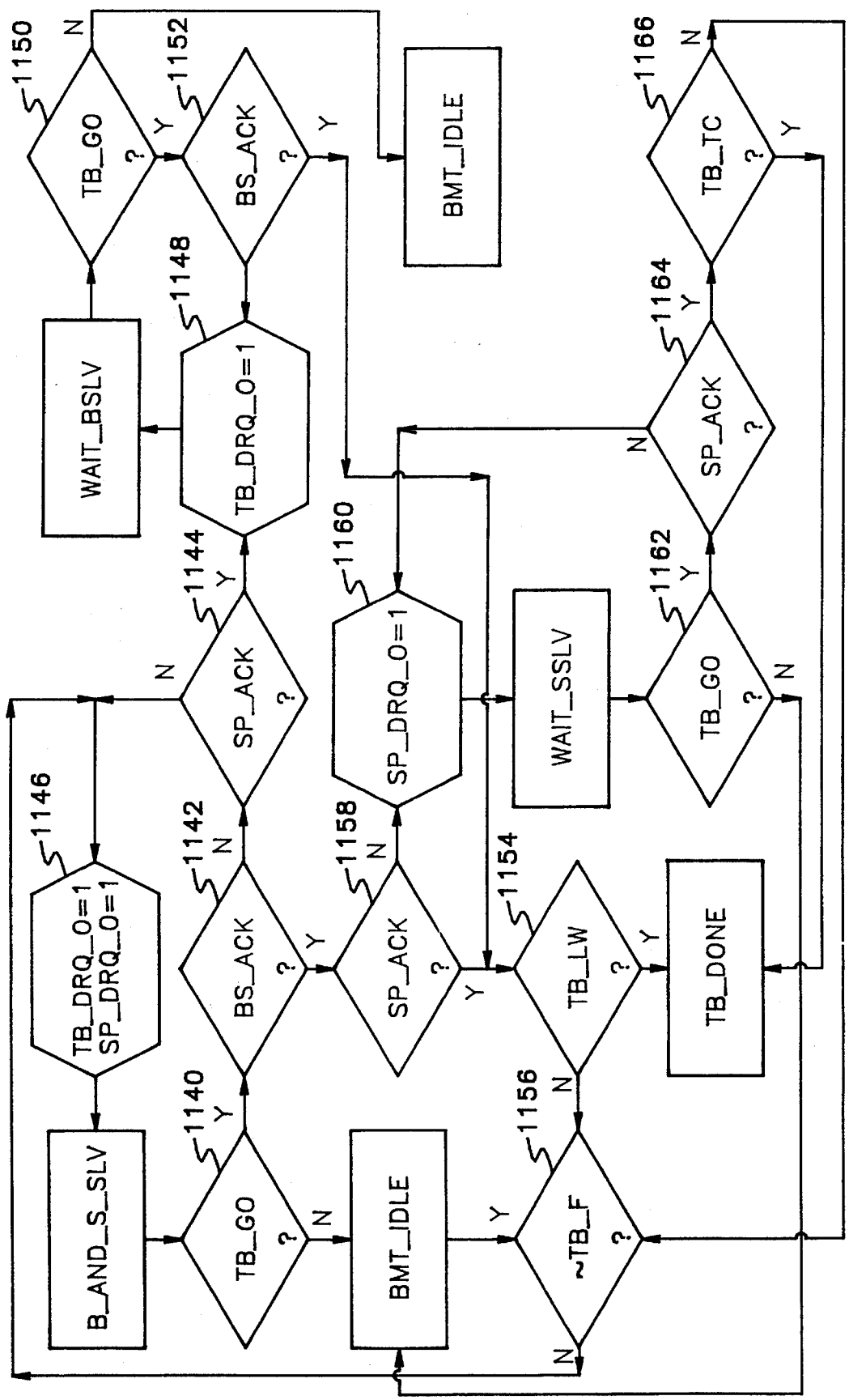

Control proceeds from the TB_DONE state, with a TB_DONE signal set during the TB_DONE state, to the BMT_IDLE state. From the B_AND_S_SLV state, (FIG. 20) indicating that both slaves are operational, if the TB_GO signal is not active as determined in block 1140, control proceeds to the BMT_IDLE state. If it is active, a determination is made in block 1142 whether the bus slave has responded. If not, a determination is made in block 1144 whether the siphon slave has responded. If not, the request signals stay asserted in block 1146 and control stays at the B_AND_S_SLV state. If at this time it was determined in block 1144 that the siphon slave had responded, only the TB_DRQ_O signal stays asserted to the bus slave in block 1148 and control transfers to the WAIT_BSLV state to wait until the bus slave has responded now that the siphon slave has responded. During the WAIT_BSLV state a determination is made in block 1150 whether the TB_GO signal is still present. If not, control returns to the BMT_IDLE state. If so, a determination is made in block 1152 whether the BS_ACK signal is active indicating that the bus slave has responded. If not, control returns through block 1148 and stays at the WAIT_BSLV state. If the bus slave has responded, a determination is made in block 1154 to determine if this is the final value to be transferred. If so, control proceeds from the WAIT_BSLV state to the TB_DONE state. If not, a determination is made in block 1156 whether the FIFO 1050 is almost full/almost empty, as appropriate. If so, control proceeds to the BMT_IDLE state and if not, control returns through block 1146 to the B_AND_S_SLV state to wait for the next complete transfer.

If in block 1142 it was determined that the bus slave had acknowledged, then in block 1158 a determination is made whether the siphon slave has acknowledged. If so, a determination is made in block 1154 whether the final value has been transferred and decisions proceed as before. If the siphon slave had not responded, its request signal remains asserted in block 1160 and control proceeds to the WAIT_SSLV state to wait for the siphon slave to respond. Decisions to exit the WAIT_SSLV state include determining if the TB_GO signal is present in block 1162. If not, control advances to the BMT_IDLE signal. If it is present, a determination is made in block 1164 whether the siphon slave has responded. If not, operation stays at the WAIT_SSLV state with the siphon slave request asserted. If it has acknowledged, a determination is made in block 1166 whether this is the terminal count of the transfer. If so, control proceeds to the TB_DONE state. If not, a determination is made in block 1156 as before to see if the FIFO 1050 is almost full/empty.

Thus in this manner by properly driving the request signals and the done signals, the handshaking necessary to operate a master on the CTB 104 is performed.

Figure 21:
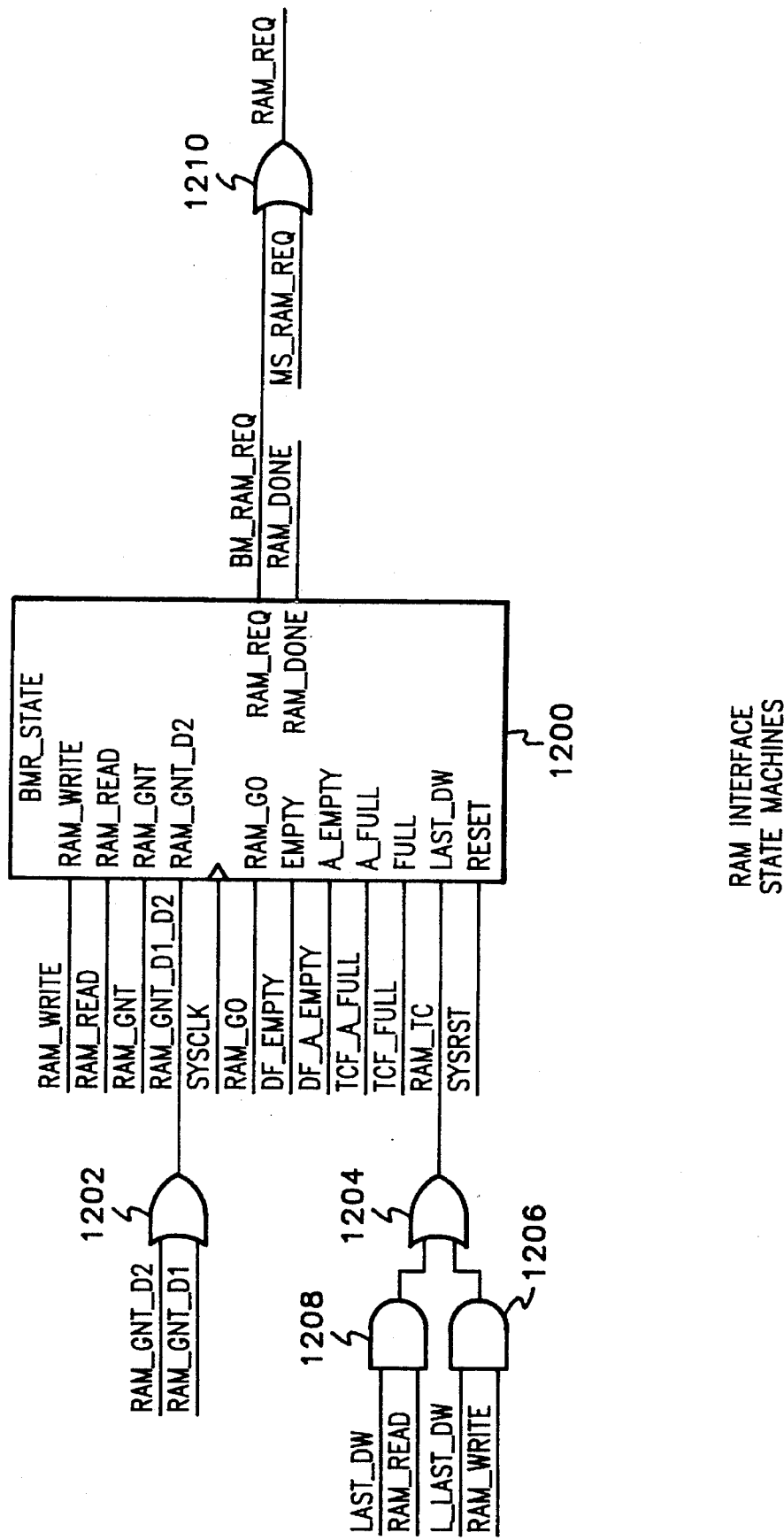

Similarly, a state machine 1200 (FIG. 21) is utilized to control the interface with the RAM controller 210. The state machine 1200 is the BMR state machine and utilizes several signals. A signal RAM_GO is received from the bus master main controller state machine 1300 to indicate that operation of the state machine 1200 is commenced. Similarly empty, almost empty, almost full and full signals related to the FIFO 1050 and the FIFO 1051 are received. In addition, the RAM_WRITE and RAM_READ signals are provided to indicate that the direction of transfer, while the RAM_GNT signal is provided from the RAM controller 210 to indicate that arbitration has provided the bus master channel controller 200 access to the transfer buffer RAM 118. Delayed versions of the RAM_GNT signal are referred to as the RAM_GNT_D2 and RAM_GNT_D1 signal and these are provided to the input of an OR gate 1202 whose output is also utilized by the state machine 1200. The state machine is clocked on the SYSCLK signal. A RAM_TC or terminal count signal is provided by the output of a two input OR gate 1204, whose inputs are the output of a two input AND gate 1206 and the output of a two input AND gate 1208. The AND gate 1206 receives the L_LAST_DW and RAM_WRITE signals, while the AND gate 1208 receives the LAST_DW and RAM_READ signals. The outputs of the state machine 1200 are a signal referred to as BM_RAM_REQ or bus master RAM request signal and a signal referred to as RAM_DONE to indicate that the transfer is completed from this portion. The BM_RAM_REQ signal is provided as one input to a two input OR gate 1210 whose other input is the micro-sequencer or MS_RAM_REQ signal. The output of the OR gate 1210 is the RAM_REQ signal, which is provided to the RAM controller 210 to indicate a request.

Figure 22:
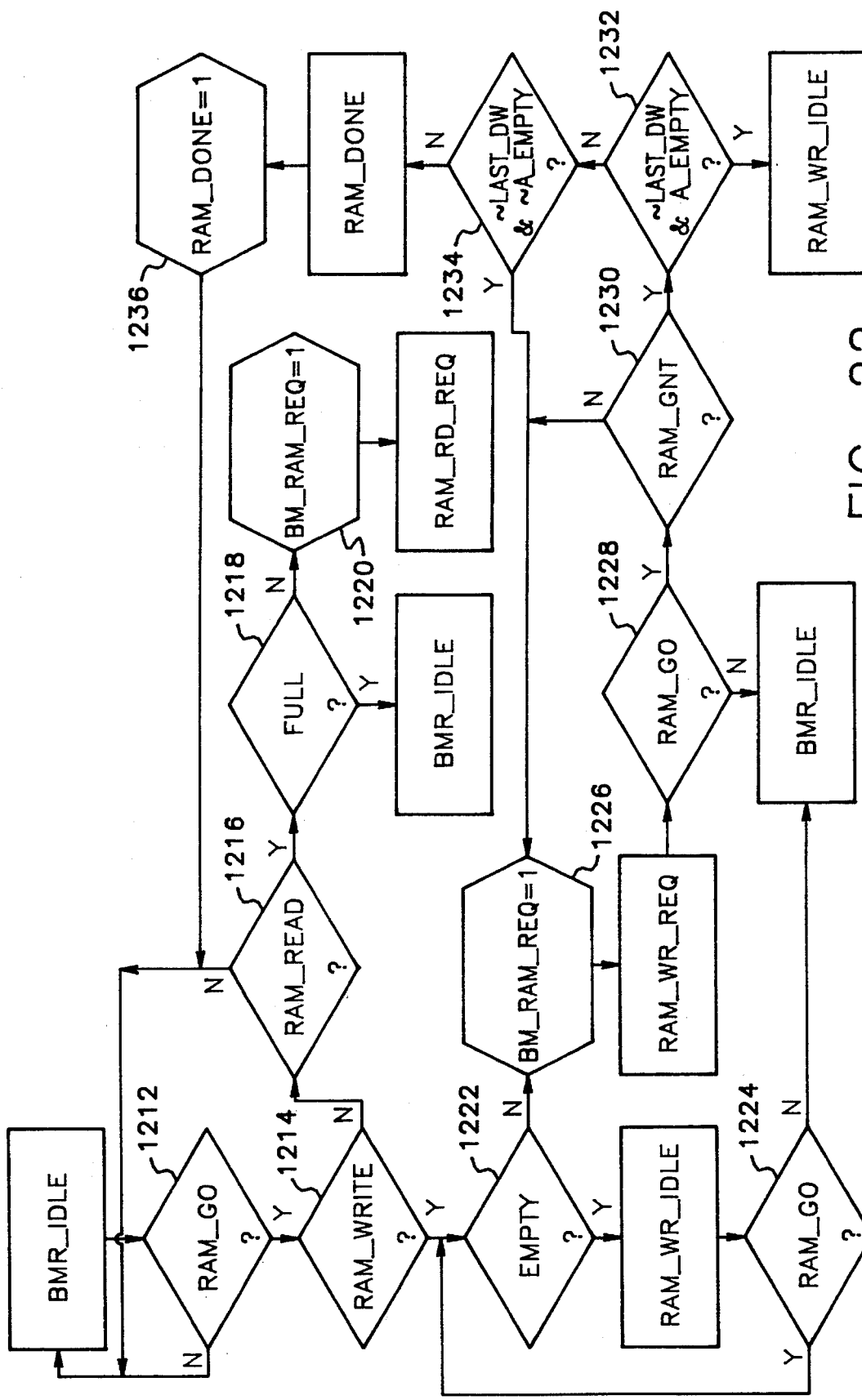

Operation of the BMR state machine 1200 proceeds as follows. Operation of the state machine 1200 starts at the BMR_IDLE state (FIG. 22) first determination made is in block 1212 to whether the RAM_GO signal is true. If not, control remains at the BMR_IDLE state. If RAM_GO is true, a determination is made in block 1214 whether this is a write by analyzing the RAM_WRITE signal. If not, a second determination is made in block 1216 whether the RAM_READ signal is true. If not, this is an improper condition and control stays at the BMR_IDLE state. If a read operation is being requested, the next determination is made in block 1218 to determine if the FIFO 1050 is full based on the FULL signal. If so, control proceeds from the BMR_IDLE state to the RAM_RD_IDLE state. If not, then the BM_RAM_REQ signal is set in block 1220 to indicate a need for data and control proceeds to the RAM_RD_REQ signal to obtain data.

If this had been a write operation after block 1214, an interrogation is made in block 1222 to determine if the FIFO 1050 is empty. If so, operation proceeds to the RAM_WR_IDLE state. Control proceeds from that state to determine in block 1224 if the RAM_GO signal is still true. If it is, block 1222 is reexecuted and control continues to loop at the RAM_WR_IDLE state. If not, control returns to the BMR_IDLE state. If the FIFO 1050 had not been empty as determined in block 1222, the BM_RAM_REQ signal is set in block 1226 to indicate that data has to be transferred and control proceeds to the RAM_WRITE_REQ state. Control proceeds from this state to determine in block 1228 if the RAM_GO signal is still true. If not, control returns to the BMR_IDLE state. If so, a determination is made in block 1230 whether access to the transfer buffer 118 has been obtained by analyzing the RAM_GNT signal. If access has not been granted, control returns through block 1226 and stays at the RAM_WR_REQ state. If access has been obtained, a determination in block 1232 is made whether this is not the last doubleword and if the FIFO 1050 is almost empty. If so, control proceeds to the RAM_WRITE_IDLE state. If not, a determination is made in block 1234 whether this is not the last doubleword and whether the FIFO 1050 is not almost empty. If the condition is yes, then additional writes are requested through block 1226 and control remains at the RAM_WR_REQ state. If the condition was not true, this is an indication that the writes to the transfer buffer RAM 118 are done, so operation proceeds from the RAM_WR_REQ state to the RAM_DONE state.

From the RAM_DONE state, in block 1236 the RAM_DONE signal is set and control goes to the BMR_IDLE state.

Figure 23:
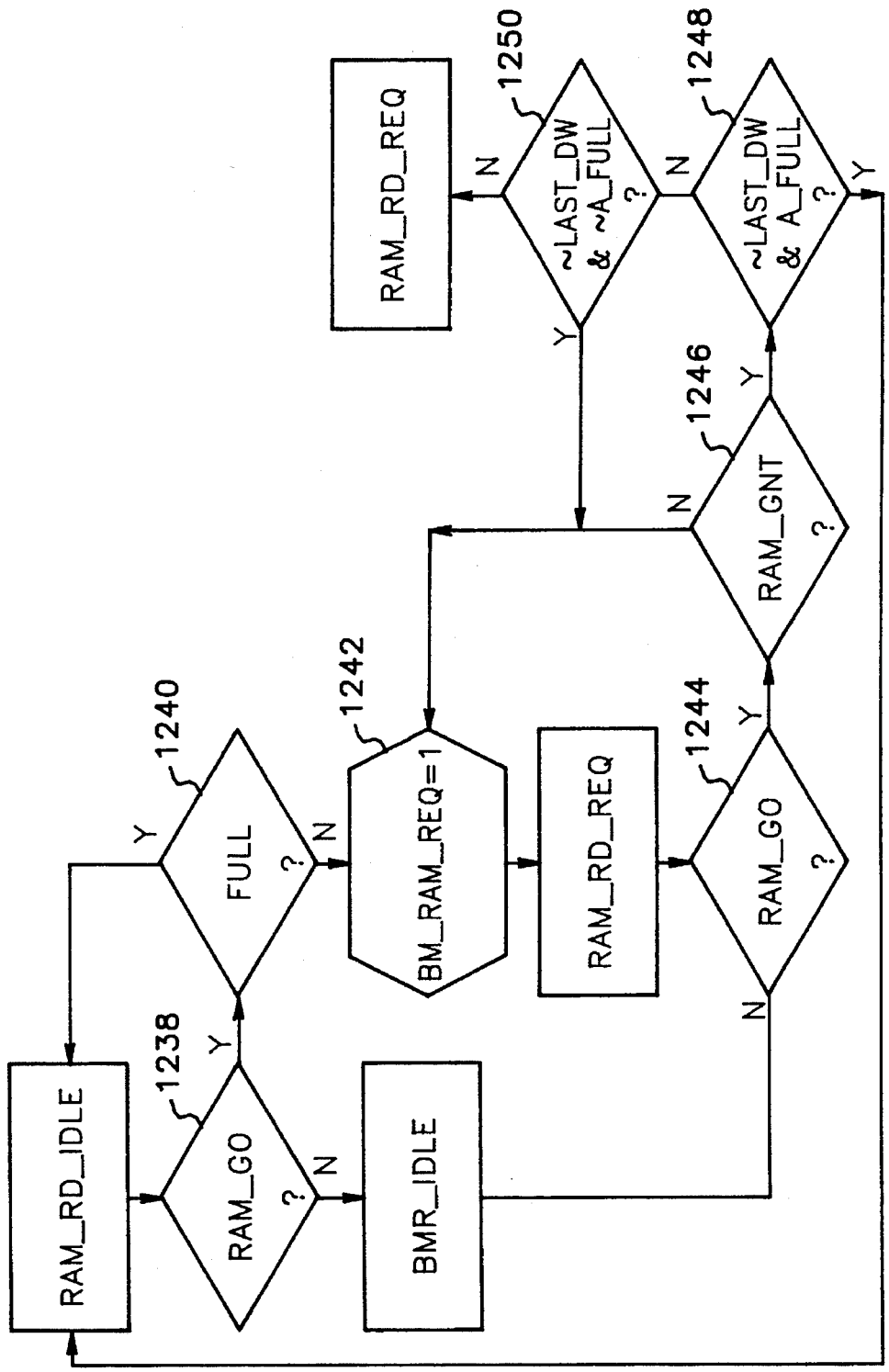

From the RAM_RD_IDLE state in block 1238 (FIG. 23) the RAM_GO signal is again analyzed. If no longer present, control proceeds to the BMR_IDLE state. If still present, the FULL signal is again monitored in block 1240 and if still true, control remains at the RAM_RD_IDLE state. If no longer true, indicating that data has been removed from the FIFO 1050, this is an indication that operations can be continued and further data can be obtained from the transfer buffer RAM 118. To this end the BM_RAM_REQ signal is made active in block 1242 and control proceeds to the RAM_RD_REQ state. From this state a determination is made in block 1244 whether the RAM_GO signal is true. If not, control returns to the BMR_IDLE state. If it is true, a determination is made in block 1246 whether transfer buffer RAM 118 access has been granted. If not, control returns and stays at the RAM_RD_REQ signal via block 1242. If access has been granted, a determination is made in block 1248 whether this is not the last word and whether the FIFO 1050 is almost full. If so, this is an indication that the final data will not be obtained and control transfers to the RAM_RD_IDLE state. If not true, then in block 1250 a determination is made whether this is not the last word and whether the FIFO 1050 is not almost full. If this is true, further data can be obtained and this is done via the path to block 1242. If not true, this is an indication that the operations are complete and control proceeds to the RAM_DONE state.

As previously noted, a state machine 1300 is also used to control the main operations, to start the other various state machines and to control other operations as necessary, including handling the various load operations on the CTB 104. There are numerous inputs and outputs to the state machine 1300 and they will be described during the description of its operation.

Figure 25:
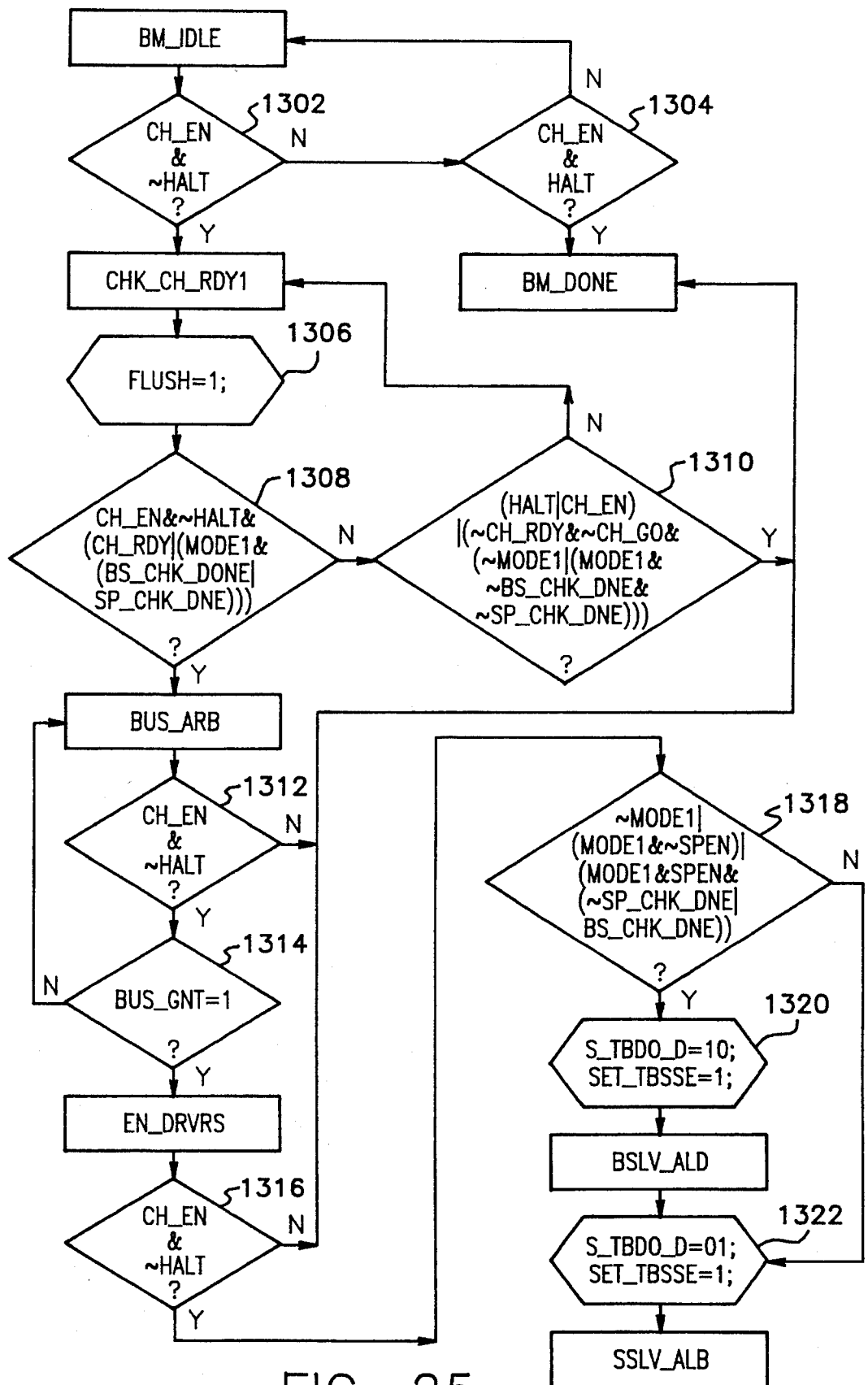

Operation of the channel control state machine 1300 commences at the BM_IDLE state (FIG. 25). A determination is made in block 1302 to determine if the CH_EN signal is active, indicating that channel transfer operations are enabled, and if the HALT signal is not true. If this condition is not met, then in block 1304 a decision is made if the CH_EN signal is true and the HALT signal true. If not, then control returns to the BM_IDLE state. If it is true, that condition is an indication that operations are completed and control proceeds to the BM_DONE state. If in block 1302 it was determined that operations were enabled and not halted, control proceeds to the CHK_CH_RDY1 state.

Control proceeds from this state by setting the flush bit in block 1306 to clear the FIFOs to block 1308 where a decision is made. The decision is whether the transfer thread is ready or mode 1 is active and the bus slave or siphon slave ready check has been made. If not true, then another condition is evaluated in block 1310. This condition is whether operations are halted or disabled or the channel is not ready and not mode 1 or mode 1 and neither slave is ready. If this condition is not true, control stays at the CHK_CH_RDY1 state waiting for the various slave devices to indicate that they are ready for operation and the transfer channel to be available. If the determination had been yes in block 1310, the transfer was completed and control proceeds to state BM_DONE. If a yes result was determined in block 1308, control proceeds to the BUS_ARB state to initiate an arbitration on the CTB 104. This state is exited to a first block 1312 to determine if the channel is still enabled and not halted. If not true, this is an indication of a done state and control proceeds to the BM_DONE state. If it is true, a determination is made in block 1314 to see if the CTB 104 has been granted to the bus master channel controller 200. If not, control remains at the BUS_ARB state until it does. If the CTB 104 had been obtained, control proceeds from the BUS_ARB state to the EN_DRVRS state to enable the drivers of the bus master channel controller 200 to drive the CTB 104. A determination is then made in block 1316 to see if the channel is still available and not halted. If not, control returns to the BM_DONE state. If so, control proceeds to block 1318 where a decision is made whether the siphon slave address should be loaded at this time or whether the bus slave must be loaded first. If the bus slave is to be loaded, in block 1320 the S_TBDO_D signals are set to a value of 10 and the SET_TBSSE signal is set to 1 so that the enable signal is provided on the CTB 104. The setting of the S_TBDO_D bits indicates that the bus slave address is to be driven onto the CTB 104. Control then proceeds to the BSLV_ALD state. If it was time to drive the siphon slave address, then in block 1322 the S_TBDO_D value is to 01 to indicate a slave address and the SET_TBSSE signal is activated to indicate active cycles on the CTB 104. Control then proceeds to the SSLV_ALD state.

Figure 26:
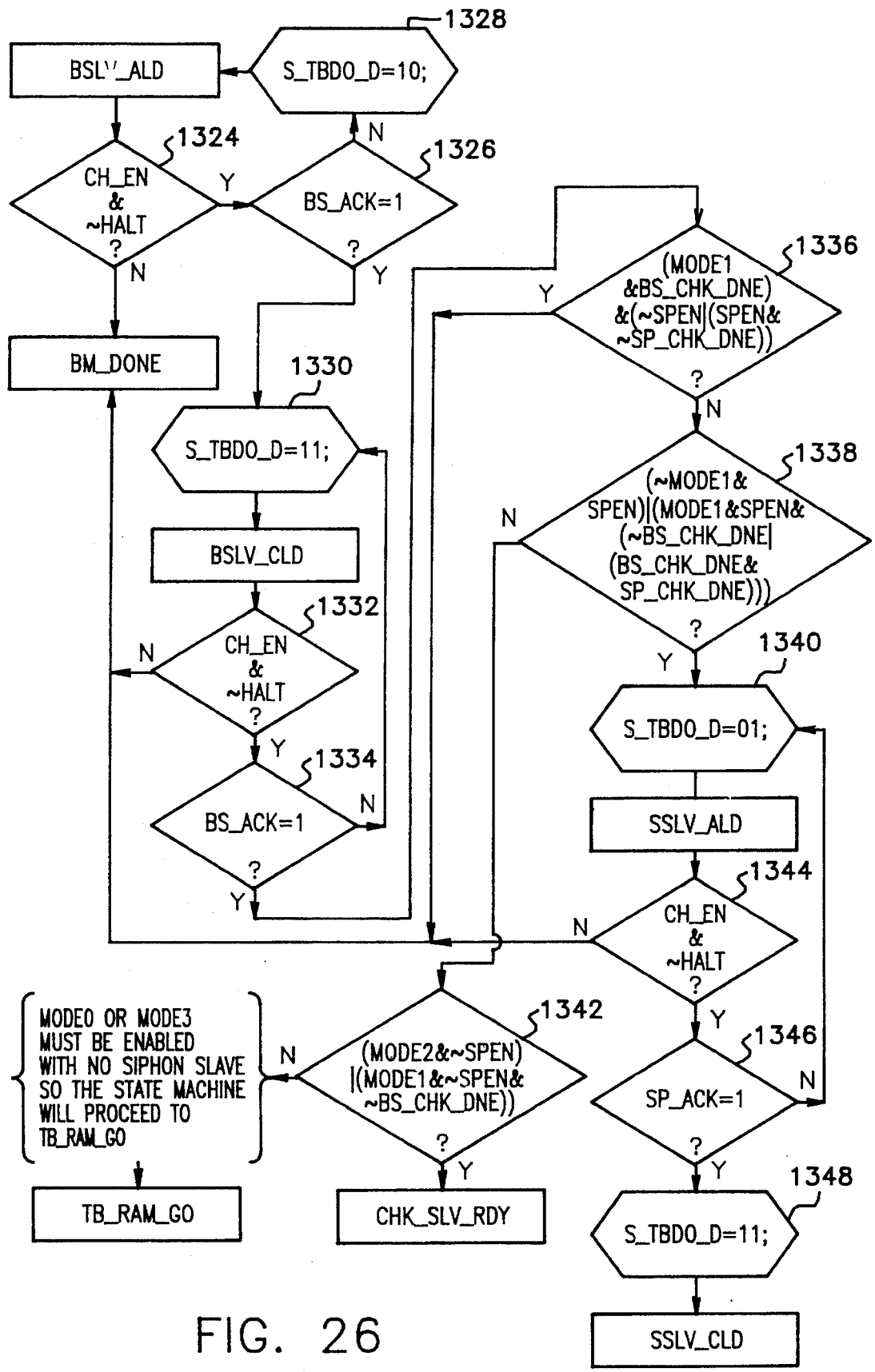

At the BSLV_ALD state a determination is made in block 1324 (FIG. 26) to determine if the channel is still enabled and not halted. If not, control proceeds to the BM_DONE state. If it is available, a determination is made in block 1326 to see if the bus slave has acknowledged the presence of the address. If not, the address remains directed to the bus and the enable signal is still active in block 1328, with control staying at the BSLV_ALD state. If the address was acknowledged, then it is proper to drive the terminal count and slave specific data, so in block 1330 the S_TBDO_D signals are changed to a value of 11 to properly drive the terminal count information. Control transfers to the BSLV_CLD state. Exit from this state is based on a determination in block 1332 if the channel is still available and not halted. If not, control returns to the BM_DONE state. If so, in block 1334 a determination is made whether the terminal count information has been acknowledge by the bus slave. If not, control stays at the BSLV_CLD state through block 1330. If so, then a determination is made in block 1336 whether mode 1 is operational and the bus slave has responded. If so, control proceeds to the BM_DONE state. If not, another determination is made in block 1338 as follows: if other than mode 1 and siphoning is active or mode 1 and siphoning and the bus slave is not done or both slaves are done. If true, then this is an indication that it is appropriate time to provide the siphon slave address so the S_TBDO_D values are changed to 01 in block 1340 and control proceeds to the SSLV_ALD state. If not, a determination is made in block 1342 to determine if this is mode 2 and not siphoning or mode 1 and not siphoning and the bus slave is not done. If this is true, control proceeds to the CHK_SLV_RDY state. If not, this is an indication that either mode 3 or mode 0 is enabled with no siphon slaves and it is now appropriate to transfer data. Therefore control proceeds to the TB_RAM_GO state.

From the SSLV_ALD state a determination is made in block 1344 if the channel is enabled and not halted. If not true, control proceeds to the BM_DONE state. If it is true, then a determination is made in block 1346 to see whether the siphon slave has acknowledged its address. If not, control remains at the SSLV_ALD state through block 1340. If so, then it is time to transfer the transfer count to the siphon slave and this is done by setting the S_TBDO_D value to 11 in block 1348 and control proceeds to the SSLV_CLD state.

Figure 27:
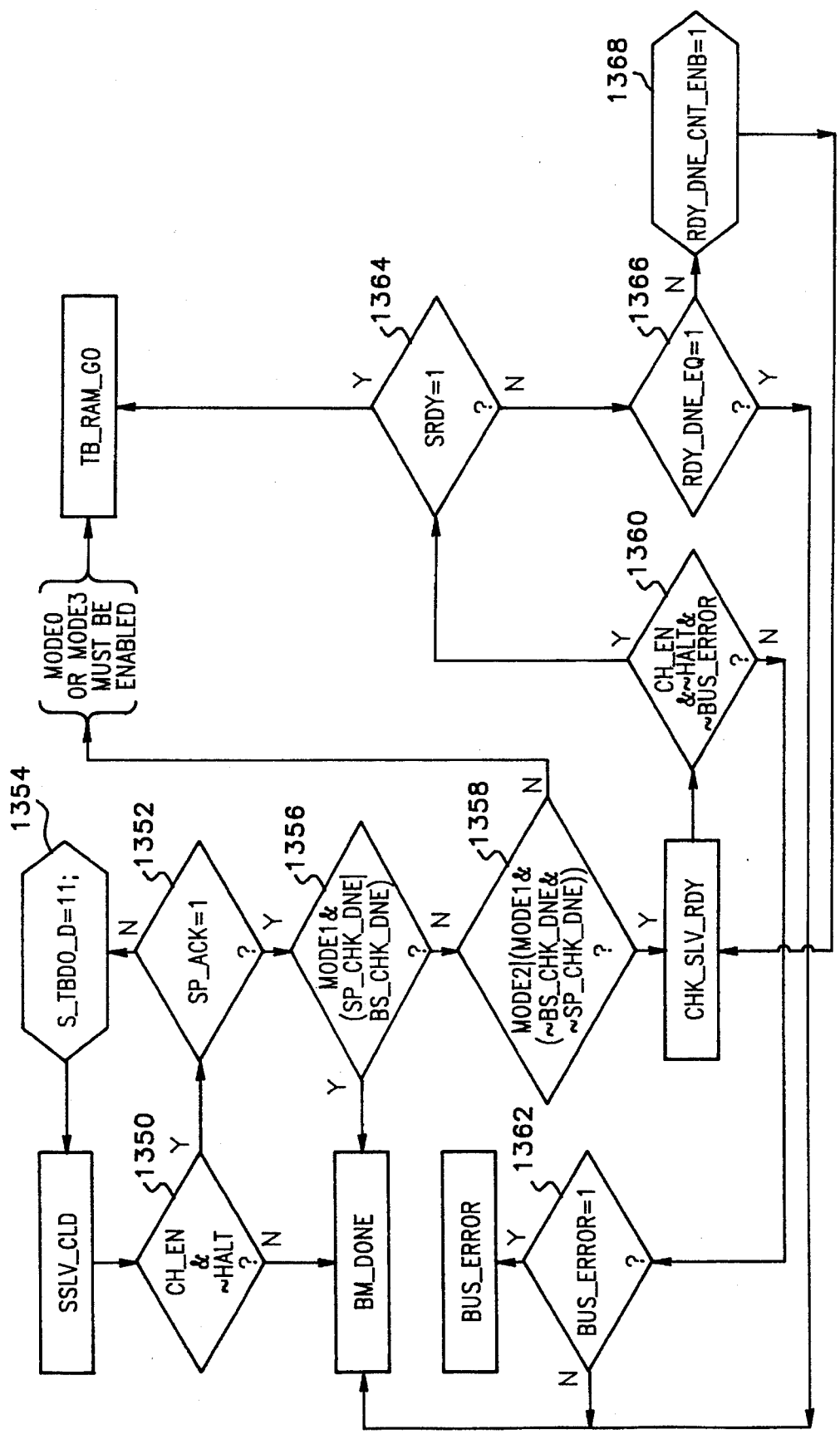

In the SSLV_CLD state a determination is made in block 1350 (FIG. 27) to determine whether the channel is still available and not halted. If not, control proceeds to the BM_DONE state. If so, a determination is made in block 1352 whether the siphon slave has responded with an acknowledge signal. If not, the bus master must remain waiting for the acknowledgement so that the S_TBD0_D signals remain at 11 in block 1354 and control remains at the SSLV_CLD state. If it has been acknowledged, a decision is made in block 1356 whether mode 1 operation is active and both the bus slave and siphon slave have responded as done. If so, control proceeds to the BM_DONE state. If not, a determination is made in block 1358 whether mode 2 is active or whether mode 1 is active and neither one has responded. If not, then this is mode 0 or mode 3 operation and control proceeds to the TB_RAM_GO state as it is time to start the data transfer. If the condition is yes, control proceeds to the CHK_SLV_RDY state.

Control proceeds from this state by determining in block 1360 whether the channel has been enabled, is not halted and there has not been a bus error. If this condition is not true, then a determination is made in block 1362 if a bus error has occurred. If so, control proceeds to the BUS_ERROR state. If not, control proceeds to the BM_DONE state. If the condition was true in block 1360, i.e. a transfer is occurring normally, a determination is made in block 1364 whether the bus slave has indicated ready. If so, it is appropriate to begin data transfer and control proceeds to the TB_RAM_GO state. If not, control proceeds to block 1366 to determine if the READY_DNE_EQ signal is asserted. If so, control proceeds to the BM_DONE state as operations have completed. If not, the RDY_DNE_CNT_ENB value is set to 1 in block 1368 and control proceeds to the CHK_SLV_RDY state with a timer enabled so that should the slave not respond ready in a proper period of time, the RDY_DNE_EQ value will become a 1 because of the time out and operations will abort.

Figure 28:
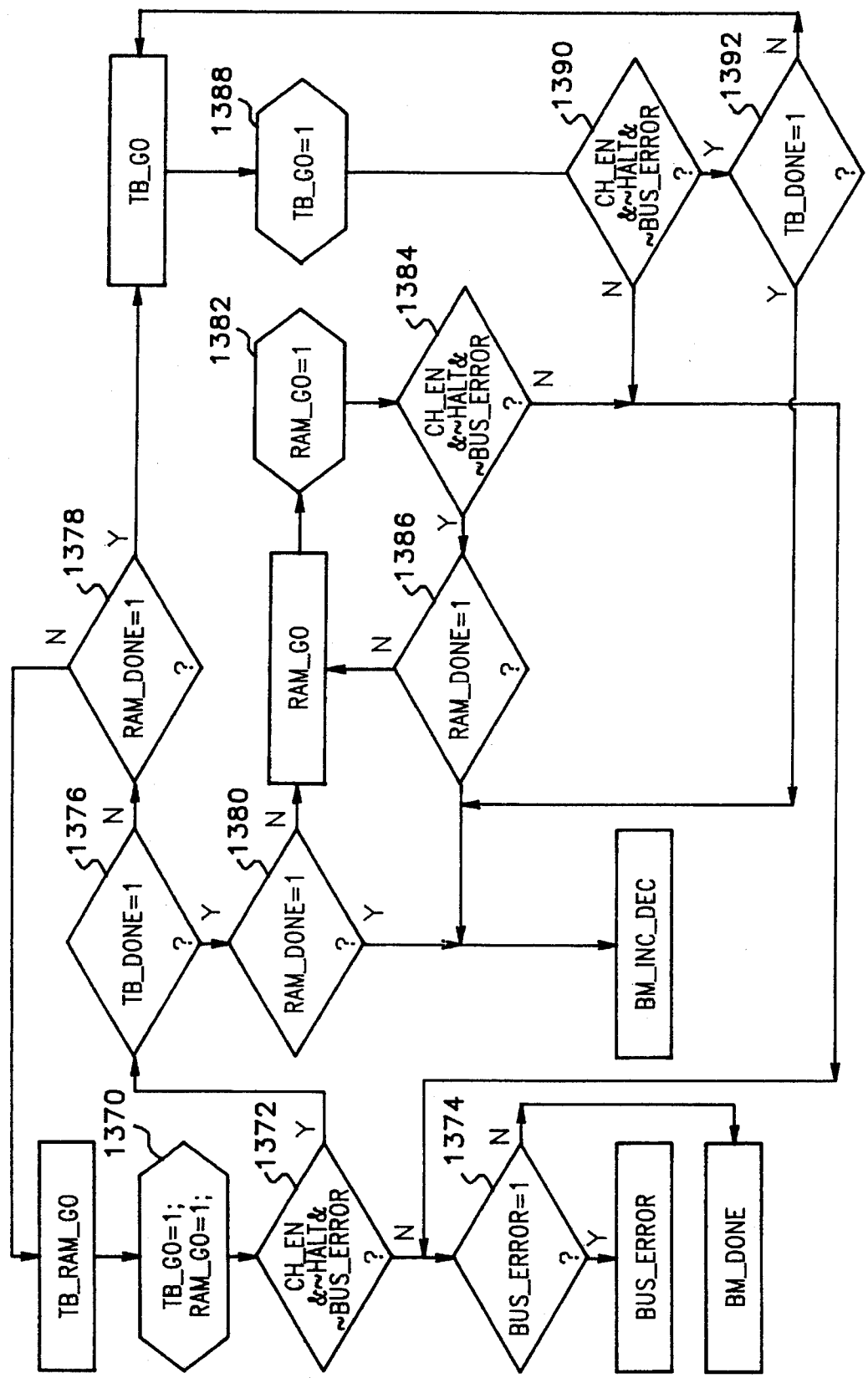

From the TB_RAM_GO state, in block 1370 (FIG. 28) the TB_GO and RAM_GO signals are set so that both of the transfer bus and RAM control state machines 1090 and 1200 are activated to allow data to be transferred between the transfer buffer RAM 118 and the CTB 104. In block 1372 a determination is made whether the channel is still enabled, not halted and has no bus error. If the statement is not true, then in block 1374 a determination is made whether there has been a bus error. If so, control proceeds to the BUS_ERROR state. If not, control proceeds to the BM_DONE state. If operations are proceeding normally, then at block 1376 the TB_DONE signal is evaluated to determine if the transfer bus state machine 1090 has completed its operations. If not, in block 1378 a determination is made as to whether the transfer buffer RAM 118 has completed its operations. If not, control stays at the TB_RAM_GO state. If the transfer bus has completed its operations, a determination is made in block 1380 whether the transfer buffer RAM 118 operations have completed. If so, control proceeds to the BM_INC_DEC state. If not, control proceeds to the RAM_GO state waiting for the transfer buffer RAM 118 to finish. In this state the RAM_GO signal remains 1, while the TB_GO signal is deasserted in block 1382. A determination is made in block 1384 whether the channel is enabled, not halted and not in error. If this condition is not true, operation proceeds to the determination of block 1374. If true, in block 1386 a determination is made whether the RAM transfer has completed. If not, control returns to the RAM_GO state and cycles through this loop. If so, control proceeds to the BM_INC_DEC state.

If the RAM had completed its operations in block 1378, this would indicate that the transfer bus has yet to complete its operations and so control proceeds to the TB_GO state. The TB_GO signal remains asserted in block 1388 with the RAM_GO signal being deasserted. In block 1390 the channel enabled, not halted and not errored condition is determined. If not true, control proceeds through the path of block 1374. If operations are proceeding along normal course, then a determination is made in block 1392 if the CTB 104 has completed operations. If not, control remains in state TB_GO. If so, control proceeds to state BM_INC_DEC.

Figure 29:
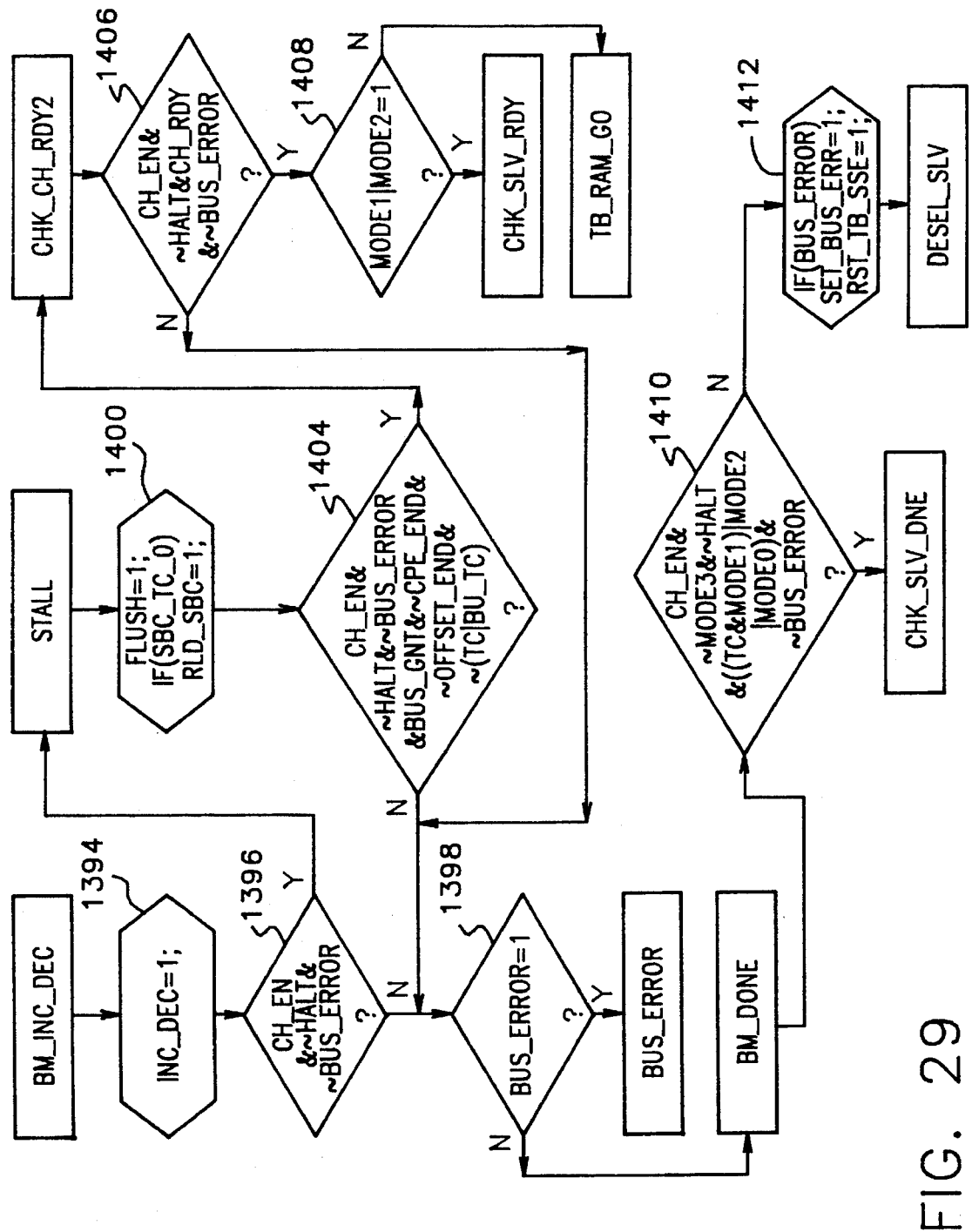

In state BM_INC_DEC control proceeds so that the value of the INC_DEC signal is set in block 1394 (FIG. 29) to adjust the relative FIFO tracking logic used when concurrent disk transfer channels are ongoing and to allow the stripe block counter 1030 to count, and again satisfactory status of the transfer operation is interrogated in block 1396. Control then proceeds if not true to block 1398 to determine if an error had occurred. If so, control proceeds to the BUS_ERROR state. If no error, control proceeds to the BM_DONE state. If operations were proceeding along normally, control proceeds from the BM_INC_DEC state to the STALL state to allow time for the FIFO 1050 status to become valid. From the STALL state in block 1400 the FLUSH signal is set to clear the FIFO 1050 and the FIFO 1051. It is time to reload a new address block and if an offset operation is occurring and terminal count has been reached, the reload or RLD_SBC value is set so that an add operation occurs in the slave memory address counter 1038 and the stripe size is provided to the stripe block counter 1030. In block 1404 if operations are proceeding normally and the bus was granted and not at the end and it was not time to do an offset and terminal count was not reached and it was not time to halt based on a bus utilization timer timeout, this is an indication that the transfer has completed and so control proceeds through block 1398. If this was true, then control proceeds to the CHK_CH_RDY2 state.

In block 1406 from the CHK_CH_RDY2 state a determination is made whether the channel is enabled, not halted, is ready and no error has occurred. If not, control proceeds through block 1398. If so, in block 1408 a determination is made as to whether mode 1 or mode 2 operation is occurring. If either is true, then control transfers to the CHK_SLV_RDY state to wait until the slaves have actually completed and indicated done. If not, control proceeds to the TB_RAM_GO state.

Figure 30:
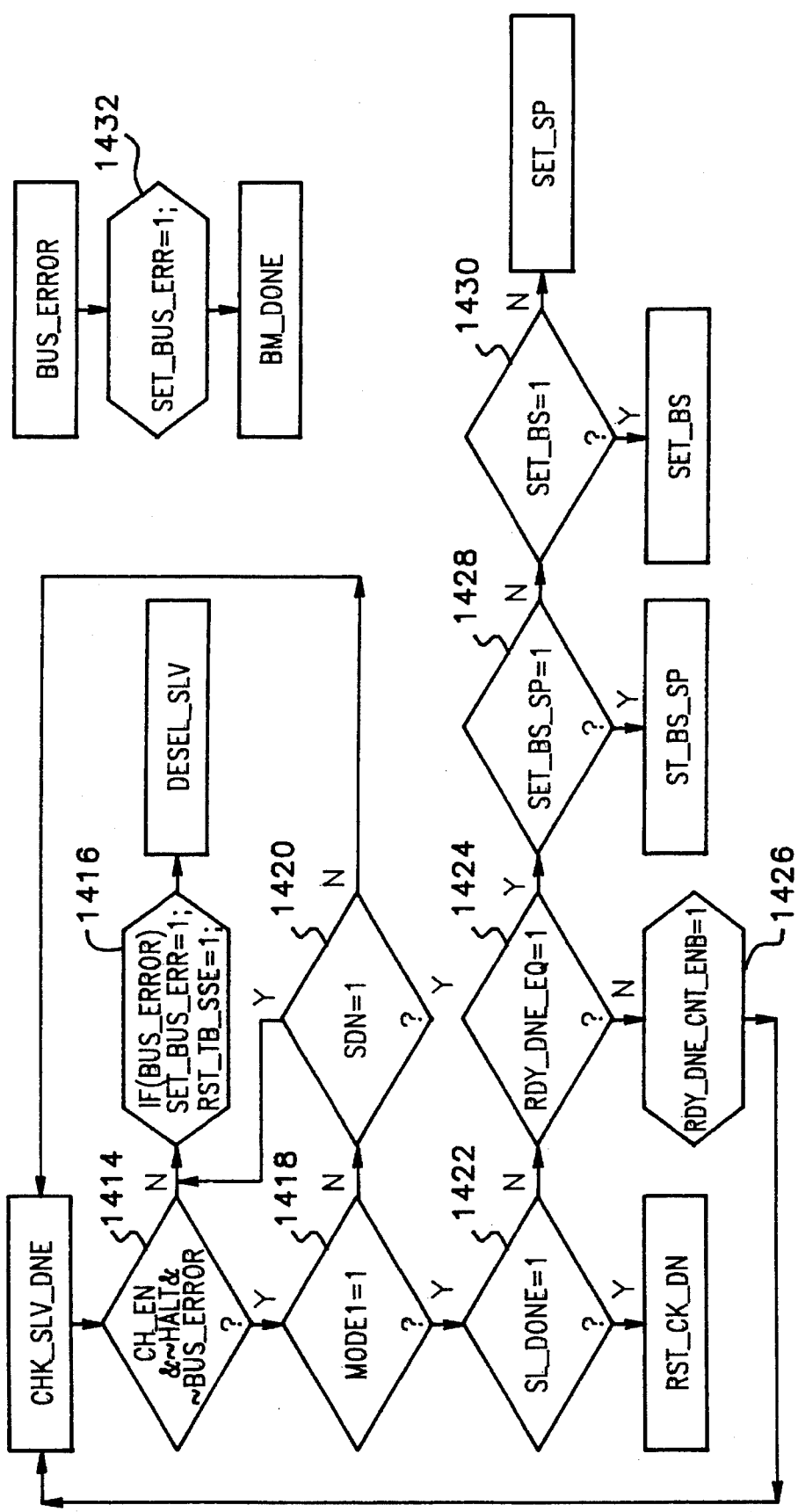

When the BM_DONE state is active, a determination is made in block 1410 whether it is appropriate because of the mode to check for a completed slave. If so, control proceeds to the CHK_SLV_DNE state. If not, in block 1412 if an error has occurred, the SET_BUS_ERR signal is set and the RST_TB_SSE signal is reset so that the CTB 104 is deselected. Control then proceeds to the DESSEL_SLV state. In this mode where it is appropriate to check that the slave was done in the CHK_SLV_DONE state, operation is evaluated at block 1414 (FIG. 30) to determine whether an error had occurred, if the channel is enabled and it was not halted. If not, control in block 1416 sets a bus error value if one had occurred and indicates that release should be developed and control proceeds to the DESSEL_SLV state. If true that operations are proceeding normally, control determines in block 1418 if mode 1 operation is selected. If not, in block 1420 a determination is made whether a slave was done. If so, operation proceeds through block 1416. If not, operation remains at the CHK_SLV_DNE state. If mode one operation is in effect as determined in block 1418, in block 1422 a determination is made whether the SL_DONE signal is true. If so, control proceeds to RST_CK_DN state. If not, a determination is made in block 1424 to determine whether the time out had occurred. If not, the counter is enabled in block 1426 and control loops at the CHK_SLV_DNE state. If so in block 1424, then a determination is made in block 1428 whether the SET_BS_SP signal is true. This is an indication that neither the bus slave nor the siphon slave were done. If so, control proceeds to the SET_BS_SP state. If not, a determination is made in block 1430 whether the SET_BS signal is true. This indicates that the siphon slave has completed but the bus slave is not done. If so, control proceeds to the SET_BS state. If not, control proceeds to the SET_SP state.

If an error has occurred and control has proceeded to the BUS_ERR state, then in block 1432 the SET_BUS_ERR signal is set and control proceeds to the BM_DONE state.

Figure 31:
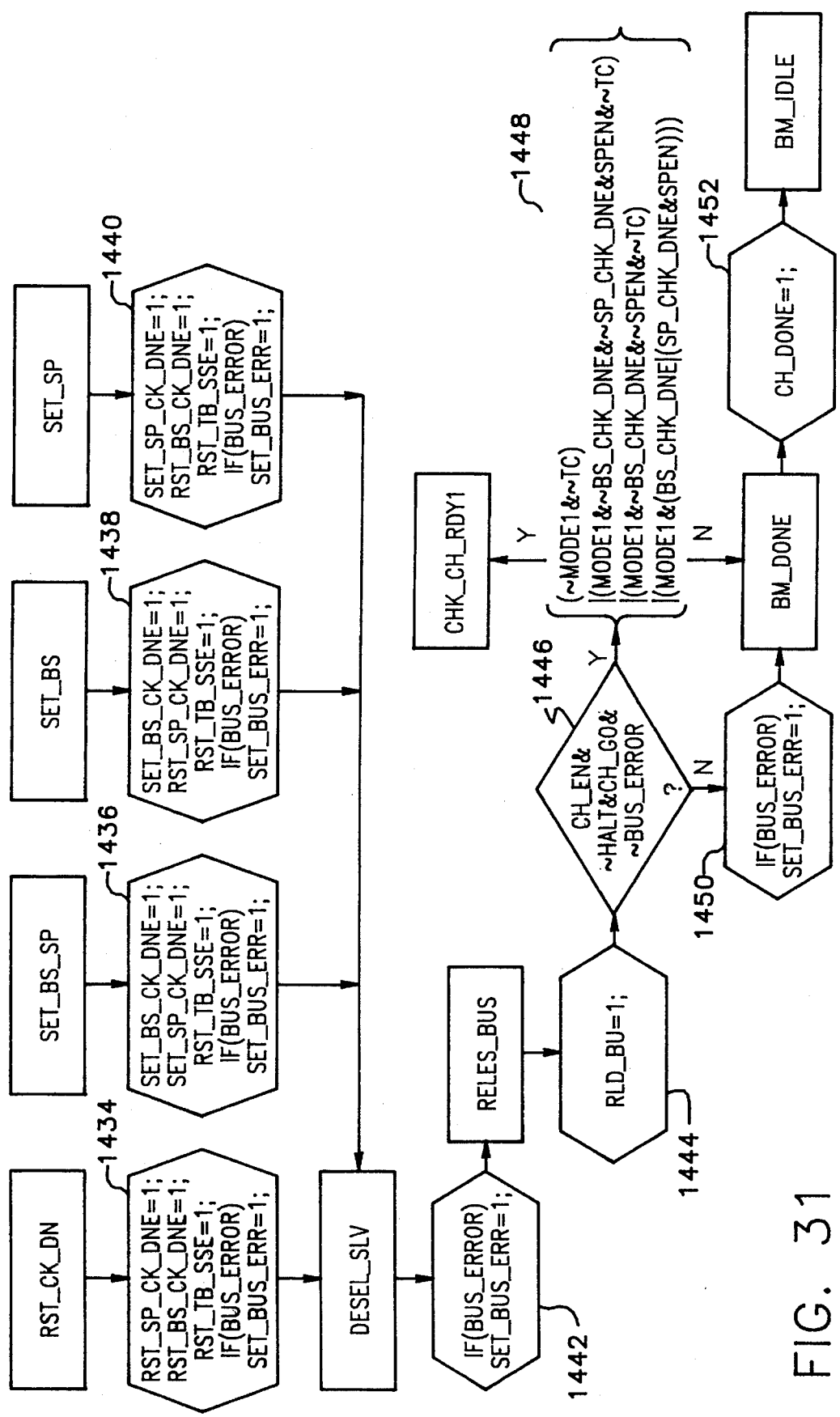

The RST_CK_DN, SET_BS_SP, SET_BS and SET_SP states (FIG. 31) are all error states, so that the buses are released by setting and clearing the proper variables and the bus error is set in blocks 1434, 1436, 1438 and 1440 and control proceeds to the DESEL_SLV block. A determination is then made in block 1442 if a bus error has occurred and if so the SET_BUS_ERR signal is set. Control then proceeds to the RELES_BUS state. Control then proceeds to the block 1444 where the RLD_BU signal is set so that the bus utilization timer is reloaded with a programmable value, so that one bus master does not hog the CTB 104, and then to block 1446 where a condition is tested to see that the channel is enabled, has a go signal and has not ended. If so a further condition is tested in block 1448. This condition is basically a check for the FIFO 1050 containing data if not in mode 1 or if in mode 1 and not just having determined done, the FIFO 1050 is to be checked for data. If true, control proceeds to the CHK_CH_RDY1 state. If the condition was false in block 1446, if an error is true then in block 1450 the SET_BUS_ERR signal is set. From block 1450 or from block 1448 if that condition was not true, control proceeds to state BM_DONE and from there to block 1452 where the CH_DONE signal is set to indicate that the channel transfer is done to interrupt the local processor 106. Control then proceeds to the BM_IDLE state to await the next transfer operation.

In addition, several signals are provided by the controller state machine 1300 when certain states are active. The TB_ALD_O signal to the CTB 104 is active during the BSLV_ALD and BSLV_CLD states. The SP_ALD_O signal to the CTB 104 for siphon slave loading is active during the SSLV_ALD and SSLV_CLD states. The TB_MDNE_O signal to indicate a master done status on the CTB 104 is provided during the BM_DONE state. The BUS_REQ signal to obtain the CTB 104 is active during all but the BM_IDLE, CHK_CH_RDY1, RELES_BUS and BM_DONE states. The EN_TB_DRVRS signal is active in all the states except BM_IDLE, CHK_CH_RDY1, RELES_BUS and BM_DONE states and BUS_ARB states.

Figure 32:
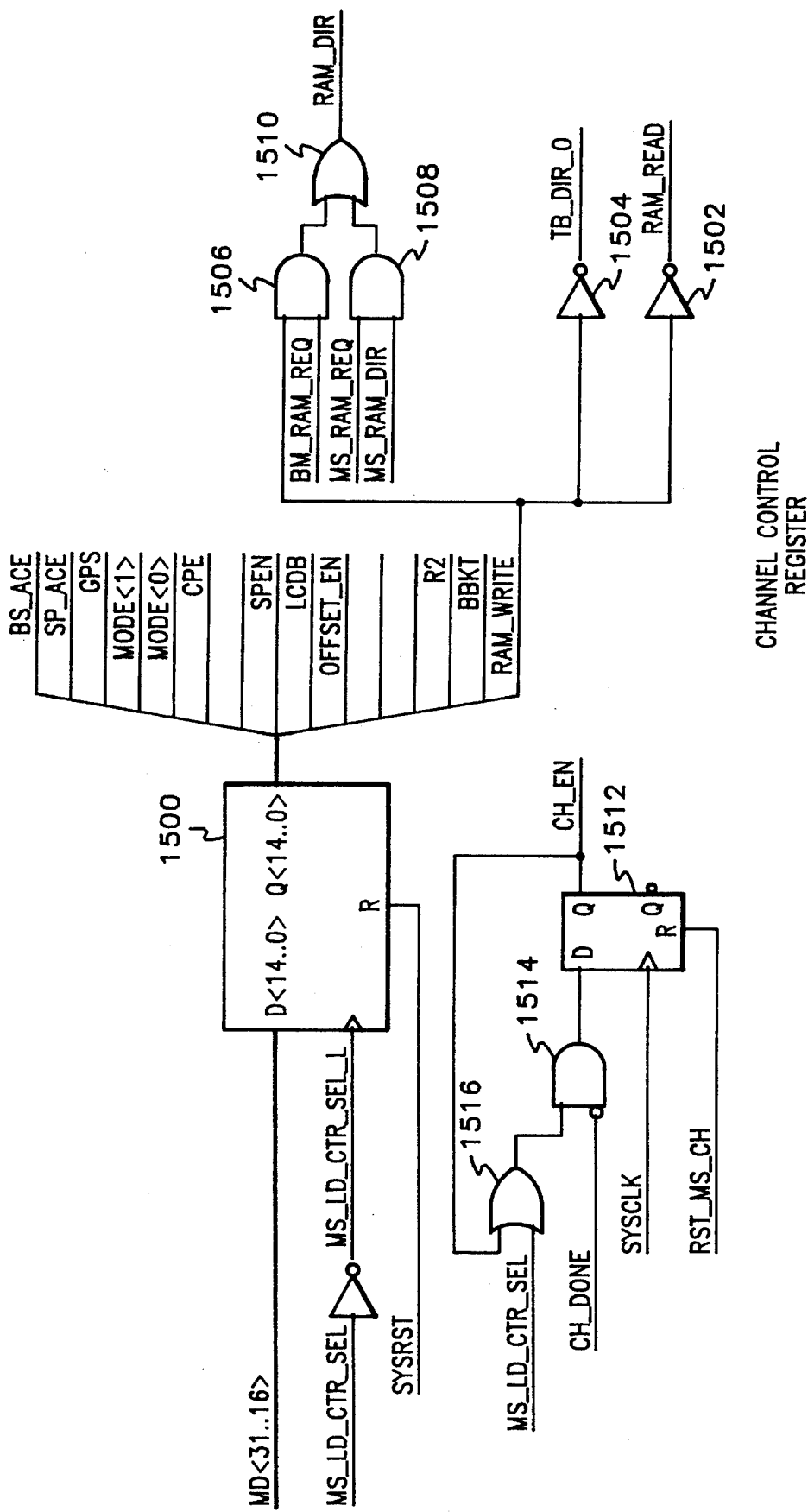

As noted above the CDB also utilizes a control register. This control register is shown in FIG. 32 as register 1500. It is loaded at an appropriate time in the CDB load sequence. The RAM_WRITE or WRR output from the control register 1500 is provided to an inverter 1502 to produce the RAM_READ signal and to an inverter 1504 to produce the TB_DIR_O signal. In addition, the RAM_WRITE signal is provided to one input of a two input AND gate 1506, with the other input receiving the BM_RAM_REQ signal. A two input AND gate 1508 receives the MS_RAM_REQ signal and the MS_RAM_DIR signal from the microsequencer. The output of the AND gates 1506 and 1508 are provided to the inputs of an OR gate 1510 to provide a RAM_DIR signal.

As previously noted, the CH_EN signal or channel enable signal must be developed. This is provided by the output of a D type flip-flop 1512. The flip-flop 1512 is clocked by the SYSCLK signal and receives at its D input the output of a two input AND gate 1514. One input to the AND gate is inverted and receives the CH_DONE signal from the controller state machine 1300 to terminate the enablement. The second input of the AND gate 1514 is provided by the output of a two input OR gate 1516. One input of the OR gate 1516 receives the CH_EN signal and the second input receives the CDB control register load signal to indicate that the control register of the CDB has just been loaded. As indicated above, the control register information is provided in the final doubleword of the CDB, so that it is an indication that all of the information has been loaded into the appropriate registers and the thread or channel can be enabled.

Figure 33:
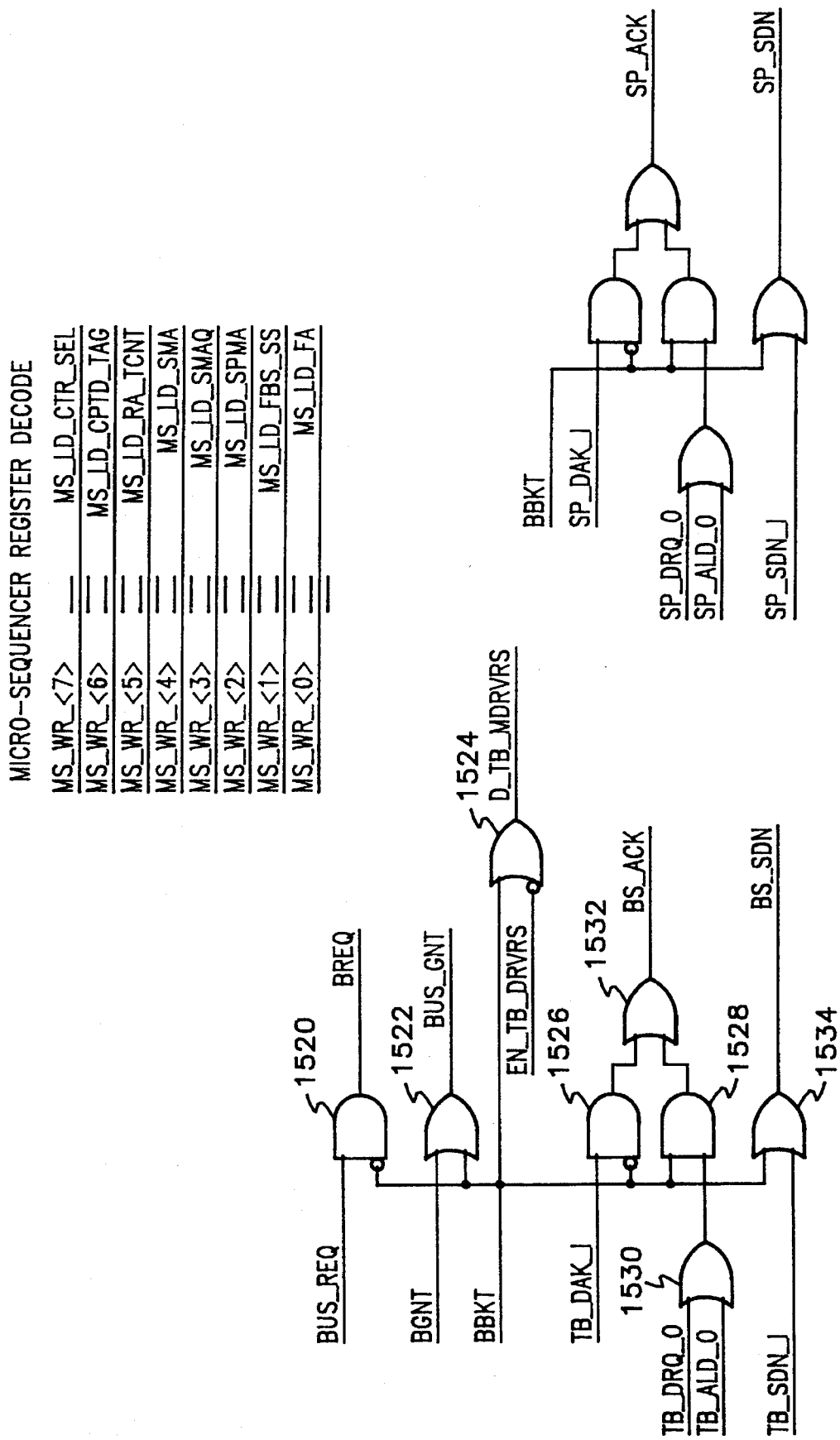

Various signals are used by the various state machines. The BUS_REQ signal is provided to one input of a two input AND gate 1520 (FIG. 33), whose second input is inverted and receives the BBKT signal. The output of the AND gate 1520 is the BREQ or bus request signal. The BBKT signal is an indication that this particular transfer from the transfer buffer RAM 118 is to the bit bucket or to nowhere. This is useful in that it allows a simple string of CDBs to be built such that the local processor 106 can direct a sequential read of a full stripe or long sequence of data from the particular disk and various individual sectors or blocks in that continuous string may be omitted. The first CDB in the string actually transfers data. In the next CDB, the BBKT signal is set so that this block is ignored. Then another CDB with the BBKT signal negated is used to transfer the next portion of the data. The use of this simple mechanism for the CDB operation allows just the desired areas to be selected so that the transfer buffer RAM 118 can be easily noted as being cleared.

The BGNT signal is combined in a two input OR gate 1522 with the BBKT signal to produce the BUS_GNT signal so that it appears that the CTB 104 is always available during BBKT operations. The BBKT signal is combined in a two input OR gate 1524, with the other input being inverted and receiving the enable driver signal or EN_TB_DRVS signal from the state machine 1300 and producing the D_TB_MDRVRS or disable the master driver signal. In this manner the actual driver circuitry is disabled during bit bucket operations.

The BBKT signal is provided to the inverted input of a two input AND gate 1526, with the other input receiving the TB_DAK_I or acknowledge signal from the CTB 104. Similarly the BBKT signal is provided to one input of a two input AND gate 1528 whose other input receives the output of a two input OR gate 1530. The two inputs to the OR gate 1530 are the TB_DRQ_O and TB_ALD_O signals to indicate the various command phases on the CTB 104 where data is being provided by the bus master controller 200. The outputs of the AND gates 1526 and 1528 are provided as the inputs to an OR gate 1532, whose output is the BS_ACK signal to indicate a bus slave acknowledgement. Thus an acknowledgement is simulated for bit bucket operations. The BBKT signal is also provided as one input to a two input OR gate 1534 whose other input the TB_SDN_I signal to indicate that the slave is done. The output is the BS_SDN signal.

The BBKT signal is also used with siphon master logic to produce similar signals. In this manner the SP_ACK and SP_SDN signals are produced from the various done request and acknowledge signals and always driven during bit bucket operations.

A micro-sequencer is used to load the CDB information into the appropriate registers. The micro-sequencer is based on a counter which provides its output to a decoder, so that the decoder indicates eight particular operations. The eight individual binary states are decoded to a mnemonic form in FIG. 33.

Figure 34:
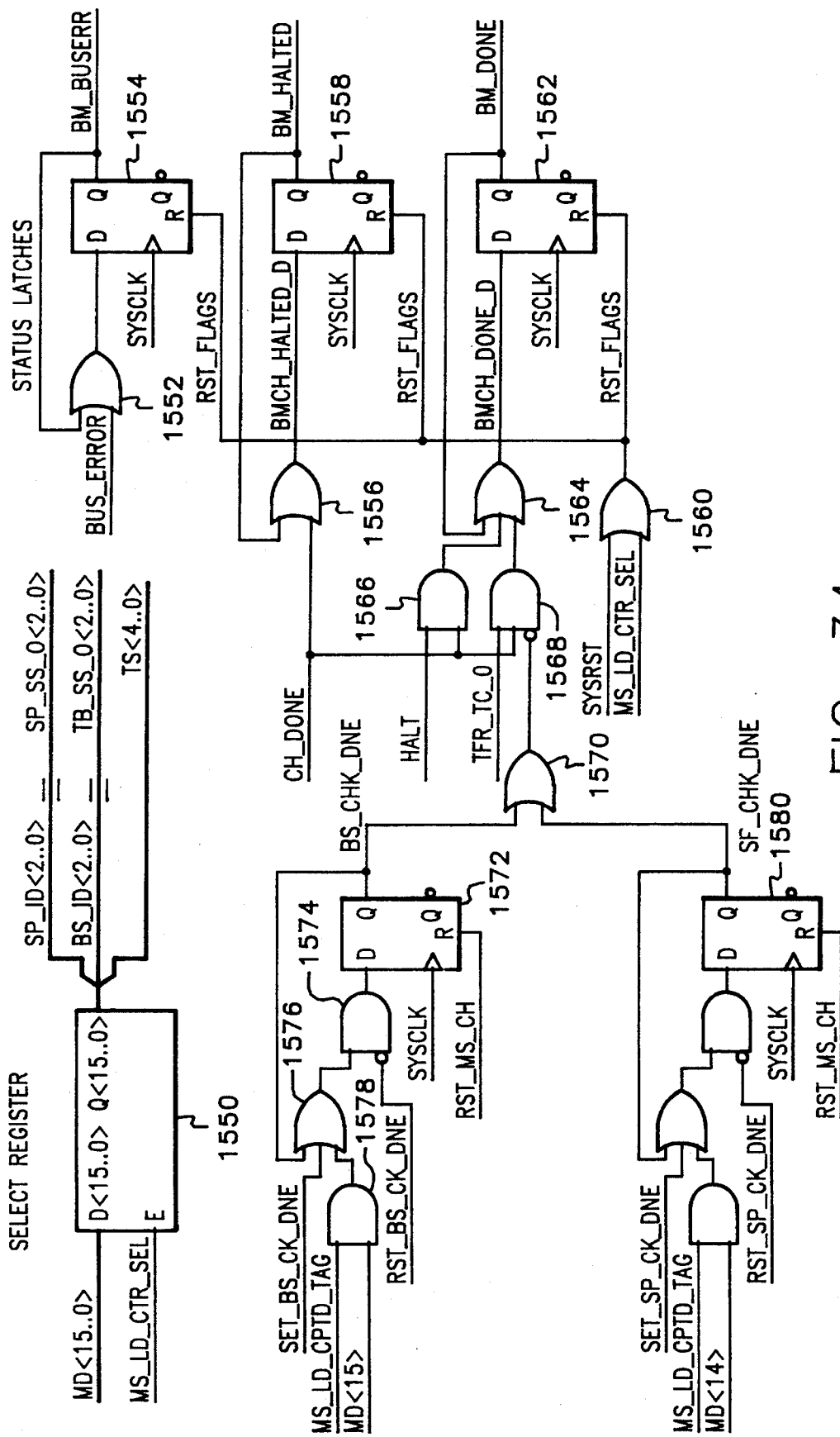

A select field is also provided in the CDB. The select register 1550 (FIG. 34) is loaded at the appropriate time and provides the SP_ID<2..0> and BS_ID<2..0> signals to indicate the siphon and bus slave IDs. Additionally, 5 bits are provided to indicate if a particular transfer channel is to be used for concurrent operations.

Certain status information is also necessary to be provided. This includes error, halted and done status. The BUS_ERR signal as produced by the controller state machine 1300 is provided as one input to a two input OR gate 1552. The output of the OR gate 1552 is provided to the input of a D type flip-flop 1554 which is clocked by the SYSCLK signal. The output of the flip-flop 1554 is the BM_BUSERR signal which is a signal in the status register and is also provided to the second input of the OR gate 1552. The CH_DONE signal is provided to one input of a two input OR gate 1556, with the output being provided to the input of a D type flip-flop 1558. The flip-flop 1558 is clocked by the SYSCLK signal and its output is the BM_HALTED signal. This signal is also provided to the second input of the OR gate 1556. Flip-flops 1554 and 1558 are reset by the output of a two input OR gate 1560 whose inputs are the SYSRST or system reset signal and the MS_LD_CTR_SEL signal so that when a new CDB is loaded these values are cleared and not carried over.

Determination of when a particular bus master transfer is done is significantly more complicated. The BM_DONE signal is provided by the output of a D type flip-flop 1562 which receives the output of the OR gate 1560 at its reset input and is clocked by the SYSCLK signal. The D input of the flip-flop 1562 is provided by the output of a three input OR gate 1564, one of whose inputs receives the BM_DONE signal. The second input to the OR gate 1564 is provided by the output of a two input AND gate 1566 whose inputs are the HALT and CH_DONE signals. The final input to the OR gate 1564 is provided by the output of three input AND gate 1568. Two of the inputs of the AND gate 1568 are the TFR_TC_0 and CH_DONE signals, while the third input is inverted and receives the output of a two input OR gate 1570. One input to the OR gate 1570 is provided by the output of a D-type flip-flop 1572 and indicates that a bus slave status check has been completed. This flip-flop 1572 is clocked by the SYSCLK signal and reset with the micro-sequencer. The D type input of the flip-flop 1572 receives the output of a two input AND gate 1574. One input to the AND gate 1574 is inverted and receives the RST_BS_CK_DONE signal from the state machine 1300, while the second input is provided by the output of a three input OR gate 1576, one of whose inputs is the output of the flip-flop 1572. The second input to the OR gate 1576 is the SET_BS_CK_DNE signal from the state machine 1300 while the third input is provided by the output of a two input AND gate 1578. The inputs of the AND gate 1578 provide a true output if upon loading the CDB it has been indicated that this particular bus slave had indicated done and that this value had been previously latched. Similar logic is utilized in combination with a D type flip-flop 1580 which provides its output to the OR gate 1570 to develop a similar siphoned slave check for done indication.

Figure 35:
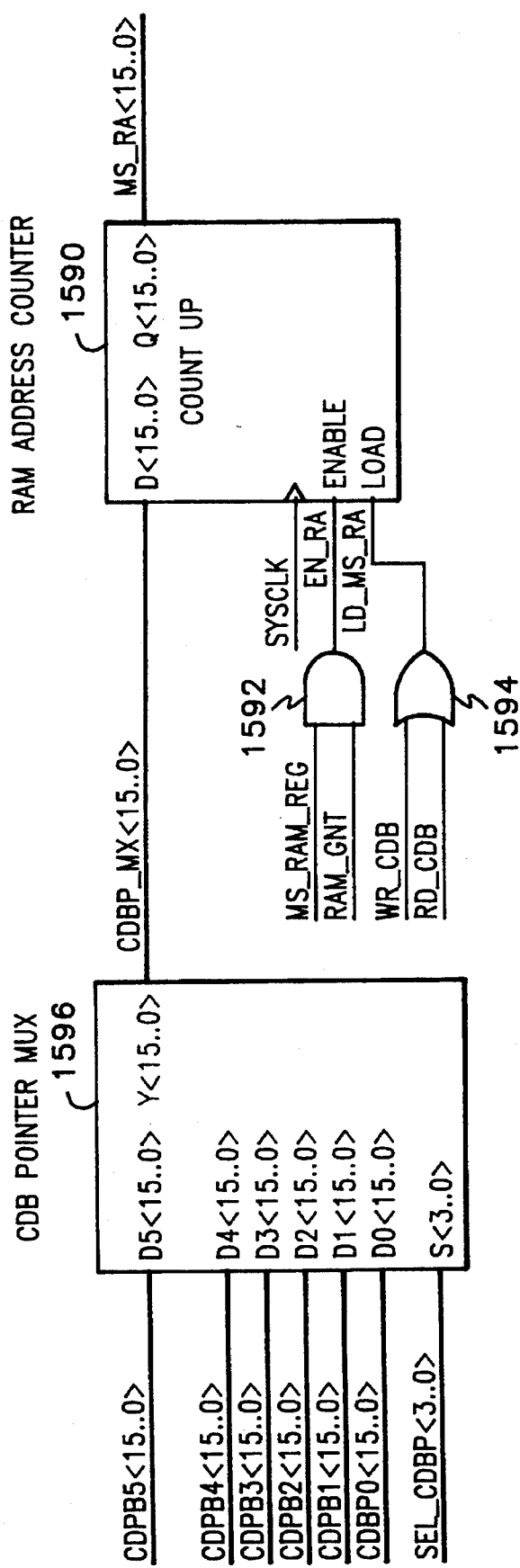

Because the CDBs consist of a series of sequential locations an address counter must be utilized. This address counter is shown in FIG. 35 as a 16 bit counter 1590. The counter is clocked by the SYSCLK signal and receives as an enable input the output of a two input AND gate 1592 whose inputs are the MS_RAM_REQ and RAM_GRANT signal to indicate that the micro-sequencer is requesting a RAM operation and has access to the transfer buffer memory 118. The load signal for the counter 1590 is provided by the WR_CDB and RD_CDB signals being provided to a two input OR gate 1594 to indicate that the CDB is being written or read. The data input to the counter 1590 is provided by the output of six channel 16 bit multiplexer 1596 whose inputs are the various thread pointers and the general purpose pointer as previously defined. Selection is based on the particular CDB block to be loaded or stored.

Figure 36A:
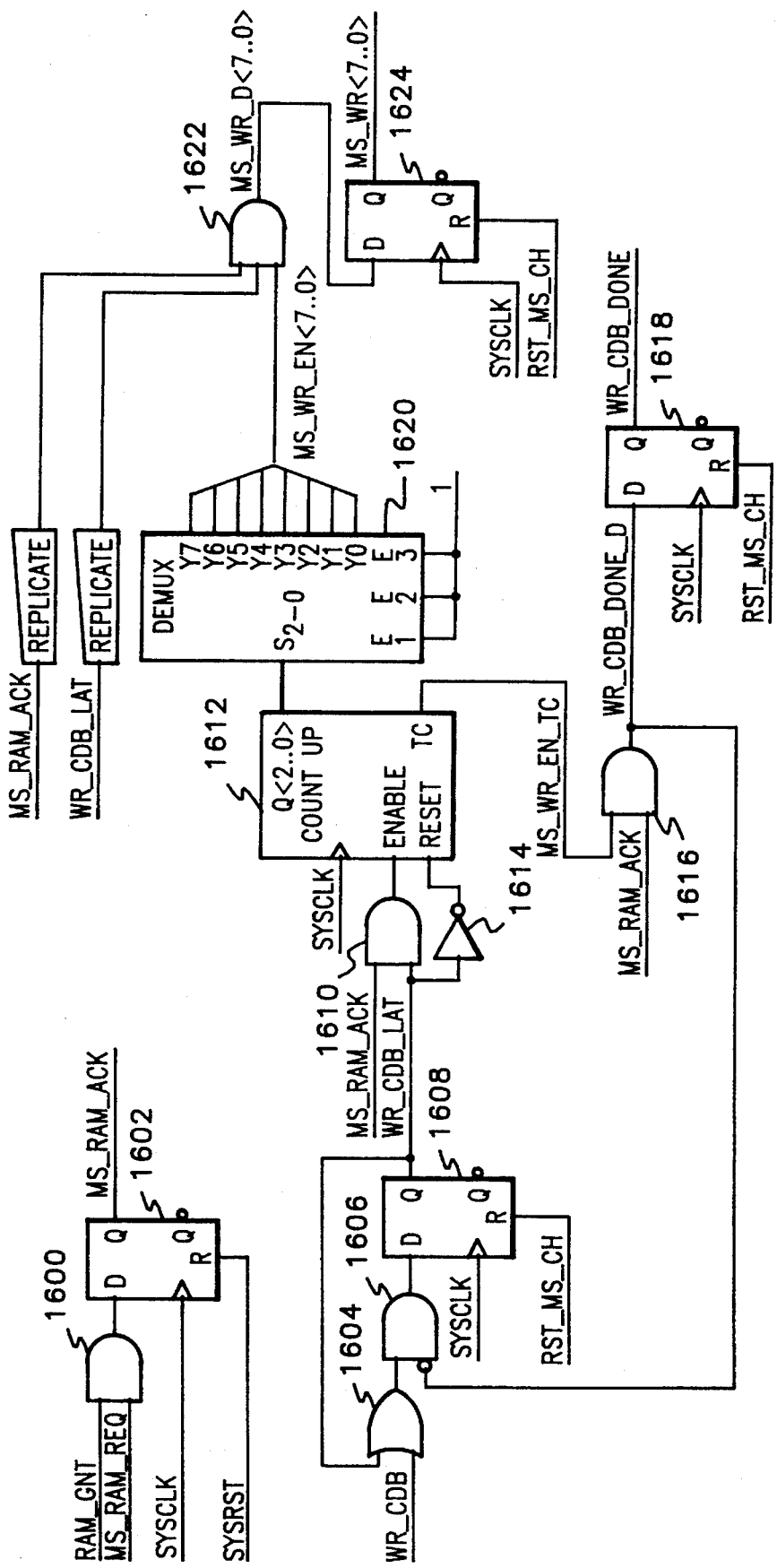

Sequencing is needed to read and write the CDBs from and to the transfer buffer RAM 118. Therefore counters are needed as well as a state machine and an arbitration unit. Counter logic is shown in FIG. 36. The RAM_GNT signal is provided as one input to a two input AND gate 1600. The second input of the AND gate 1600 receives the MS_RAM_REQ signal. The output of the AND gate 1600 is provided to the D input of a D type flip-flop 1602 which is clocked by the SYSCLK signal and whose output is the MS_RAM_ACK signal. When a write CDB operation is occurring, i.e. where the CDB information is obtained from the transfer buffer 118 and written to the various registers in the bus master, a signal referred to as WR_CDB is provided to indicate that the write operation is commenced. This is provided to one input of a two input OR gate 1604. The output of the OR gate 1604 is provided as one input to a two input AND gate 1606. The output of the AND gate 1606 is provided to the input of a D type flip-flop 1608 whose output is provided as the second input to the OR gate 1604. The output of the flip-flop 1608 is also provided to the input of a two input AND gate 1610 whose other input receives the output of the flip-flop 1602. The output of the AND gate 1610 is provided to the enable input of a 3 bit up counter 1612 which sequences through the various fields or registers needed in the CDB. The counter 1612 is clocked by the SYSCLK signal. The output of the flip-flop 1608 is inverted by an inverter 1614 and its output is connected to the reset input of the counter 1612. The counter 1612 includes a terminal count bit which is provided to one input of a two input AND gate 1616. The second input of the AND gate receives the output of the flip-flop 1602. The output of the AND gate 1616 is provided to the inverted second input of the AND gate 1606. Thus the counter 1612 is enabled after the WR_CDB signal is provided until it has counted through its full sequence and all of the registers have been loaded with the CDB information. The output of the AND gate 1616 is provided to the input of a D type flip-flop 1618 which is clocked by the SYSCLK signal. The output of the flip-flop 1618 is the WR_CDB_DONE signal.

The counter output of the counter 1612 is provided to the select inputs of a 3:8 decoder 1620. The eight outputs are provided to one input of a series of eight three input AND gates 1622. One input of each of the AND gates receives the WR_CDB_LAT signal which is the output of the flip-flop 1608, while the other input of each of the AND gates 1622 receives the MS_RAM_ACK signal provided by the flip-flop 1602. The outputs of the AND gate 1622 are provided to the inputs of eight D type flip-flops 1624 which are clocked by the SYSCLK signal. The outputs of the flip-flops 1624 are the MS_WR<7..0> signals which represent the particular line in the CDB which is to be loaded. As previously noted these values are also referred to by a more descriptive mnemonic.

It is also appropriate to provide the register information back to the transfer buffer 118 when a CDB or transfer thread is made inactive but has not been completed or after it has been completed. This operation is initiated by the receipt of the RD_CDB signal to a two input OR gate 1630. The output of the OR gate 1630 is provided as one input to a two input AND gate 1632. The output of the AND gate 1632 is provided as the input to a D type flip-flop 1634. The output of the flip-flop 1634 is the MS_RAM_DIR signal which is provided as the second input to the OR gate 1630.

Both the RD_CDB and WR_CDB signals are provided to the two inputs of a two input OR gate 1636. The output of this OR gate is provided as one input to a two input OR gate 1638. The output of the OR gate 1638 is provided as one input to a two input AND gate 1640. The output of the AND gate 1640 is provided to the input of a D type flip-flop 1642. The output of the flip-flop 1642 is the MS_RAM_REQ signal and is provided to the second input of the OR gate 1638. The flip-flop 1642 is clocked by the SYSCLK signal. The output of the flip-flop 1642 is provided as one input to a two input AND gate 1644 whose other input is the RAM_GNT signal. The output of the AND gate 1644 is provided to the enable input of a 3 bit up counter 1646 which is clocked by the SYSCLK signal. The output of the flip-flop 1642 is inverted and provided to the reset input of the counter 1646. This counter 1646 is used to provide the lower 3 bits of the address to the transfer buffer RAM 118. To this end the Q or data outputs of the counter 1646 are referred to as the MS_RD_ADR<2..0> signals to indicate the actual RAM address. The counter 1646 also has a terminal count or completion output which is provided as one input to a three input AND gate 1648. The other two inputs to the AND gate 1648 are the RAM_GNT signal and the MS_RAM_REQ signal. The output of the AND gate 1648 is provided to an inverted input of the AND gate 1632, an inverted input of the AND gate 1640 and to an input of a two input AND gate 1650. The second input of the AND gate 1650 receives the MS_RAM_DIR signal. The output of the AND gate 1650 is provided to the input of a D type flip-flop 1652 which is clocked by the SYSCLK signal. The output of the flip-flop 1652 is the RD_CDB_DONE signal to indicate that all the data of the CDB block as it has been modified has been returned to the transfer buffer RAM 118.

Figure 37:
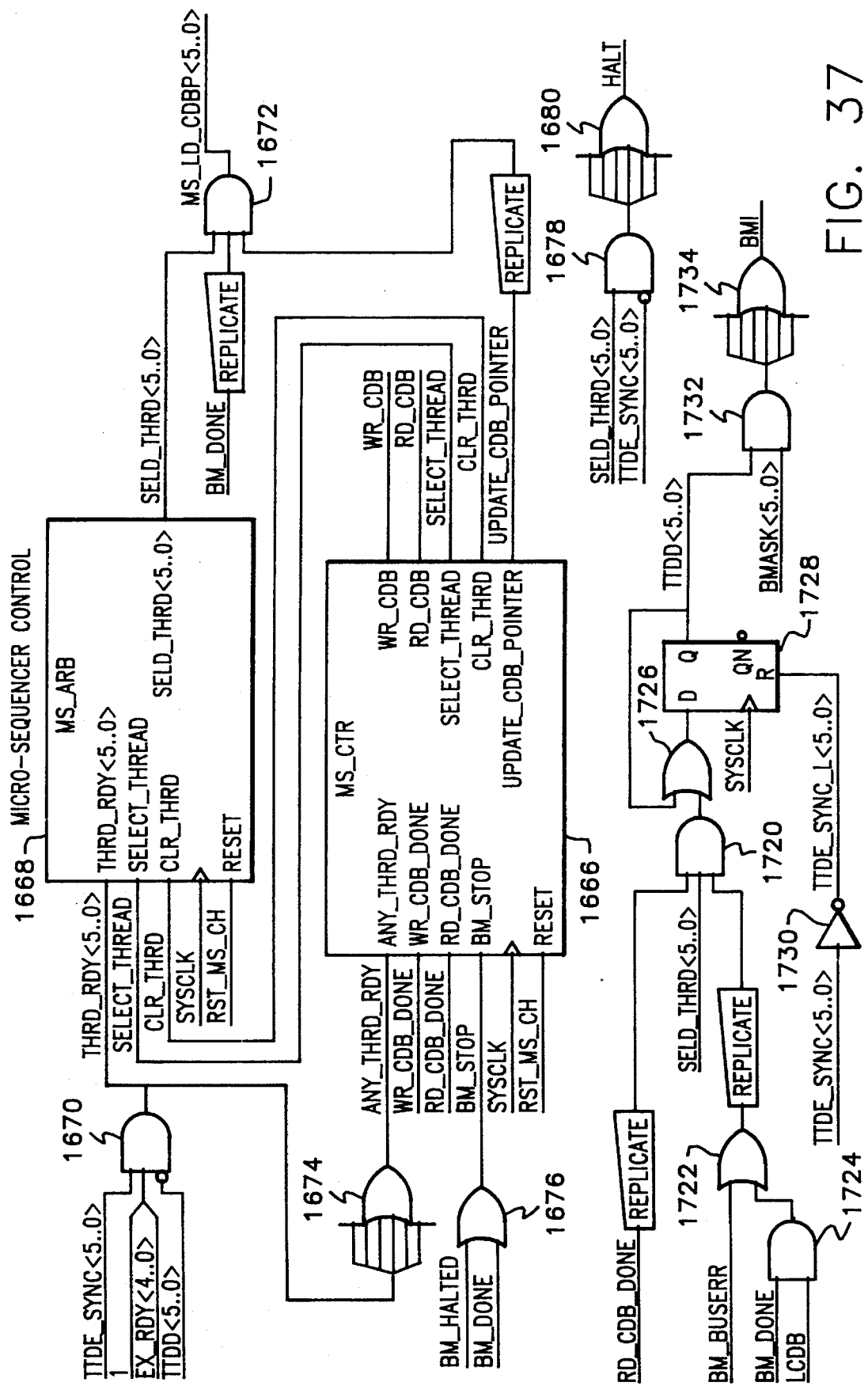

An arbitration unit 1668 (FIG. 37) is utilized to select between the particular threads which are operational and activated and a state machine 1666 is used to control the loading and sequencing of the CDB transfer operations. The arbitrator 1668 performs a round robin operation on threads which have been enabled. To this end it receives a series of inputs which indicates whether the threads are ready. These signals are provided by the output of AND gates 1670. The AND gates receive as inputs the appropriate TTDE_SYNC or transfer thread enabled signals. In addition, a particular EX_RDY signal is received to indicate that the transfer buffer RAM 118 FIFO status is ready, i.e. not full for writes and not empty for reads. Further, the TTDD signals are received at an inverted input to the AND gates 1670. The TTDD signal indicates that this thread operation has been completed and therefore the inverted sense is used to disable the operation to indicate it is no longer ready once it has been completed. Thus the output of a particular AND gate 1670 indicates that this thread is enabled, ready and has not completed. These thread ready or THRD_RDY<5..0> signals are provided to the micro-sequencer arbitrator 1668. Additionally, two signals referred to as SELECT_THREAD and CLR_THRD are provided from the micro-sequencer state machine 1666 to the arbiter 1668. The SELECT_THREAD signal indicates that a thread operation is requested, while the CLR_THRD signal indicates that no operations are appropriate as indicated by the state machine 1666. The output of the arbiter 1668 are signals referred to as SELD_THRD<5..0>, which are an indication that the particular thread has been selected. This is provided to the input of a series of three input AND gates 1672. The second input of the AND gates 1672 receives the BM_DONE signal, while the third input receives a signal referred to as UPDATE_CDB_POINTER which is provided by the state machine 1666 to cause the current CDB RAM address counter 1590 value to be latched into the appropriate CDB thread register. Thus the output of the AND gate 1672 is the MS_LD_CDBP<5..0> signals as an indication that it is appropriate to load a CDB pointer. When the transfer specified by the CDB is completed. Thus the CDB pointer indicates the next CDB. If the thread remained enabled, this next CDB would then be loaded and its operation performed. If however, done status was indicated, the arbiter 1668 would note this and not select the thread. This allows simple, automatic chaining of CDBs, without local processor 104 operations at the end and beginning of each transfer.

The six THRD_RDY signals are provided to the inputs of an OR gate 1674. The output of the OR gate 1674 is the ANY_THRD_RDY signal which is provided as one input to the state machine 1666. Additionally the BM_HALTED and BM_DONE signals are provided as the inputs to a two input OR gate 1676 whose output is the BM_STOP signal. The state machine 1666 is clocked by the SYSCLK signal and produces the WR_CDB, RD_CDB, SELECT_THREAD, CLR_THRD and UPDATE_CDB_POINTER signals.

Additionally the SELD_THRD signals are provided to one input of a series of two input AND gates 1678 while the TTDE_SYNC signals are provided to inverted inputs of the AND gates 1678. The outputs of the AND gates 1678 are combined in an OR gate 1680 to produce the HALT signal so that if a thread has been selected by the arbiter 1668 but is deselected by the local processor 104 by being disabled, then the HALT signal is generated to stop operation.

The RD_CDB_DONE signal is provided as one input to a series of six AND gates 1720. One input of each of the AND gates 1720 is provided by the SELD_THRD<5..0> signals as provided by the arbiter 1668. The final inputs to each of the AND gates 1720 is provided by the output of a two input OR gate 1722. One input to the OR gate 722 is the BM_BUSERR signal to indicate an error, while the other input is provided by the output of a two input AND gate 1724. The inputs to the AND gate 1724 are the BM_DONE signal and the LCDB signal. Thus the output of the AND gate 1724 is low when the LCDB signal is low, indicating that this is not the last CDB in a string of CDBs. The outputs of the AND gates 1720 are provided to the inputs of OR gates 1726. The output of the OR gate 1726 are provided to the inputs of a D-type flip-flop 1728 which are clocked by the SYSCLK signal. The output of the flip-flops 1728 are provided to the second inputs to the OR gate 1726 and form the TTDD<5..0> signals which indicate that a particular thread is done. Therefore the thread is not indicated as done or cleared if the LCDB bit for that particular thread is set to 0. The flip-flops 1728 are reset by the output of inverters 1730 who receive at their inputs the TTDE_SYNC<5..0> signals such that if a channel is disabled, the flip-flops 1728 are also cleared. The TTDD<5..0> signals are provided to one input of a series of six AND gates 1732. The other inputs to the AND gate 1732 are the BMASK<5..0> signals. These are interrupt mask registers provided for use by the local processor 106 to mask off a particular transfer thread providing an interrupt to the local processor 106. The outputs of the AND gates 1732 are provided as the inputs to an OR gate 1734 whose output is the BMI or bus master channel interrupt which is provided to the local processor 104 to indicate completion of a thread.

Figure 38:
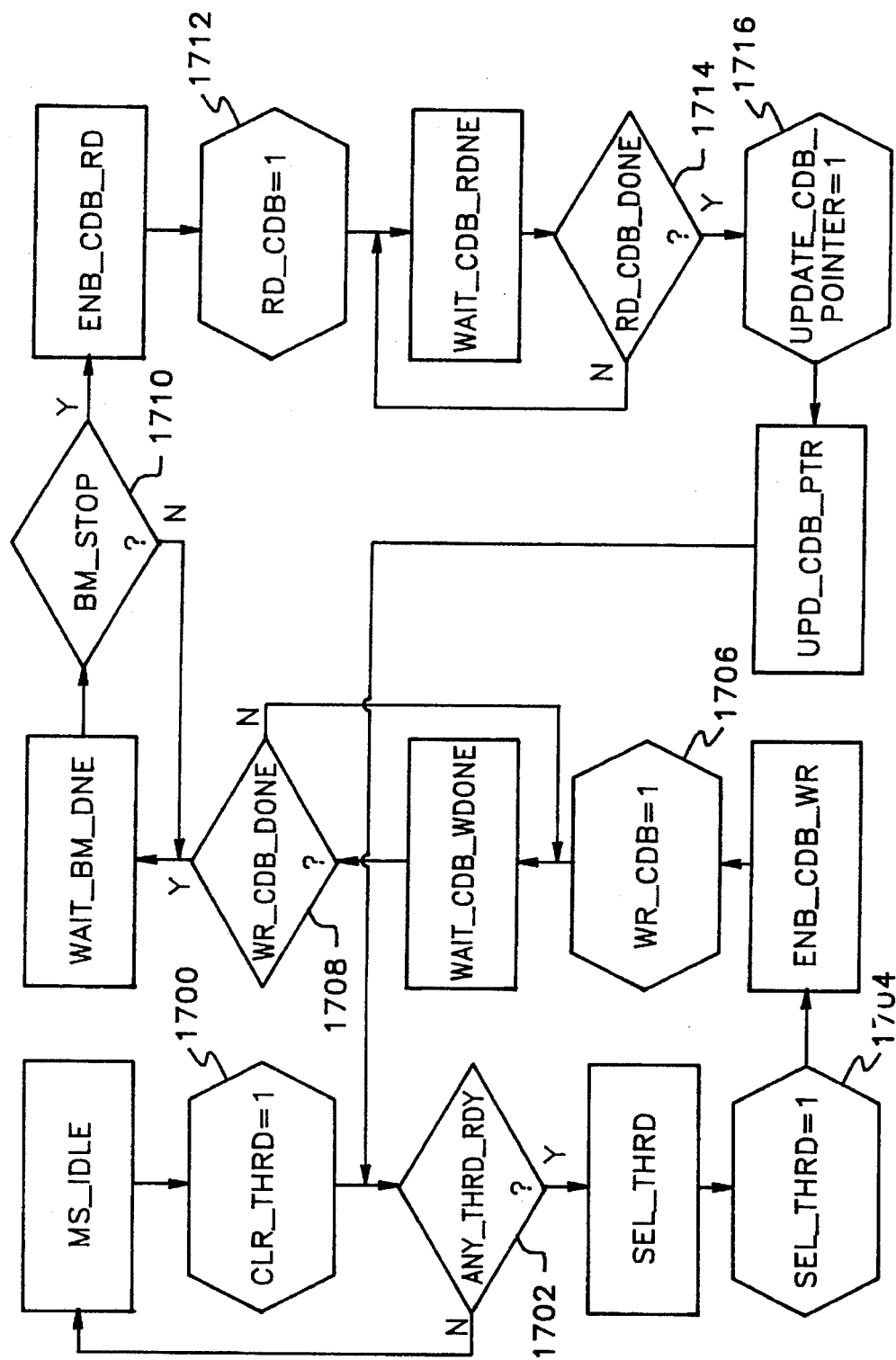

Operation of the state machine 1666 is shown in FIG. 38. The state machine 1666 commences in the MS_IDLE state. Control proceeds to block 1700 where the CLR_THRD signal is set equal to 1 to indicate to the arbiter 1668 to clear operations and that no threads are being requested. If the ANY_THRD_RDY signal is not true, indicating that no threads are enabled, as determined in block 1702, control remains at the MS_IDLE state. If however a thread was active, control proceeds to the SEL_THRD state so that one would be selected. Control proceeds from the SEL_THRD state to block 1704 where the SEL_THRD signal is set equal to one to indicate to the arbiter 1668 that a thread is selected. Control then proceeds to the ENB_CDB_WR state. From this state control proceeds through block 1706 where the WR_CDB signal is set to 1 to indicate that a CDB is to be retrieved from the transfer buffer RAM 118 into the bus master 200. Control then proceeds to the WAIT_CDB_WDONE state until the CDB transfer operation has been completed. This is indicated by the receipt of the WR_CDB_DONE signal as monitored in block 1708. If not, received control stays at the WAIT_CDB_WDONE state. Once the NR_CDB_DONE signal has been received, control proceeds to the WAIT_BM_DNE state until the BM_STOP signal is received as determined in block 1710. This is an indication that the bus master operations are either completed, i.e. as in that particular thread has completed, or they are halted. If a stop is not indicated, control remains at the WAIT_BM_DNE signal. If a stop condition is indicated control, proceeds to the ENB_CDB_RD state. It is now time to return the CDB back to the transfer buffer RAM 118 and so in block 1712 the RD_CDB signal is made active to initiate this process. Control proceeds to the WAIT_CDB_RDNE state to wait for completion of this process. If the RD_CDB_DONE signal is not received as determined in block 1714, control simply stays at the WAIT_CDB_RDNE state until the CDB is fully rewritten back into the transfer buffer RAM 118. When the signal is received, the UPDATE_CDB_POINTER signal is set to 1 to allow the thread CDB pointer register to be updated to the next location and in block 1716 control proceeds to the UPD_CDB_PTR state. Control proceeds from here through block 1702 to either an idle condition or selection of the next thread.

Figure 39:
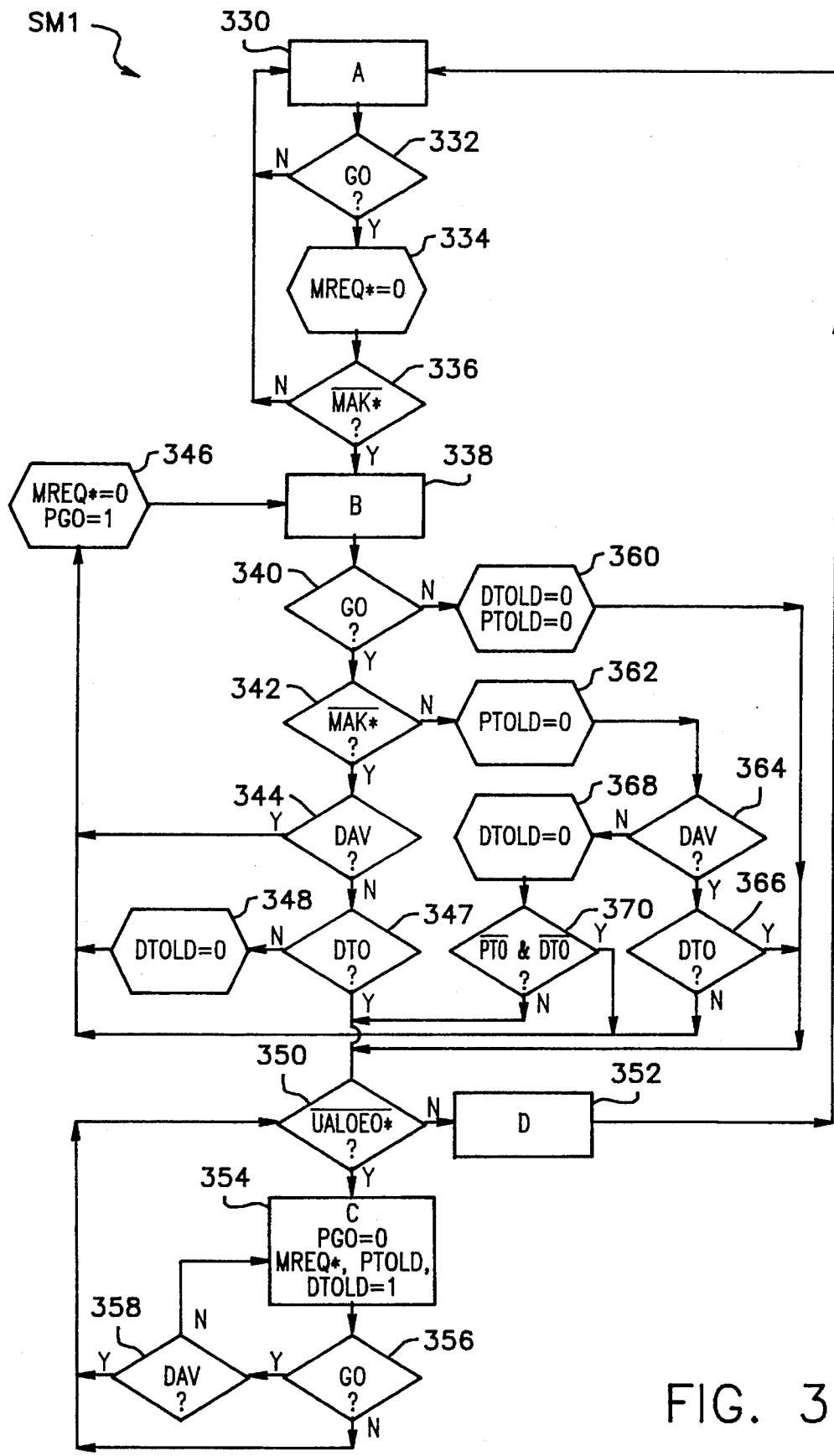
FIGS. 39 and 40 are state machine bubble diagrams and flowcharts of operation of various state machines in the disk array bus master of FIG. 4.

Referring now to FIG. 39, a flowchart diagram is shown of a state machine SM1 within the cycle generator 316 in the DABM 100 which receives the GO signal from the address unit 318 and requests the EISA bus 34 to perform a data transfer operation. The address unit 318 provides the GO signal when the memory address and transfer count have been received over the CTB 104 so that a transfer can start and remains asserted until the transfer is complete or the bus master indicates done. The square blocks represent states A, B, C and D where the state machine SM1 remains in a given state until entering a new state block. Operation begins in state A, designated 330, where operation remains in state A until the GO signal is received as indicated by a block 332. If the GO signal is negated, operation remains in state A. When the GO signal is asserted, operation proceeds to a block 334 where the state machine SM1 asserts the MREQ* signal low on the EISA bus 34 to request control of the EISA bus 34. Operation then proceeds to a block 336 where a signal referred to as MAK* is monitored. The MAK* signal is an acknowledge signal from the EISA bus 34 indicating that the DABM 100 may take control of the EISA bus 34. While the MAK* signal is negated high, operation remains in state A. When the MAK* signal is asserted low in block 336, operation proceeds to state B, designated 338, indicating that the DABM 100 has control of the EISA bus 34.

Operation then proceeds to a block 340 from block 338 where the GO signal is monitored. While the GO signal remains asserted, operation proceeds to a block 342 where the MAK* signal is again monitored. If the MAK* signal is detected asserted low in block 342, operation proceeds to a block 344 where a data available signal, referred to as DAV, is monitored to determine if it is asserted. The DAV signal is provided by the address unit 318, derived from a signal SDAV from the data FIFO/aligner 322, which indicates that data is ready to be transferred or that the FIFO is available to receive more data. If the DAV signal is detected asserted in block 344, operation proceeds to a block 346 where the MREQ* signal remains asserted low and a signal PGO is asserted high indicating to another state machine SM2 (FIG. 40) within the cycle generator 316 to begin data transfer operations. From block 346, operation proceeds back to block 338 indicating that the state machine SM1 remains in state B.

If the DAV signal is not asserted in block 344, then the DABM 100 is temporarily on hold and operation proceeds to a block 347 where a data available timeout signal referred to as DTO is monitored. The DTO signal is asserted at timeout of a data available down timer (not shown) in the cycle generator 316, which designates a maximum amount of time the DABM 100 will stall while data is not available, or not being transferred out of the FIFO. If the DTO signal is not asserted in block 347, operation proceeds to a block 348 where a signal DTOLD is asserted low which starts the data available timer. The down timer begins countdown on the falling edge of the DTOLD signal, and is preset with the maximum time when the DTOLD signal is asserted high. When the data available timer times out, it asserts the DTO signal and the DABM 100 eventually releases control of the EISA bus 34.

From block 348, operation proceeds to block 346 where the MREQ* and PGO signals are asserted if not already asserted. If the DTO signal is asserted in block 347, then the data available timer has timed out and operation proceeds to a block 350 where a signal UALOEO* is monitored, which is generally an upper address latch output enable for the upper address bits of the EISA address. The UALOEO* signal is asserted by the state machine SM2 indicating that the DABM 100 is driving an address onto the EISA bus 34. If the UALOEO* is not asserted in block 350, operation proceeds to state D, designated as 352, which is an intermediate state before re-entering state A. The negation of the UALOEO* signal indicates that the DABM 100 is not driving addresses onto the EISA bus 34 and so cannot be treated as being in control of the EISA bus 34.

Referring back to block 340, if the GO signal becomes negated while in state B, operation proceeds to a block 360 where the DTOLD signal and a signal PTOLD are asserted low to initiate the data available timer and a preempt timer. The preempt timer is a timer indicating a maximum amount of time that the DABM 100 is allowed to retain the EISA bus 34 after the MAK* signal or the GO signals are negated. Upon timeout of the preempt timer, it asserts a signal PTO. From block 360, operation proceeds to block 350 where the UALOEO* signal is monitored.

Referring back to block 342, if the MAK* signal is not asserted low in block 342, operation proceeds to a block 362 where the PTOLD signal is asserted low. Operation then proceeds to a block 364 where the DAV signal is monitored to determine if data is available for transmission. If so, operation proceeds to a block 366 where the PTO signal is monitored to determine if a timeout of the preempt timer has occurred. If not, operation remains in block B and proceeds to block 346 to keep the MREQ* and PGO signals asserted. Otherwise, if the PTO signal is asserted in block 366, operation proceeds to block 350 to monitor the UALOEO* signal. If the DAV signal is not asserted in block 364, operation proceeds to a block 368 where the DTOLD signal is asserted low, and then operation proceeds to a block 370 where the PTO and DTO signals are both monitored to determine if they are both negated low. If they are not both negated low in block 370, then at least one of the timeouts has occurred and operation proceeds to block 350 to check the UALOEO* signal. If both the preempt and the data available timers have not timed out in block 370, operation remains in block B and returns to block 346.

If the UALOEO* signal is asserted in block 350, operation proceeds to state C, designated 354, where the GO and DAV signals are monitored. In state C, the PGO signal is negated low, the MREQ* signal is negated high and the DTOLD and PTOLD signals are both asserted high. Operation then proceeds to a block 356 where the GO signal is monitored and if asserted high, operation proceeds to a block 358 where the DAV signal is monitored. If the GO signal remains asserted and the DAV signal remains negated, operation remains in state C. Otherwise, if the GO signal is detected negated in block 356 or if the DAV signal is detected asserted in block 358, operation proceeds back to block 350 to monitor the UALOEO* signal. The cycle generator 316 also generates a signal EWSTROBE which is asserted when the START* signal is asserted low or when the MSBURST* and POST1K signals are low and the BDK, EXRDY, PGO and DAV signals are asserted high. Also, the cycle generator 316 asserts a signal ERSTROBE when a signal READ2 is asserted or when a signal READ3 is asserted and the BCLK and EXRDY signals are asserted. The READ3 signal is a clocked version of the negated MSBURST* signal, and the READ 2 signal is true when a signal READ1 is true or when the PDOE, signal is asserted and the MSBURST*, START* and EXRDY signals are true. The READ1 signal is true when the PCOE* signal is false and the EX32* signal is asserted low.

Figure 40:
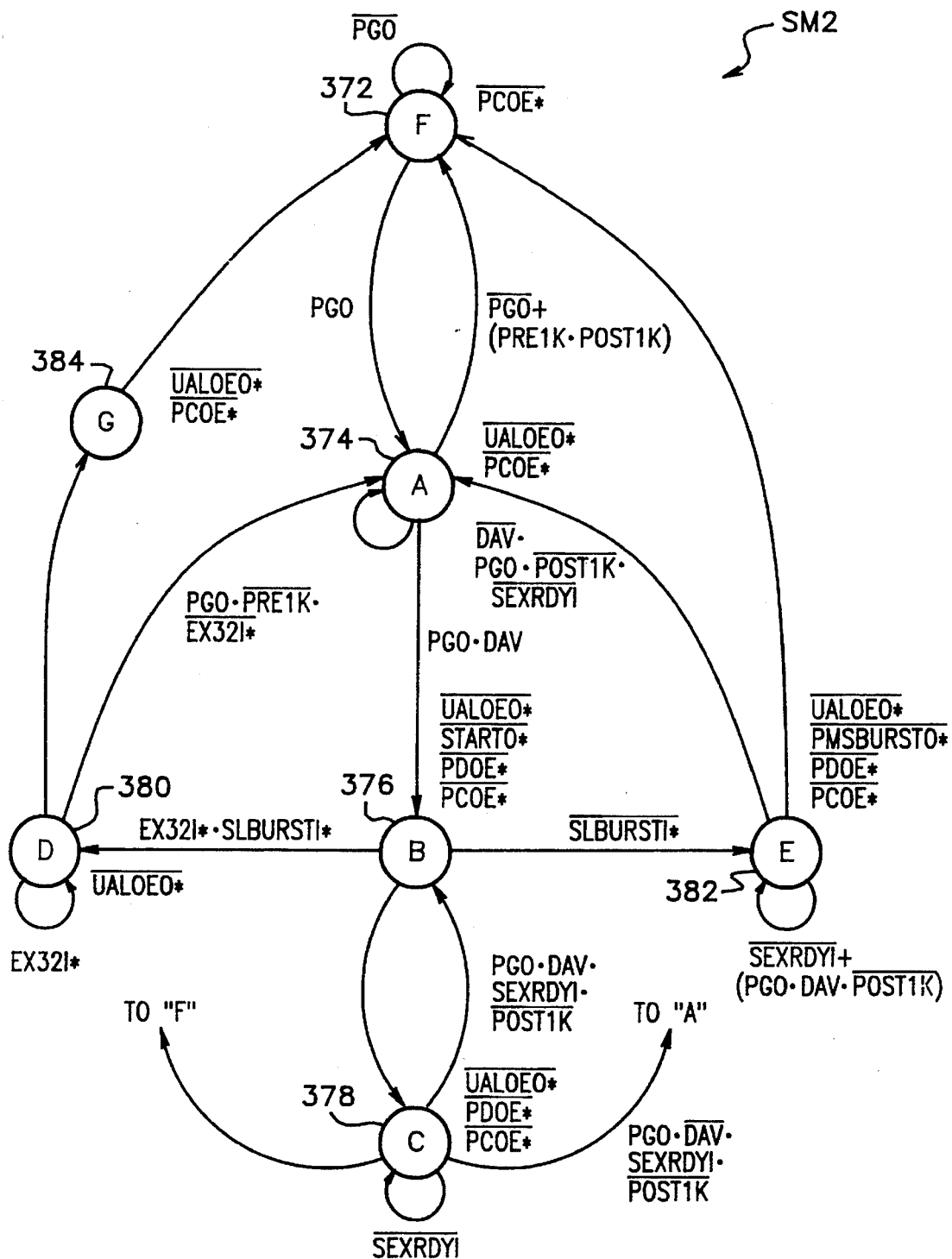

Referring now to FIG. 40 a state diagram is shown of another state machine SM2 within the cycle generator 316, which drives the control signals to the EIS bus 34 and monitors the signals to determine which type of EISA cycle is occurring on the EISA bus 34 as controlled by the DABM 100. The state machine SM2 receives the BCLK signal from the EISA bus 34, so that transitions from one state to the next are synchronous with the BCLK signal. Operation remains in a state F, designated 372, while the PGO signal is negated low, and a signal PCOE* remains asserted while in state F. The PCOE* is a control output enable signal which allows certain EISA control signals to be provided by the DABM 100. PCOE* is also gated externally with the PGO signal so that the control signals are actually driven only when the DABM 100 has control of the EISA bus 34. When the PGO signal is asserted, operation proceeds to a new state A, designated 374 where the UALOEO* and PCOE* signals are asserted low. If the PGO signal is negated while in state A, or if the PRE1K and POST1K signals are both asserted while in state A, operation returns to state F. If the DAV signal is asserted in state A while the PGO signal is also asserted, operation proceeds to a state B, designated 376, where the UALOEO*, START*, PDOE*, and PCOE* signals are asserted. The PDOE* signal is a data output enable signal which allows data to be driven to the EISA bus 34 by the DABM 100. The DAV signal is asserted by the address unit 318, which receives the SDAV signal from the data FIFO/aligner 322 indicating data is available for transfer or more data is needed for the transfer. If a signal SLBURST* on the EISA bus 34 is detected asserted low in state B, operation proceeds to a block E, designated 382, where the UALOEO*, PDOE* and PCOE* signals are asserted as well as a signal MSBURST* indicating a 16 or 32-bit EISA burst cycle. Operation remains in state E while an EISA signal EXRDY is negated low or while the PGO and DAV signals are asserted high and the POST1K signal is negated low. If the DAV and POST1K signals are negated low and the EXRDY and PGO signals are asserted high in state E, operation returns to state A. Otherwise, if none of the above conditions are met for transfer to state A or to remain in state E, operation returns to state F to load a new EISA upper address value when appropriate.

Referring back to state B, if the SLBURST* signal and an EISA signal EX32* are negated high, operation proceeds to a block D, designated 380, where the UALOEO* signal is asserted but the PDOE* and PCOE* signals are negated. State D indicates an EISA byte assembly operation is occurring. Operation remains in state D while the EX32* signal is negated high. If the PGO signal is asserted high and the PRE1K signal is negated low while the EX32* signal is also negated low in state D or PGO is removed or a 1 Kbyte page boundary is reached, operation returns to state A. Otherwise, if the EX32* signal is negated low in state D, operation proceeds to a state G, designated 384, where the UALOEO* and PCOE* signals are asserted low based on monitoring the SEXRDYI or synchronized EXRDY internal signal. Operation then proceeds back to state F from state G. Referring back to state B, if the SLBURST* signal is not asserted low and the EX32* signal is asserted low, operation proceeds to a state C, designated 378, indicating that a normal EISA cycle is occurring. Operation remains in state C while the EXRDY signal is negated low. Also, the UALOEO*, PDOE* and PCOE* signals are asserted low while in state C. If the EXRDY and PGO signals are asserted and the DAV and POST1K signals are negated in state C, operation returns to state A. Otherwise, if the EXRDY signal is asserted in state C while the PGO signal is negated or either of the DAV or POST1K signals are negated, operation returns to state F from state C.

Figure 41:
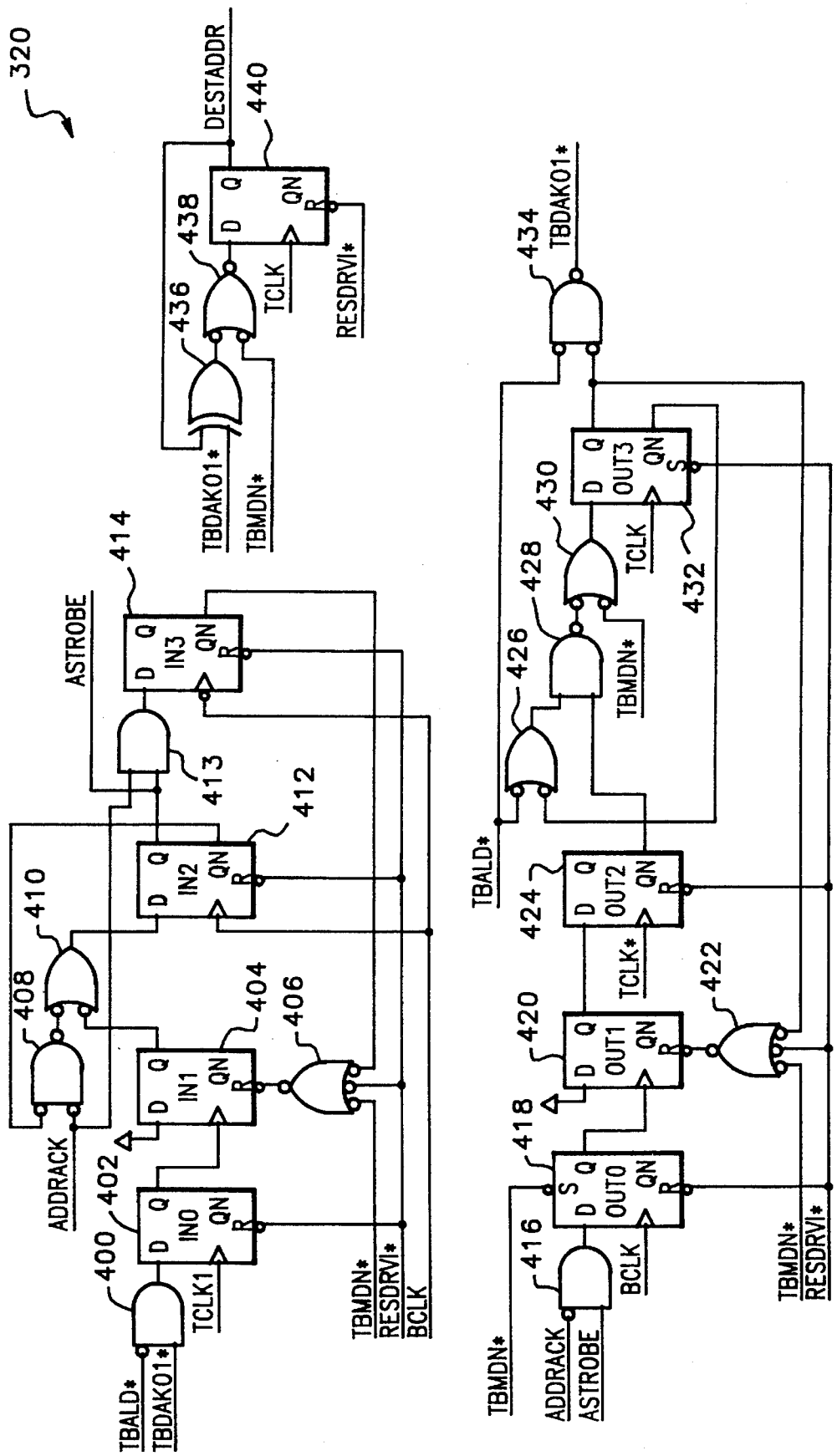
FIGS. 41 to 43 are schematic and block diagrams of portions of the disk array bus master of FIG. 4.

Referring now to FIG. 41, a schematic diagram of portions of the address synchronizer 320 is shown which receive data from the CTB 104 during an address/count load cycle and synchronously loads an EISA address counter clocked by the BCLK signal as well as a data counter signal that resides in the address unit 318. The address synchronizer 320 receives the TBALD* signal from the CTB 104 which is asserted by the ADAC 116 to request the DABM 100 to accept a memory address, transfer byte count and bus slave specific data. The address synchronizer 320 also receives the TCLK signal and an inverted version of the TCLK signal referred to as TCLK* which is generated within the DABM 100, for purposes of synchronizing address and data to the CTB 104. The address synchronizer 320 also receives the TBD<31..0> data signals. Also, the address synchronizer 320 receives the TBDIR* signal which indicates the direction of data flow on the CTB 104. When the TBDIR signal is asserted high by the ADAC 116, data is transferred from the ADAC 116 to the DABM 100 and possibly the write cache device 128, if selected. When the TBDIR signal is asserted low, data is transferred from the DABM 100 to the ADAC 116. As will be described below, the address synchronizer 320 develops a signal TBDAK01*, which is asserted as the TBDAK* signal to the CTB 104 to acknowledge the TBALD* transfer bus request signal. The TBMDN* signal is also received by the DABM 100, indicating that the ADAC 116 has completed a data transfer. A reset signal referred to as RESDRVI* is received by the address synchronizer 320 by the DABM 100 to generally reset the DABM 100.

The address synchronizer 320 is also connected to the BCLK signal from the EISA bus 34 and generates an inverted version referred to as BCLK*. The TBALD* signal is connected to an inverted input of a two-input AND gate 400 which provides its output to the D input of a D flip-flop 402. The non-inverted input of the AND gate 400 is connected to the TBDAK01* signal and the D flip-flop 402 is clocked by the TCLK signal. The inverted reset input of the D flip-flop 402 is connected to the RESDRVI* signal. The output of the D flip-flop 402 is connected to the clock input of a D flip-flop 404, which has its D input pulled high. The inverted reset input of the D flip-flop 404 is connected to the output of a three input AND gate 406, which has one input connected to the TBMDN* signal. The other two inputs of the AND gate 406 are connected to the RESDRVI* signal and also to the QN, or inverted output, of a D flip-flop 414. The QN output of the D flip-flop 404 is connected to one input of a two-input NAND gate 410, which has its other input connected to the output of a two-input OR gate 408. The output of the NAND gate 410 is connected to the D input of a D flip-flop 412, which has its QN output connected to one input of the OR gate 408. The other input of the OR gate 408 is connected to the ADDRACK signal provided by the address unit 318 which indicates that the address unit 318 has received an address value. The D flip-flop 412 is clocked by the BCLK signal and has its inverted reset input connected to the RESDRVI* signal.

The Q output of the D flip-flop 412 is connected to one input of a two-input AND gate 413, where this output is also referred to as the ASTROBE signal which is used to strobe address information into the address unit 318. The other input of the AND gate 413 is connected to the ADDRACK signal and the output of the AND gate 413 is connected to the D input of the D flip-flop 414. The D flip-flop 414 has an inverted clock input which is connected to the BCLK signal, and an inverted reset input which is connected to the RESDRVI* signal.

The ADDRACK and ASTROBE signals are connected to the respective inputs of a two-input AND gate 416, which has its output connected to the D input of a D flip-flop 418. The D flip-flop 418 has an inverted set input connected to the TBMDN* signal and is clocked by the BCLK signal. The inverted reset input of the D flip-flop 418 is connected to the RESDRVI* signal and its Q output is connected to the clock input of a D flip-flop 420. The D input of the D flip-flop 420 is pulled high and has an inverted reset input connected to the output of a three-input AND gate 422. The AND gate 422 has its first input connected to the TBMDN* signal, its second input connected to the RESDRVI* signal and its third input connected to the output of a D flip-flop 432. The Q output of the D flip-flop 420 is connected to the D input of a D flip-flop 424, which is clocked by the TCLK* signal. The inverted reset input of the D flip-flop 424 is connected to the RESDRVI, signal. The QN output of the D flip-flop 424 is connected to one input of a two-input NAND gate 428, which has its other input connected to the output of a two-input NAND gate 426. The first input of the NAND gate 426 is connected to the TBALD* signal and its other input is connected to the QN output of the D flip-flop 432. The output of the NAND gate 428 is connected to one input of a two-input NAND gate 430, which has its other input connected to the TBMDN* signal. The output of the NAND gate 430 is connected to the D input of the D flip-flop 432, which is clocked by the TCLK signal and which has an inverted set input connected to the RESDRVI* signal. The Q output of the D flip-flop 432 is connected to one input of a two-input OR gate 434, which has its other input connected to the TBALD* signal. The output of the OR gate 434 provides the TBDAK01* signal to indicate to the CTB 104 that memory address value and the transfer count value have been accepted.

The TBDAK01* signal is provided to one input of a two-input EXCLUSIVE OR gate 436, which has its other input connected to the QN output of a D flip-flop 440. The output of the EXCLUSIVE OR gate 436 is connected to one input of an AND gate 438, which has its other input connected to the TBMDN* signal. The output of the AND gate 438 is connected to the D input of the D flip-flop 440. The D flip-flop 440 is clocked by the TCLK signal and has its inverted reset input connected to the RESDRVI* signal. The Q output of the flip-flop 440 provides the DESTADDR signal, which is used to to indicate whether an address or transfer count value is being loaded form the CTB 104.

Other logic not shown in FIG. 41 is the logic receiving the TBD<31..0> data signals and providing the SADDRESS<31..0> signals and also a signal SDIR. In effect, upon each positive edge of the TCLK signal, the SADDRESS<31..0> signals are latched equal to the TBD<31..0> signals when the TBALD* signal is asserted low, unless the RESDRVI* signal is asserted also low, in which case the SADDRESS<> signals are all set to 0. The SDIR signal is latched equal to the TBDIR signal in the same manner when the TBALD* signal is low, as clocked by the TCLK* signal. Also, the SDIR signal is set equal to 0 upon the assertion of the RESDRVI* signal. The address unit 318 places the first set of SADDRESS<> signals into its address counter and the upper 16 bits of the second set of SADDRESS<> signals into its transfer counter.

Figure 42:
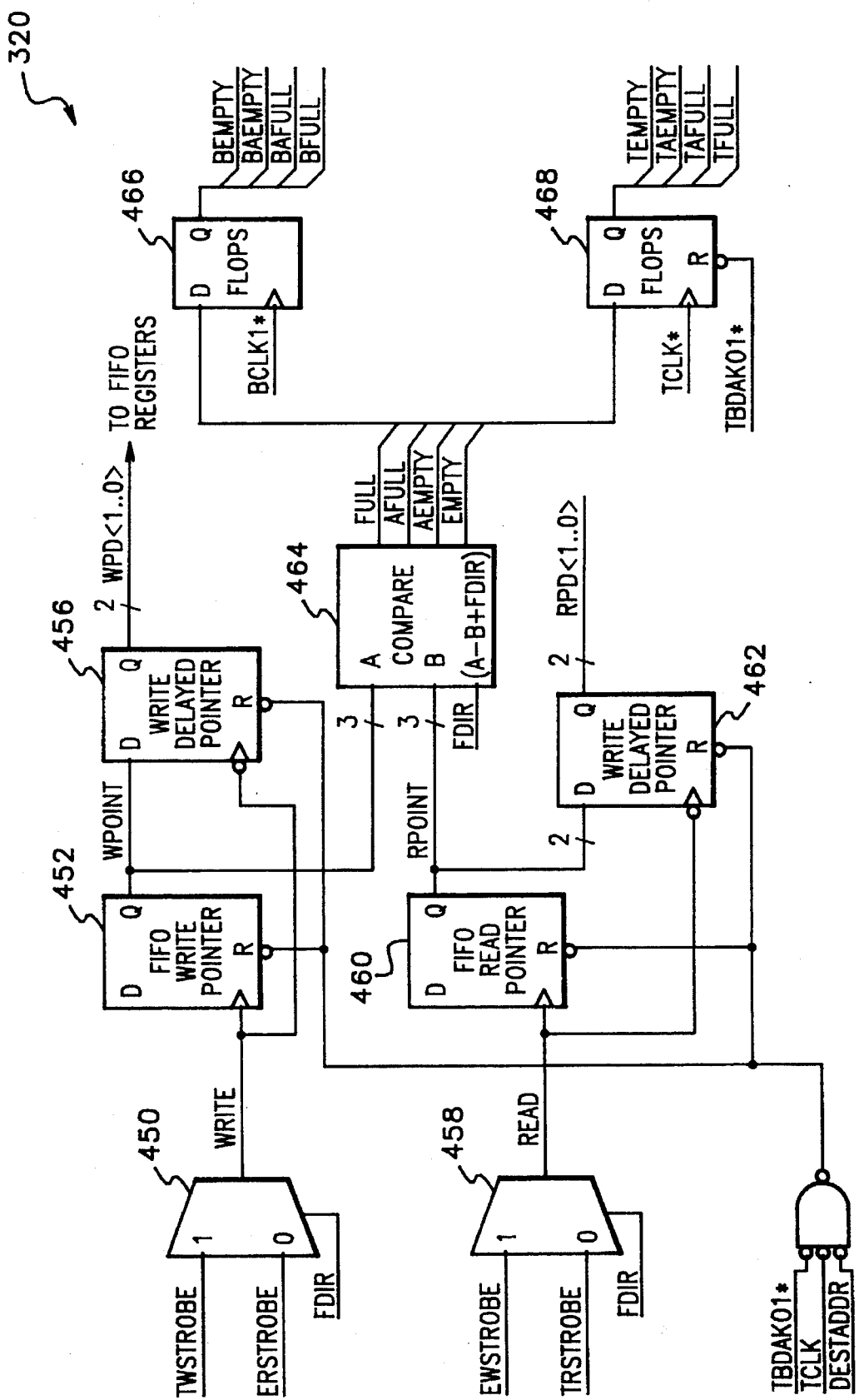
Figure 43:
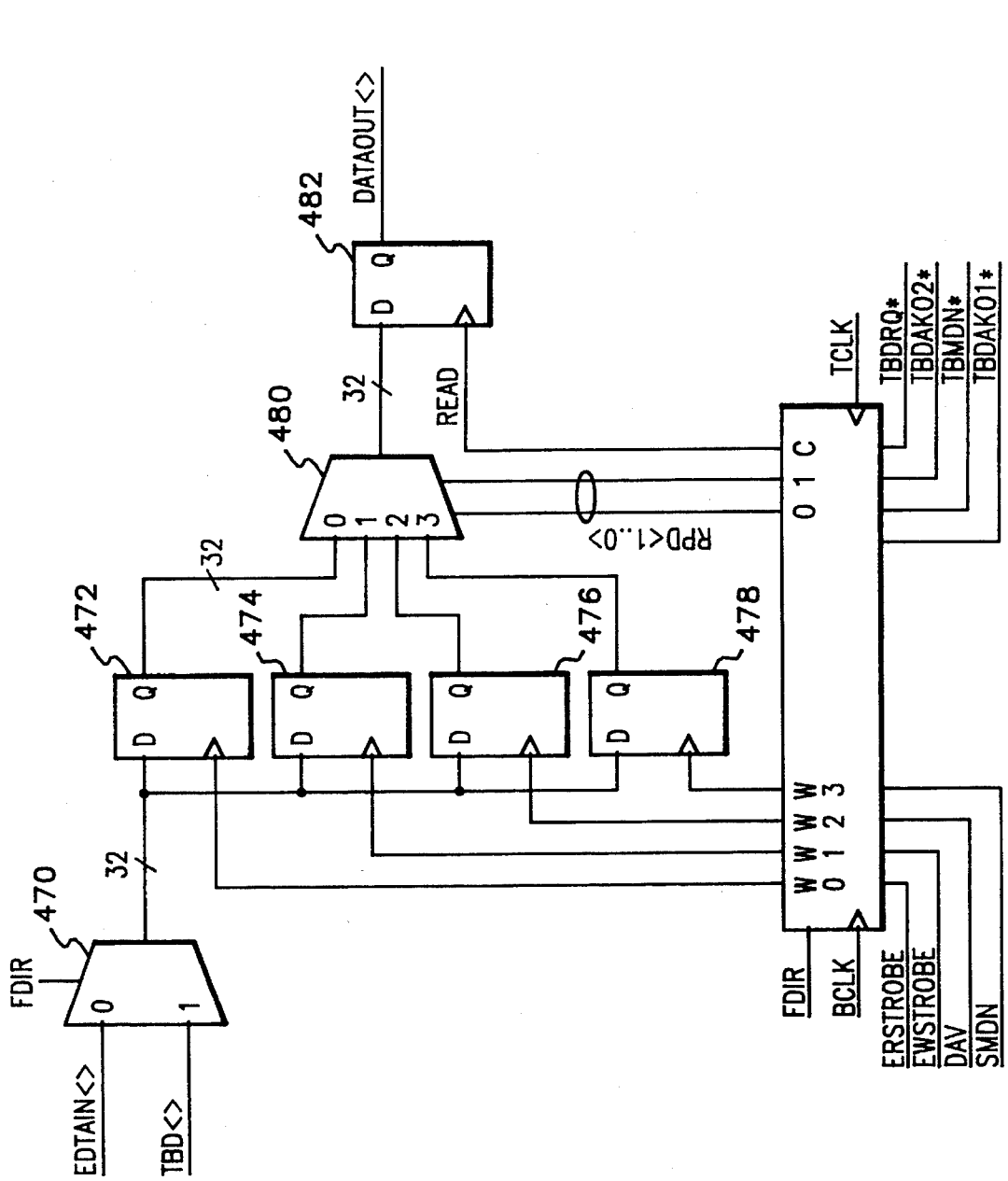

Referring now to FIG. 42, a schematic diagram is shown illustrating a portion of the data FIFO/aligner 322 and the signals generated to determine data flow through the FIFO (FIG. 43). A multiplexer 450 has a select input connected to a signal FDIR, which is set equal to the TBDIR signal from the CTB 104 when the TBDAK01* signal and the DESTADDR signals are both asserted low. Thus, the FDIR signal indicates the direction of data flow and equals 1 when the data is flowing from the ADAC 116 to the EISA bus 34 and is 0 when data is flowing in the reverse direction. The first input of the multiplexer 450 is connected to the ERSTROBE signal which is provided to the data FIFO/aligner 322 from the cycle generator 316 to strobe data into the FIFO. The second input of the multiplexer 450 is connected to a signal TWSTROBE which generally follows the TCLK clock signal but only when the TBDRQ* and TBDAK02* signals are both asserted low. The TBDAK02* signal is provided by the data FIF0 322 when a data transfer is acknowledged. The TBDAK02* and TBDAK01* signals are ANDed to form the TBDAK* signal. The output of the multiplexer 450 provides a signal WRITE which is provided into the clock input of a FIFO write pointer counter 452, which provides three output bits generally referred to as WPOINT. The inverted reset input of the FIFO write pointer 452 is connected to a signal RST*, which is the output of a three input OR gate 454 which has its inputs connected to the TBDAK01*, TCLK and DESTADDR signals so that the pointer 452 is cleared when a new address value is received over the CTB 104. The lower two bits of the WPOINT signals are provided to the input of a flip-flop pair, referred to as write delayed pointer 456, which provides two outputs WPD<1..0>. The WPD<> signals are used to indicate the next available data position within the FIFO. The WRITE signal is provided to the inverted clock input of the write delayed pointer 456 and the RST* signal is connected to its inverted reset input. In this manner, the WPOINT signals generally count upwards upon rising edges of the WRITE signal, where the WPOINT signals are delayed through the write delayed pointer 456 on falling edges of the WRITE signal to provide the WPD<1..0> signals.

In a similar manner, a multiplexer 458 has its select input connected to the FDIR signal and its first input connected to the TRSTROBE signal and its other input connected to the EWSTROBE signal, respectively. The output of the multiplexer 458 provides a signal READ which is provided to the clock input of a 3-bit FIF0 read pointer counter 460, which generally counts upwards upon each rising edge of the READ signal. The inverted reset input of the FIFO read pointer 460 is connected to the RST* signal, and provides three output signals collectively referred to as RPOINT. The two least significant bits of the RPOINT signals are provided to the input of a delayed read pointer flip-flop pair 462, which has its inverted clock input connected to the READ signal. The output of the delayed read pointer 462 provides two signals referred to as RPD<1..0>, which are delayed versions of the RPOINT signals updated upon falling edges of the READ signal. The inverted reset input of the delayed read pointer 462 is connected to the RST* signal.

The three WPOINT and three RPOINT signals are provided to the A and B inputs, respectively, of a compare block 464 which compares the WPOINT and RPOINT signals to determine whether the FIFO is full as indicated by a signal FULL, almost full as indicated by a signal AFULL, almost empty as indicated by a signal AEMPTY, and empty as indicated by a signal EMPTY. In general, the compare block 464 takes the binary difference between the WPOINT and RPOINT signals to determine how many valid data doublewords remain in the FIFO. The FIFO essentially comprises a five-deep data doubleword buffer which receives data at its input from either the EISA bus 34 or the CTB 104 depending upon the direction of data flow. The FULL, AFULL, AEMPTY and EMPTY signals determine the number of data doublewords remaining to be transferred through the FIFO. If five doublewords are in the FIFO, the FULL signal is true. Likewise, if 4, 1 or 0 data doublewords remain in the FIFO, then the AFULL, AEMPTY and EMPTY signals are true, respectively. The FULL, AFULL, AEMPTY and EMPTY signals are provided to the D inputs of four D flip-flops 466, respectively, which receives the BCLK* signal at its clock input. The four D flip-flops 466 provide corresponding synchronous signals BFULL, BAFULL, BAEMPTY and BEMPTY corresponding with the FULL, AFULL, AEMPTY and EMPTY signals respectively. In a similar manner, the FULL, AFULL, AEMPTY and EMPTY signals are provided to the four D inputs of four D flip-flops 468, which are clocked by the TCLK* signal provided at their clock inputs. The Q outputs of the four D flip-flops 468 provide signals TFULL, TAFULL, TAEMPTY and TEMPTY, respectively, corresponding to the D inputs as synchronized by the TCLK* signal for the CTB 104. The inverted reset input of the four D flip-flops 468 are each connected to the TBDAK01* signal. The TFULL, TAFULL, TAEMPTY and TEMPTY signals are used to qualify the providing of the TBDAK02* signal so that data is provided only when the FIFO is full or almost full and accepted only when the FIFO is empty or almost empty. Thus the signals are used to throttle the CTB 104 data transfer.

The SDAV signal is derived from the FDIR, BEMPTY, BAEMPTY, BFULL and BAFULL signals. If FDIR is asserted, the SDAV signal is true only if the BEMPTY and BAEMPTY signals are both false, indicating that data is available during a write from the ADAC 116 to the EISA bus 34 only when the FIFO is not empty and not almost empty. If FDIR is negated, the SDAV signal is true only if the BFULL and BAFULL signals are both false, indicating that data is "available" during a read from the EISA bus 34 to the ADAC 116 only when the FIFO is not full and not almost full.

Referring now to FIG. 43, a schematic diagram is shown of the FIFO. A 32-bit multiplexer 470 has its select input connected to the FDIR signal, its first set of inputs connected to signals referred to as EDATAIN<>, which are the data signals from the EISA bus 34, and its second set of inputs connected to the TBD<> data signals from the CTB 104. The outputs of the multiplexer 470 are connected to the D inputs of four banks of D flip-flops 472, 474, 476 and 478, where each bank of flip-flops is 32-bits wide each so that each bank of flip-flops can hold a data doubleword. The clock input of the first bank of D flip-flops 472 is connected to a signal W0, which is strobed when the WPD<> signals equal 00 and the WRITE signal is true. Likewise, the clock inputs of the bank of D flip-flops 474, 476 and 478 are connected to the W1, W2 and W3 signals, respectively, which are strobed true when the WPD<> signals are equal to 01, 10 and 11, respectively, and when the WRITE signal is asserted true. The 32 Q outputs of each of the banks of D flip-flops 472, 474, 476 and 478 are connected to the respective four inputs of a 32-bit wide multiplexer 480, which has its outputs connected to the D inputs of a bank of D flip-flops 482. The outputs of the bank of D flip-flops 482 are the DATAOUT<> signals, which collectively is the output of the FIFO. The select inputs of the multiplexer 480 are connected to the RPD<> signals provided by the delayed read pointer 462. The READ signal is connected to the clock inputs of the bank of D flip-flops 482 where the bank of D flip-flops 482 generally serve as the fifth level of the five-deep FIFO.

In general, when the FDIR signal is true or asserted high, the FIFO receives data from the TBD<> data signals through the CTB 104 from the ADAC 116 and provides these signals through the FIFO to the DATAOUT<> signals, which are further provided to the UAMUX/shifter 314. When the FDIR signal is negated low, the EDATAIN<> signals from the UA MUX/shifter 314 are provided through the multiplexer 470 into the FIFO, where the DATAOUT<> signals are buffered through to the CTB 104. The data from the multiplexer 470 is latched into one of the banks of flip-flops 472, 474, 476 or 478, depending upon which of the W0, W1, W2 or W3 signals are strobed. The RPD<> signals determine which data doubleword from the banks of D flip-flops 472, 474, 476 or 478 are selected by the multiplexer 480, where the selected data doubleword is latched into the D flip-flops 482 when the READ signal is strobed.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A disk drive array controller for use with a plurality of disk drives forming an array and for installation in a host computer, the disk drive array controller comprising:

local processor means for controlling operation of the disk drive array controller;

buffer memory means for temporarily storing disk drive and command data;

means for transferring data between the disk drives and said buffer memory means, said means connected to said local processor means for receiving control information; and means for transferring data between said buffer memory means and the host computer, said means including:

a bus for transferring host address information and data;

bus master means connected to said bus and said buffer memory means for providing host address information to said bus and transferring data between said bus and said buffer memory means, said bus master means including means for transferring a host memory address during a first bus slave load cycle, transfer count information during a second bus slave load cycle and data on following slave cycles and for providing a bus slave load signal with said first and second slave load cycles and a bus slave data request signal during said data cycles; and bus slave means connected to said bus and to the host computer for receiving said host address information add for transferring data between said bus and the host computer, said bus slave means including means for loading said host memory address value during said first cycle after receipt of said bus slave load signal, for loading said transfer counter during said second cycle after receipt of said bus slave load signal, for transferring data after receipt of said bus slave data request signal and for providing a bus slave acknowledge following receipt of each of said first and second slave load cycles and said data requests.

2. The disk array controller of claim 1, further comprising:

siphon slave means connected to said bus for receiving address information and data from said bus, wherein said bus master means further includes means for transferring an address value during a first siphon slave load cycle and transfer count information during a second siphon slave load cycle, said bus master means providing a siphon slave load signal with said first and second cycles and a siphon slave data request signal during said data cycles, and wherein said siphon slave means includes means for loading said address value during said first cycle after receipt of said siphon slave load signal, loading said transfer counter during said second cycle after receipt of said siphon slave load signal and for receiving data after receipt of said siphon slave data request signal, said siphon slave means providing a siphon slave acknowledge following receipt of each of said first and second load cycles and said data requests.

3. The disk array controller of claim 2, wherein said bus slave means and said siphon slave means both include means for indicating a ready to transfer data condition; and wherein said bus master means monitors said bus slave and siphon slave ready indications and transfers data only if both indicate ready.

4. The disk array controller of claim 3, wherein said bus master means provides a transfer done signal;

wherein said bus slave means and said siphon slave means both include means for indicating a done condition after completion of a transfer after receipt of said transfer done signal from said bus master means, and wherein said bus master means monitors said bus slave and siphon slave done indications and determines the transfer successful if both indicate done.

5. The disk array controller of claim 4, wherein said bus master means further includes means for timing the monitoring for bus slave and siphon slave done indications and considering the transfer unsuccessful if both do not indicate done before a predetermined time.

6. The disk array controller of claim 1, said means for transferring data further including:

means for arbitrating requests for use of said bus; and wherein said bus master means requests use of said bus prior to performing operations on said bus.

7. The disk array controller of claim 1, wherein said bus slave means has an address and wherein said bus master means provides an address for bus slave selection prior to performing said load cycles.

8. The disk array controller of claim 1, wherein said bus slave means includes means for indicating a ready to transfer data condition; and wherein said bus master means monitors said bus slave ready indication and transfers data only if said bus slave means indicates ready.

9. The disk array controller of claim 8, wherein said bus master means provides a transfer done signal;

wherein said bus slave means includes means for indicating a done condition after completion of a transfer after receipt of said transfer done signal from said bus master means, and wherein said bus master means monitors said bus slave done indication and determines the transfer successful if indicated done.

10. The disk array controller of claim 9, wherein said bus master means further includes means for timing the monitoring for bus slave indication and considering the transfer unsuccessful if not indicated done before a predetermined time.

* * * * *

UNITED STATES PATENT AND TRADEMARK OFFICE
CERTIFICATE OF CORRECTION

PATENT NO.  :    5,469,548

DATED       :    November 21, 1995

INVENTOR(S) :    Ryan A. Callison et al.

It is certified that error appears in the above-identified patent and that said Letters Patent is hereby corrected as shown below:

In col. 54, line 52, please replace "add" with --and--.

Signed and Sealed this

Thirteenth Day of February, 1996

Attest:

BRUCE LEHMAN

Attesting Officer         Commissioner of Patents and Trademarks